(12) United States Patent
Harrison

(10) Patent No.: US 10,425,675 B2
(45) Date of Patent: *Sep. 24, 2019

(54) DISCOVERY, ACCESS CONTROL, AND COMMUNICATION WITH NETWORKED SERVICES

(71) Applicant: David Harrison, Reno, NV (US)

(72) Inventor: David Harrison, Reno, NV (US)

(73) Assignee: FREE STREAM MEDIA CORP., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/879,454

(22) Filed: Jan. 25, 2018

(65) Prior Publication Data

US 2018/0152747 A1    May 31, 2018

Related U.S. Application Data

(63) Continuation of application No. 15/011,696, filed on Feb. 1, 2016, now Pat. No. 9,986,279, which is a
(Continued)

(51) Int. Cl.
*H04N 21/258* (2011.01)
*H04N 21/234* (2011.01)
(Continued)

(52) U.S. Cl.
CPC .......... *H04N 21/2668* (2013.01); *G06F 9/46* (2013.01); *G06F 21/53* (2013.01); *G08C 17/02* (2013.01);
(Continued)

(58) Field of Classification Search
None
See application file for complete search history.

(56) References Cited

U.S. PATENT DOCUMENTS 3,849,760 A    11/1974 Endou et al.
3,919,479 A    11/1975 Moon et al.
(Continued)

FOREIGN PATENT DOCUMENTS

CA    2553159 A1    10/1998
CA    2413944 A1    6/2003
(Continued)

OTHER PUBLICATIONS

"OpenX Ad Server: Beginner's Guide"; Packt Publishing by Murat Yilmaz (pp. 26) https://www.packtpub.com/sites/default/files/0202_OpenX%20Ad%20Server%20Beginner's%20Guide_SampleChapter.pdf.
(Continued)

*Primary Examiner* — Nathan J Flynn
*Assistant Examiner* — Christen A Kurien
(74) *Attorney, Agent, or Firm* — LegalForce RAPC Worldwide

(57) ABSTRACT

A system includes a television executing a discoverable service thereon to provide a communication, and a device residing in a same private network of a computer network as the television. The device is configured to constrain an executable environment in a security sandbox, execute a sandboxed program in the executable environment, use a pseudonym of a user, and call a discovery agent to find the discoverable service of the television within the same private network in accordance with the communication. The device and the television are associated by way of the sandboxed program and the discoverable service using at least the communication from the discoverable service within the same private network. The system also includes a targeting system to receive the pseudonym, identify the user of the device using the pseudonym, and target adver-
(Continued)

tising to the identified user of the device using the sandboxed program and/or the discoverable service.

20 Claims, 21 Drawing Sheets

Related U.S. Application Data continuation-in-part of application No. 14/018,408, filed on Sep. 4, 2013, now Pat. No. 9,589,456, and a continuation-in-part of application No. 14/981,938, filed on Dec. 29, 2015, now Pat. No. 9,519,772, which is a continuation-in-part of application No. 14/274,800, filed on May 12, 2014, now Pat. No. 9,258,383, which is a continuation of application No. 13/943,866, filed on Jul. 17, 2013, now Pat. No. 8,819,255, which is a continuation of application No. 13/904,015, filed on May 28, 2013, now Pat. No. 9,026,668, and a continuation-in-part of application No. 13/736,031, filed on Jan. 7, 2013, now Pat. No. 9,154,942, and a continuation-in-part of application No. 13/470,814, filed on May 14, 2012, now Pat. No. 8,539,072, which is a continuation of application No. 12/592,377, filed on Nov. 23, 2009, now Pat. No. 8,180,891.

(60) Provisional application No. 62/183,756, filed on Jun. 24, 2015, provisional application No. 61/696,711, filed on Sep. 24, 2012, provisional application No. 61/803,754, filed on Mar. 20, 2013, provisional application No. 61/652,153, filed on May 26, 2012, provisional application No. 61/584,168, filed on Jan. 6, 2012, provisional application No. 61/118,286, filed on Nov. 26, 2008.

(51) Int. Cl.

| | | |
|---|---|---|
| *H04N 21/435* | (2011.01) | |
| *H04N 21/2668* | (2011.01) | |
| *G06F 21/53* | (2013.01) | |
| *G08C 17/02* | (2006.01) | |
| *H04L 12/18* | (2006.01) | |
| *H04L 29/06* | (2006.01) | |
| *H04L 29/08* | (2006.01) | |
| *H04N 21/4147* | (2011.01) | |
| *H04N 21/45* | (2011.01) | |
| *H04N 21/61* | (2011.01) | |
| *H04N 21/6405* | (2011.01) | |
| *H04N 21/643* | (2011.01) | |
| *H04N 21/81* | (2011.01) | |
| *H04N 21/8352* | (2011.01) | |
| *G06F 9/46* | (2006.01) | |
| *H04N 21/41* | (2011.01) | |

(52) U.S. Cl.
CPC .......... *H04L 12/1859* (2013.01); *H04L 63/10* (2013.01); *H04L 65/00* (2013.01); *H04L 67/02* (2013.01); *H04L 67/16* (2013.01); *H04L 67/42* (2013.01); *H04N 21/25875* (2013.01); *H04N 21/4147* (2013.01); *H04N 21/4516* (2013.01); *H04N 21/6175* (2013.01); *H04N 21/6405* (2013.01); *H04N 21/64322* (2013.01); *H04N 21/812* (2013.01); *H04N 21/8352* (2013.01); *G06F 2221/033* (2013.01); *H04L 67/26* (2013.01); *H04N 21/23424* (2013.01); *H04N 21/4126* (2013.01); *H04N 21/435* (2013.01)

(56) References Cited

U.S. PATENT DOCUMENTS

| | | |
|---|---|---|
| 4,025,851 A | 5/1977 | Haselwood et al. |
| 4,230,990 A | 10/1980 | Lert, Jr. et al. |
| 4,258,386 A | 3/1981 | Cheung |
| 4,420,769 A | 12/1983 | Novak |
| 4,450,531 A | 5/1984 | Kenyon et al. |
| 4,574,304 A | 3/1986 | Watanabe et al. |
| 4,677,466 A | 6/1987 | Lert, Jr. et al. |
| 4,697,209 A | 9/1987 | Kiewit et al. |
| 4,739,398 A | 4/1988 | Thomas et al. |
| 4,833,449 A | 5/1989 | Gaffigan |
| 4,843,562 A | 6/1989 | Kenyon et al. |
| 4,888,638 A | 12/1989 | Bohn |
| 4,918,730 A | 4/1990 | Schulze |
| 4,955,070 A | 9/1990 | Welsh et al. |
| 4,967,273 A | 10/1990 | Greenberg |
| 4,993,059 A | 2/1991 | Smith et al. |
| 5,014,125 A | 5/1991 | Pocock et al. |
| 5,019,899 A | 5/1991 | Boles et al. |
| 5,105,184 A | 4/1992 | Pirani |
| 5,155,591 A | 10/1992 | Wachob |
| 5,223,924 A | 6/1993 | Strubbe |
| 5,319,453 A | 6/1994 | Copriviza et al. |
| 5,321,750 A | 6/1994 | Nadan |
| 5,436,653 A | 7/1995 | Ellis et al. |
| 5,481,294 A | 1/1996 | Thomas et al. |
| 5,522,077 A | 5/1996 | Cuthbert et al. |
| 5,539,658 A | 7/1996 | McCullough |
| 5,557,334 A | 9/1996 | Legate |
| 5,572,246 A | 11/1996 | Ellis et al. |
| 5,612,729 A | 3/1997 | Ellis et al. |
| 5,636,346 A | 6/1997 | Saxe |
| 5,724,521 A | 3/1998 | Dedrick |
| 5,732,219 A | 3/1998 | Blumer et al. |
| 5,742,768 A | 4/1998 | Gennaro et al. |
| 5,745,884 A | 4/1998 | Carnegie et al. |
| 5,761,601 A | 6/1998 | Nemirofsky et al. |
| 5,761,648 A | 6/1998 | Golden et al. |
| 5,761,655 A | 6/1998 | Hoffman |
| 5,774,170 A | 6/1998 | Hite et al. |
| 5,774,673 A | 6/1998 | Beuk et al. |
| 5,805,974 A | 9/1998 | Hite et al. |
| 5,815,665 A | 9/1998 | Teper et al. |
| 5,822,525 A | 10/1998 | Tafoya et al. |
| 5,838,301 A | 11/1998 | Okamoto et al. |
| 5,838,317 A | 11/1998 | Bolnick et al. |
| 5,848,396 A | 12/1998 | Gerace |
| 5,850,517 A | 12/1998 | Verkler et al. |
| 5,892,900 A | 4/1999 | Ginter et al. |
| 5,903,729 A | 5/1999 | Reber et al. |
| 5,905,942 A | 5/1999 | Stoel et al. |
| 5,907,279 A | 5/1999 | Bruins et al. |
| 5,940,073 A | 8/1999 | Klosterman et al. |
| 5,948,061 A | 9/1999 | Merriman et al. |
| 5,966,705 A | 10/1999 | Koneru et al. |
| 5,977,962 A | 11/1999 | Chapman et al. |
| 5,978,835 A | 11/1999 | Ludwig et al. |
| 6,002,393 A | 12/1999 | Hite et al. |
| 6,002,443 A | 12/1999 | Iggulden |
| 6,009,409 A | 12/1999 | Adler et al. |
| 6,009,410 A | 12/1999 | LeMole et al. |
| 6,026,368 A | 2/2000 | Brown et al. |
| 6,026,369 A | 2/2000 | Capek |
| 6,032,181 A | 2/2000 | Bedgedjian et al. |
| 6,043,817 A | 3/2000 | Bolnick et al. |
| 6,055,510 A | 4/2000 | Henrick et al. |
| 6,064,980 A | 5/2000 | Jacobi et al. |
| 6,084,628 A | 7/2000 | Sawyer |
| 6,105,122 A | 8/2000 | Muller et al. |
| 6,112,181 A | 8/2000 | Shear et al. |
| 6,118,864 A | 9/2000 | Chang et al. |
| 6,119,098 A | 9/2000 | Guyot et al. |
| 6,137,892 A | 10/2000 | Powell et al. |
| 6,141,010 A | 10/2000 | Hoyle |
| 6,157,941 A | 12/2000 | Verkler et al. |
| 6,167,427 A | 12/2000 | Rabinovich et al. |

(56) References Cited

U.S. PATENT DOCUMENTS

| | | |
|---|---|---|
| 6,169,542 B1 | 1/2001 | Hooks et al. |
| 6,188,398 B1 | 2/2001 | Collins-Rector et al. |
| 6,192,476 B1 | 2/2001 | Gong |
| 6,195,696 B1 | 2/2001 | Baber et al. |
| 6,216,141 B1 | 4/2001 | Straub et al. |
| 6,219,696 B1 | 4/2001 | Wynblatt et al. |
| 6,247,077 B1 | 6/2001 | Muller et al. |
| 6,286,104 B1 | 9/2001 | Buhle et al. |
| 6,304,523 B1 | 10/2001 | Jones et al. |
| 6,304,852 B1 | 10/2001 | Loncteaux |
| 6,308,327 B1 | 10/2001 | Liu et al. |
| 6,310,889 B1 | 10/2001 | Parsons et al. |
| 6,332,127 B1 | 12/2001 | Bandera et al. |
| 6,349,289 B1 | 2/2002 | Peterson et al. |
| 6,351,467 B1 | 2/2002 | Dillon |
| 6,360,254 B1 | 3/2002 | Linden et al. |
| 6,381,362 B1 | 4/2002 | Deshpande et al. |
| 6,400,265 B1 | 6/2002 | Saylor et al. |
| 6,400,996 B1 | 6/2002 | Hoffberg et al. |
| 6,438,594 B1 | 8/2002 | Bowman-Amuah |
| 6,463,585 B1 | 10/2002 | Hendricks et al. |
| 6,469,749 B1 | 10/2002 | Dimitrova et al. |
| 6,481,010 B2 | 11/2002 | Nishikawa et al. |
| 6,484,148 B1 | 11/2002 | Boyd |
| 6,505,169 B1 | 1/2003 | Bhagavath et al. |
| 6,526,491 B2 | 2/2003 | Suzuoki et al. |
| 6,530,082 B1 | 3/2003 | Del Sesto et al. |
| 6,532,218 B1 | 3/2003 | Shaffer et al. |
| 6,536,041 B1 | 3/2003 | Knudson et al. |
| 6,546,554 B1 | 4/2003 | Schmidt et al. |
| 6,564,260 B1 | 5/2003 | Baber et al. |
| 6,564,263 B1 | 5/2003 | Bergman et al. |
| 6,574,793 B1 | 6/2003 | Ngo et al. |
| 6,577,346 B1 | 6/2003 | Perlman |
| 6,597,405 B1 | 7/2003 | Iggulden |
| 6,622,171 B2 | 9/2003 | Gupta et al. |
| 6,628,801 B2 | 9/2003 | Powell et al. |
| 6,631,523 B1 | 10/2003 | Matthews, III et al. |
| 6,651,251 B1 | 11/2003 | Shoff et al. |
| 6,718,551 B1 | 4/2004 | Swix et al. |
| 6,728,784 B1 | 4/2004 | Mattaway |
| 6,738,978 B1 | 5/2004 | Hendricks et al. |
| 6,757,685 B2 | 6/2004 | Raffaele et al. |
| 6,769,009 B1 | 7/2004 | Reisman |
| 6,771,316 B1 | 8/2004 | Iggulden |
| 6,799,196 B1 | 9/2004 | Smith |
| 6,804,659 B1 | 10/2004 | Graham et al. |
| 6,832,239 B1 | 12/2004 | Kraft et al. |
| 6,834,308 B1 | 12/2004 | Ikezoye et al. |
| 6,836,888 B1 | 12/2004 | Basu et al. |
| 6,845,452 B1 | 1/2005 | Roddy et al. |
| 6,907,458 B2 | 6/2005 | Tomassetti et al. |
| 6,946,715 B2 | 9/2005 | Hong |
| 6,959,288 B1 | 10/2005 | Medina et al. |
| 6,959,320 B2 | 10/2005 | Shah et al. |
| 6,978,470 B2 | 12/2005 | Swix et al. |
| 6,981,022 B2 | 12/2005 | Boundy |
| 6,983,478 B1 | 1/2006 | Grauch et al. |
| 6,983,481 B2 | 1/2006 | Fellenstein et al. |
| 6,990,453 B2 | 1/2006 | Wang et al. |
| 6,993,326 B2 | 1/2006 | Link, II et al. |
| 7,020,304 B2 | 3/2006 | Alattar et al. |
| 7,028,033 B2 * | 4/2006 | Bright .............. G06F 17/30876 |
| 7,028,327 B1 | 4/2006 | Dougherty et al. |
| 7,043,524 B2 | 5/2006 | Shah et al. |
| 7,051,351 B2 | 5/2006 | Goldman et al. |
| 7,064,796 B2 | 6/2006 | Roy et al. |
| 7,080,400 B1 | 7/2006 | Navar |
| 7,088,687 B2 | 8/2006 | Ayyagari et al. |
| 7,089,575 B2 | 8/2006 | Agnihotri et al. |
| 7,089,585 B1 | 8/2006 | Dharmarajan |
| 7,100,183 B2 | 8/2006 | Kunkel et al. |
| 7,111,230 B2 | 9/2006 | Euchner et al. |
| 7,113,090 B1 | 9/2006 | Saylor et al. |
| 7,116,661 B2 | 10/2006 | Patton |
| 7,117,439 B2 | 10/2006 | Barrett et al. |
| 7,136,875 B2 | 11/2006 | Anderson et al. |
| 7,139,882 B2 | 11/2006 | Suzuoki et al. |
| 7,146,627 B1 | 12/2006 | Ismail et al. |
| 7,158,666 B2 | 1/2007 | Deshpande et al. |
| 7,162,539 B2 | 1/2007 | Garcie-Luna-Aceves |
| 7,167,857 B2 | 1/2007 | Roberts |
| 7,181,415 B2 | 2/2007 | Blaser et al. |
| 7,185,353 B2 | 2/2007 | Schlack |
| 7,194,421 B2 | 3/2007 | Conkwright et al. |
| 7,210,157 B2 | 4/2007 | Devara |
| 7,228,280 B1 | 6/2007 | Scherf et al. |
| 7,243,362 B2 | 7/2007 | Swix et al. |
| 7,243,364 B2 | 7/2007 | Dunn et al. |
| 7,296,091 B1 | 11/2007 | Dutta et al. |
| 7,299,195 B1 | 11/2007 | Tawakol et al. |
| 7,308,489 B2 | 12/2007 | Weast |
| 7,328,448 B2 | 2/2008 | Eldering et al. |
| 7,330,875 B1 | 2/2008 | Parasnis et al. |
| 7,346,606 B2 | 3/2008 | Bharat |
| 7,346,649 B1 | 3/2008 | Wong |
| 7,349,967 B2 | 3/2008 | Wang |
| 7,349,980 B1 | 3/2008 | Darugar et al. |
| 7,359,889 B2 | 4/2008 | Wang et al. |
| 7,360,173 B2 | 4/2008 | Tuli |
| 7,366,975 B1 | 4/2008 | Lipton |
| 7,373,381 B2 | 5/2008 | Rust |
| 7,380,258 B2 | 5/2008 | Durden et al. |
| 7,383,243 B2 | 6/2008 | Conkwright et al. |
| 7,421,723 B2 | 9/2008 | Harkness et al. |
| 7,437,301 B2 | 10/2008 | Kageyama et al. |
| 7,444,658 B1 | 10/2008 | Matz et al. |
| 7,444,660 B2 | 10/2008 | Dudkiewicz |
| 7,444,666 B2 | 10/2008 | Edwards et al. |
| 7,454,515 B2 | 11/2008 | Lamkin et al. |
| 7,472,398 B2 | 12/2008 | Corell et al. |
| 7,486,827 B2 | 2/2009 | Kim |
| 7,500,007 B2 | 3/2009 | Ikezoye et al. |
| 7,509,402 B2 | 3/2009 | Moorer et al. |
| 7,516,074 B2 | 4/2009 | Bilobrov |
| 7,516,213 B2 | 4/2009 | Cunningham et al. |
| 7,525,955 B2 | 4/2009 | Velez-Rivera et al. |
| 7,529,659 B2 | 5/2009 | Wold |
| 7,545,940 B2 | 6/2009 | Alessi et al. |
| 7,546,619 B2 | 6/2009 | Anderson et al. |
| 7,552,228 B2 | 6/2009 | Parasnis et al. |
| 7,555,165 B2 | 6/2009 | Luo et al. |
| 7,559,017 B2 | 7/2009 | Datar et al. |
| 7,565,158 B1 | 7/2009 | Aholainen |
| 7,574,723 B2 | 8/2009 | Putterman et al. |
| 7,584,491 B2 | 9/2009 | Bruckner et al. |
| 7,590,998 B2 | 9/2009 | Hanley |
| 7,593,988 B2 | 9/2009 | Oreizy et al. |
| 7,596,620 B1 | 9/2009 | Colton et al. |
| 7,602,748 B2 | 10/2009 | Sinnreich et al. |
| 7,623,823 B2 | 11/2009 | Zito et al. |
| 7,624,142 B2 | 11/2009 | Jungck |
| 7,631,325 B2 | 12/2009 | Rys et al. |
| 7,634,533 B2 | 12/2009 | Rudolph et al. |
| 7,639,387 B2 | 12/2009 | Hull et al. |
| 7,650,616 B2 | 1/2010 | Lee |
| 7,653,008 B2 | 1/2010 | Patrick et al. |
| 7,664,081 B2 | 2/2010 | Luoma et al. |
| 7,665,082 B2 | 2/2010 | Wyatt et al. |
| 7,672,003 B2 | 3/2010 | Dowling et al. |
| 7,689,920 B2 | 3/2010 | Robbin et al. |
| 7,690,006 B2 | 3/2010 | Birnbaum et al. |
| 7,694,319 B1 | 4/2010 | Hassell et al. |
| 7,698,165 B1 | 4/2010 | Tawakol et al. |
| 7,701,882 B2 | 4/2010 | Jones et al. |
| 7,711,748 B2 | 5/2010 | Bright et al. |
| 7,711,838 B1 | 5/2010 | Boulter et al. |
| 7,716,161 B2 | 5/2010 | Dean et al. |
| 7,720,914 B2 | 5/2010 | Goodman et al. |
| 7,729,366 B2 | 6/2010 | Mok et al. |
| 7,734,624 B2 | 6/2010 | Anderson et al. |
| 7,739,140 B2 | 6/2010 | Vinson et al. |
| 7,769,756 B2 | 8/2010 | Krikorian et al. |
| 7,774,348 B2 | 8/2010 | Delli Santi et al. |

(56) References Cited

U.S. PATENT DOCUMENTS

| | | |
|---|---|---|
| 7,774,715 B1 | 8/2010 | Evans |
| 7,789,757 B2 | 9/2010 | Gemelos et al. |
| 7,793,318 B2 | 9/2010 | Deng |
| 7,797,433 B2 | 9/2010 | Kennedy et al. |
| 7,805,740 B2 | 9/2010 | Gilboa et al. |
| 7,822,809 B2 | 10/2010 | Dhupelia et al. |
| 7,831,426 B2 | 11/2010 | Bennett |
| 7,856,644 B2 | 12/2010 | Nicholson et al. |
| 7,861,260 B2 | 12/2010 | Shkedi |
| 7,870,592 B2 | 1/2011 | Hudson et al. |
| 7,870,596 B2 | 1/2011 | Schackow et al. |
| 7,873,716 B2 | 1/2011 | Maes |
| 7,877,461 B1 | 1/2011 | Rimmer |
| 7,877,774 B1 | 1/2011 | Basso et al. |
| 7,890,957 B2 | 2/2011 | Campbell |
| 7,904,503 B2 | 3/2011 | Van De Sluis |
| 7,904,925 B2 | 3/2011 | Jiang |
| 7,907,211 B2 | 3/2011 | Oostveen et al. |
| 7,908,273 B2 | 3/2011 | DiMaria et al. |
| 7,908,618 B2 | 3/2011 | Bruckner et al. |
| 7,912,822 B2 | 3/2011 | Bethlehem et al. |
| 7,921,037 B2 | 4/2011 | Hertling et al. |
| 7,929,551 B2 | 4/2011 | Dietrich et al. |
| 7,930,207 B2 | 4/2011 | Merriman et al. |
| 7,930,546 B2 | 4/2011 | Rhoads et al. |
| 7,933,451 B2 | 4/2011 | Kloer |
| 7,937,405 B2 | 5/2011 | Anderson et al. |
| 7,941,197 B2 | 5/2011 | Jain et al. |
| 7,941,816 B2 | 5/2011 | Harkness et al. |
| 7,950,055 B2 | 5/2011 | Blinn et al. |
| 7,962,007 B2 | 6/2011 | Abe et al. |
| 7,966,309 B2 | 6/2011 | Yael Shacham et al. |
| 7,978,876 B2 | 7/2011 | Powell et al. |
| 7,979,570 B2 | 7/2011 | Chapweske et al. |
| 7,995,503 B2 | 8/2011 | Yu |
| 8,001,124 B2 | 8/2011 | Svendsen |
| 8,020,000 B2 | 9/2011 | Oostveen et al. |
| 8,035,656 B2 | 10/2011 | Blanchard et al. |
| 8,041,643 B2 | 10/2011 | Mukerji et al. |
| 8,046,787 B2 | 10/2011 | Cerrato |
| 8,046,839 B2 | 10/2011 | Lo |
| 8,055,784 B2 | 11/2011 | Kalama et al. |
| 8,060,399 B2 | 11/2011 | Ullah |
| 8,060,912 B2 | 11/2011 | Sato |
| 8,065,700 B2 | 11/2011 | Lee |
| 8,069,247 B2 | 11/2011 | Ruiz-Velasco et al. |
| 8,069,348 B2 | 11/2011 | Bacon |
| 8,071,869 B2 | 12/2011 | Chen et al. |
| 8,079,045 B2 | 12/2011 | Krapf et al. |
| 8,087,047 B2 | 12/2011 | Olague et al. |
| 8,090,706 B2 | 1/2012 | Bharat |
| 8,091,031 B2 | 1/2012 | Evans |
| 8,122,484 B2 | 2/2012 | Karjoth et al. |
| 8,126,963 B1 | 2/2012 | Rimmer |
| 8,131,585 B2 | 3/2012 | Nicholas et al. |
| 8,131,705 B2 | 3/2012 | Chevalier et al. |
| 8,131,734 B2 | 3/2012 | Austin et al. |
| 8,140,965 B2 | 3/2012 | Dean et al. |
| 8,141,111 B2 | 3/2012 | Gilley et al. |
| 8,145,645 B2 | 3/2012 | Delli Santi et al. |
| 8,145,705 B1 | 3/2012 | Rust |
| 8,150,729 B2 | 4/2012 | Wilhelm |
| 8,150,985 B2 | 4/2012 | Nakamura |
| 8,155,696 B2 | 4/2012 | Swanburg et al. |
| 8,161,511 B2 | 4/2012 | Kwak et al. |
| 8,171,030 B2 | 5/2012 | Pereira et al. |
| 8,171,510 B2 | 5/2012 | Kamen et al. |
| 8,175,413 B1 | 5/2012 | Ioffe et al. |
| 8,180,708 B2 | 5/2012 | Hurtado et al. |
| 8,180,891 B1 | 5/2012 | Harrison |
| 8,189,945 B2 | 5/2012 | Stojancic et al. |
| 8,191,091 B1 | 5/2012 | Harvey et al. |
| 8,195,689 B2 | 6/2012 | Ramanathan et al. |
| 8,195,692 B2 | 6/2012 | Baek et al. |
| 8,201,080 B2 | 6/2012 | Basson et al. |
| 8,209,397 B2 | 6/2012 | Ahn et al. |
| 8,209,404 B2 | 6/2012 | Wu |
| 8,214,256 B2 | 7/2012 | Riedl et al. |
| 8,219,411 B2 | 7/2012 | Matz et al. |
| 8,225,347 B1 | 7/2012 | Flickinger et al. |
| 8,229,227 B2 | 7/2012 | Stojancic et al. |
| 8,229,751 B2 | 7/2012 | Cheung |
| 8,239,340 B2 | 8/2012 | Hanson |
| 8,244,707 B2 | 8/2012 | Lin et al. |
| 8,245,270 B2 | 8/2012 | Cooperstein et al. |
| 8,255,949 B1 | 8/2012 | Bayer et al. |
| 8,260,665 B2 | 9/2012 | Foladare et al. |
| 8,261,341 B2 | 9/2012 | Stirbu |
| 8,271,649 B2 | 9/2012 | Kalofonos et al. |
| 8,275,791 B2 | 9/2012 | Raffaele et al. |
| 8,281,288 B1 | 10/2012 | Spencer |
| 8,285,880 B2 | 10/2012 | Ye et al. |
| 8,290,351 B2 | 10/2012 | Plotnick et al. |
| 8,296,763 B1 | 10/2012 | Peercy et al. |
| 8,301,596 B2 | 10/2012 | Lin et al. |
| 8,301,732 B2 | 10/2012 | Chapweske et al. |
| 8,302,170 B2 | 10/2012 | Kramer et al. |
| 8,307,093 B2 | 11/2012 | Klemets et al. |
| 8,316,450 B2 | 11/2012 | Robinson et al. |
| 8,326,872 B2 | 12/2012 | Zwilling et al. |
| 8,332,885 B2 | 12/2012 | Williamson et al. |
| 8,335,786 B2 | 12/2012 | Pereira et al. |
| 8,339,991 B2 | 12/2012 | Biswas et al. |
| 8,341,242 B2 | 12/2012 | Dillon et al. |
| 8,352,980 B2 | 1/2013 | Howcroft |
| 8,355,711 B2 | 1/2013 | Heins et al. |
| 8,358,966 B2 | 1/2013 | Zito et al. |
| 8,364,541 B2 | 1/2013 | Roth |
| 8,364,703 B2 | 1/2013 | Ramanathan et al. |
| 8,364,959 B2 | 1/2013 | Bhanoo et al. |
| 8,365,217 B2 | 1/2013 | Legrand |
| 8,375,131 B2 | 2/2013 | Rogers et al. |
| 8,381,026 B2 | 2/2013 | Talla et al. |
| 8,385,644 B2 | 2/2013 | Stojancic |
| 8,406,607 B2 | 3/2013 | Nesvadba et al. |
| 8,407,240 B2 | 3/2013 | Denton |
| 8,418,191 B2 | 4/2013 | Honishi et al. |
| 8,433,306 B2 | 4/2013 | Rodriguez |
| 8,433,574 B2 | 4/2013 | Jablokov et al. |
| 8,443,420 B2 | 5/2013 | Brown et al. |
| 8,451,762 B2 | 5/2013 | Liu et al. |
| 8,452,864 B1 | 5/2013 | Vendrow |
| 8,463,100 B2 | 6/2013 | Tse et al. |
| 8,468,357 B2 | 6/2013 | Roberts et al. |
| 8,472,289 B2 | 6/2013 | Scherf et al. |
| 8,473,575 B2 | 6/2013 | Marchwicki et al. |
| 8,479,246 B2 | 7/2013 | Hudson et al. |
| 8,488,838 B2 | 7/2013 | Sharma |
| 8,489,701 B2 | 7/2013 | Manion et al. |
| 8,494,907 B2 | 7/2013 | Lerman et al. |
| 8,495,611 B2 | 7/2013 | McCarthy et al. |
| 8,495,675 B1 | 7/2013 | Philpott et al. |
| 8,495,746 B2 | 7/2013 | Fissel et al. |
| 8,504,551 B2 | 8/2013 | Anderson et al. |
| 8,510,317 B2 | 8/2013 | Boetje et al. |
| 8,510,661 B2 | 8/2013 | Dharmaji et al. |
| 8,510,779 B2 | 8/2013 | Slothouber et al. |
| 8,516,533 B2 | 8/2013 | Davis et al. |
| 8,520,909 B2 | 8/2013 | Leung et al. |
| 8,527,594 B2 | 9/2013 | Lahaix |
| 8,533,192 B2 | 9/2013 | Moganti et al. |
| 8,537,157 B2 | 9/2013 | Adimatyam et al. |
| 8,539,025 B2 | 9/2013 | Husain et al. |
| 8,539,072 B1 | 9/2013 | Harrison |
| 8,539,523 B2 | 9/2013 | Philpott et al. |
| 8,548,820 B2 | 10/2013 | Matz et al. |
| 8,549,052 B2 | 10/2013 | Miles |
| 8,549,066 B1 | 10/2013 | Donahue et al. |
| 8,549,110 B2 | 10/2013 | Jerbi et al. |
| 8,549,550 B2 | 10/2013 | Lopatecki et al. |
| 8,566,154 B2 | 10/2013 | Merriman et al. |
| 8,566,158 B2 | 10/2013 | Cansler et al. |
| 8,566,867 B1 | 10/2013 | Yang et al. |
| 8,577,996 B2 | 11/2013 | Hughes et al. |

(56) References Cited

U.S. PATENT DOCUMENTS

| | | |
|---|---|---|
| 8,595,781 B2 | 11/2013 | Neumeier et al. |
| 8,607,267 B2 | 12/2013 | Shkedi |
| 8,611,701 B2 | 12/2013 | Zhang |
| 8,613,045 B1 | 12/2013 | Shigapov |
| 8,621,585 B2 | 12/2013 | Danieli et al. |
| 8,635,106 B2 | 1/2014 | Sarukkai et al. |
| 8,635,316 B2 | 1/2014 | Barnhill, Jr. |
| 8,639,826 B2 | 1/2014 | Slothouber et al. |
| 8,645,209 B2 | 2/2014 | Mandyam et al. |
| 8,645,992 B2 | 2/2014 | Russell et al. |
| 8,645,994 B2 | 2/2014 | Vemparala et al. |
| 8,646,063 B2 | 2/2014 | Dowlatkhah |
| 8,655,716 B1 | 2/2014 | Barnes et al. |
| 8,656,422 B2 | 2/2014 | Kumar et al. |
| 8,661,010 B2 | 2/2014 | Lin et al. |
| 8,666,168 B2 | 3/2014 | Stojancic et al. |
| 8,667,142 B2 | 3/2014 | Takei et al. |
| 8,677,253 B2 | 3/2014 | Duquene et al. |
| 8,694,656 B2 | 4/2014 | Douillet et al. |
| 8,695,032 B2 | 4/2014 | Shkedi |
| 8,700,699 B2 | 4/2014 | Shen et al. |
| 8,700,795 B2 | 4/2014 | Boulter et al. |
| 8,701,134 B2 | 4/2014 | Whinmill et al. |
| 8,707,351 B2 | 4/2014 | Dharmaji |
| 8,712,833 B2 | 4/2014 | Quach et al. |
| 8,719,396 B2 | 5/2014 | Brindley et al. |
| 8,719,870 B1 | 5/2014 | Davies et al. |
| 8,732,182 B2 | 5/2014 | Bethlehem et al. |
| 8,736,764 B2 | 5/2014 | Amundsen |
| 8,738,779 B2 | 5/2014 | Binding et al. |
| 8,739,208 B2 | 5/2014 | Davis et al. |
| 8,751,942 B2 | 6/2014 | Lopez et al. |
| 8,756,686 B2 | 6/2014 | Plattner et al. |
| 8,763,033 B2 | 6/2014 | Dittus |
| 8,763,097 B2 | 6/2014 | Bhatnagar et al. |
| 8,745,272 B2 | 7/2014 | Casalaina et al. |
| 8,769,584 B2 | 7/2014 | Neumeier et al. |
| 8,775,391 B2 | 7/2014 | Kalavade |
| 8,776,112 B2 | 7/2014 | Roberts et al. |
| 8,776,154 B2 | 7/2014 | Kim et al. |
| 8,776,244 B2 | 7/2014 | Kroeger et al. |
| 8,793,730 B2 | 7/2014 | Mowrey et al. |
| 8,799,357 B2 | 8/2014 | Clift et al. |
| 8,804,039 B2 | 8/2014 | Kim et al. |
| 8,804,721 B2 | 8/2014 | He et al. |
| 8,805,657 B2 | 8/2014 | Wells et al. |
| 8,805,854 B2 | 8/2014 | Chen et al. |
| 8,812,451 B2 | 8/2014 | Shukla et al. |
| 8,813,232 B2 | 8/2014 | Sreedharan et al. |
| 8,817,757 B2 | 8/2014 | Luo |
| 8,819,249 B2 | 8/2014 | Harrison |
| 8,819,255 B1 | 8/2014 | Harrison |
| 8,825,526 B2 | 9/2014 | Peters et al. |
| 8,826,327 B2 | 9/2014 | Adimatyam et al. |
| 8,832,729 B2 | 9/2014 | Nussel et al. |
| 8,838,149 B2 | 9/2014 | Hasek |
| 8,838,556 B1 | 9/2014 | Reiner et al. |
| 8,838,808 B2 | 9/2014 | Addala et al. |
| 8,843,584 B2 | 9/2014 | Arini et al. |
| 8,847,994 B2 | 9/2014 | Choi |
| 8,849,821 B2 | 9/2014 | Schloter |
| 8,855,796 B2 | 10/2014 | Otsuka et al. |
| 8,855,798 B2 | 10/2014 | DiMaria et al. |
| 8,856,028 B2 | 10/2014 | Yang et al. |
| 8,856,087 B2 | 10/2014 | Greene et al. |
| 8,856,874 B2 | 10/2014 | Pieczul et al. |
| 8,863,165 B2 | 10/2014 | Gordon |
| 8,863,168 B2 | 10/2014 | Craner |
| 8,863,174 B2 | 10/2014 | Neil et al. |
| 8,875,178 B2 | 10/2014 | Cansler et al. |
| 8,898,714 B2 | 11/2014 | Neumeier et al. |
| 8,904,021 B2 | 12/2014 | Harrison |
| 8,910,199 B2 | 12/2014 | Slaney et al. |
| 8,930,980 B2 | 1/2015 | Neumeier et al. |
| 8,949,872 B2 | 2/2015 | Slaney et al. |
| 8,966,525 B2 | 2/2015 | Mehta et al. |
| 8,972,485 B1 | 3/2015 | French et al. |
| 8,996,538 B1 | 3/2015 | Cremer et al. |
| 8,997,164 B2 | 3/2015 | Gordon et al. |
| 9,009,066 B2 | 4/2015 | Long et al. |
| 9,015,741 B2 | 4/2015 | Gordon |
| 9,026,668 B2 | 5/2015 | Harrison |
| 9,032,451 B2 | 5/2015 | Cansino et al. |
| 9,036,083 B1 | 5/2015 | Zhu et al. |
| 9,043,712 B2 | 5/2015 | Santoro et al. |
| 9,049,496 B2 | 6/2015 | Raesig et al. |
| 9,055,309 B2 | 6/2015 | Neumeier et al. |
| 9,106,804 B2 | 8/2015 | Roberts et al. |
| 9,113,107 B2 | 8/2015 | Jolna et al. |
| 9,118,945 B2 | 8/2015 | Rudman et al. |
| 9,131,279 B2 | 9/2015 | Raveendran et al. |
| 9,143,718 B2 | 9/2015 | Nagorski et al. |
| 9,146,990 B2 | 9/2015 | Scherf et al. |
| 9,152,727 B1 | 10/2015 | Balducci et al. |
| 9,154,942 B2 | 10/2015 | Harrison et al. |
| 9,160,837 B2 | 10/2015 | Jeffrey et al. |
| 9,167,419 B2 | 10/2015 | Harrison |
| 9,183,560 B2 | 11/2015 | Abelow |
| 9,185,458 B2 | 11/2015 | Jacoby |
| 9,185,462 B2 | 11/2015 | Das et al. |
| 9,204,275 B2 | 12/2015 | Johnson et al. |
| 9,213,747 B2 | 12/2015 | Cremer et al. |
| 9,215,217 B2 | 12/2015 | Abu-Hakima et al. |
| 9,232,279 B2 | 1/2016 | Beeson et al. |
| 9,258,383 B2 | 2/2016 | Harrison |
| 9,271,052 B2 | 2/2016 | Holden |
| 9,286,902 B2 | 3/2016 | Han et al. |
| 9,300,996 B2 | 3/2016 | Jeong et al. |
| 9,323,840 B2 | 4/2016 | Harron et al. |
| 9,355,554 B2 | 5/2016 | Sievert et al. |
| 9,356,914 B2 | 5/2016 | Jeffrey et al. |
| 9,361,606 B2 | 6/2016 | Hertel et al. |
| 9,372,531 B2 | 6/2016 | Benson et al. |
| 9,378,512 B2 | 6/2016 | Singh et al. |
| 9,380,383 B2 | 6/2016 | Brenner et al. |
| 9,386,356 B2 | 7/2016 | Harrison |
| 9,398,262 B2 | 7/2016 | Li et al. |
| 9,465,995 B2 | 10/2016 | Harron et al. |
| 9,495,451 B2 | 11/2016 | Harron |
| 9,501,568 B2 | 11/2016 | Rafii |
| 9,510,044 B1 | 11/2016 | Pereira et al. |
| 9,510,057 B2 | 11/2016 | Harron et al. |
| 2001/0001160 A1 | 5/2001 | Shoff et al. |
| 2001/0011226 A1 | 8/2001 | Greer et al. |
| 2001/0016501 A1 | 8/2001 | King |
| 2001/0016947 A1 | 8/2001 | Nishikawa et al. |
| 2001/0029583 A1 | 10/2001 | Palatov et al. |
| 2001/0036224 A1 | 11/2001 | Demelloet et al. |
| 2001/0039658 A1 | 11/2001 | Walton |
| 2001/0049620 A1 | 12/2001 | Blasko |
| 2001/0054155 A1 | 12/2001 | Hagan et al. |
| 2001/0054181 A1 | 12/2001 | Corvin |
| 2002/0012347 A1 | 1/2002 | Fitzpatrick |
| 2002/0015105 A1 | 2/2002 | Abe et al. |
| 2002/0019769 A1 | 2/2002 | Barritz et al. |
| 2002/0026635 A1 | 2/2002 | Wheeler et al. |
| 2002/0032906 A1 | 3/2002 | Grossman |
| 2002/0042914 A1 | 4/2002 | Walker et al. |
| 2002/0044659 A1 | 4/2002 | Ohta |
| 2002/0044683 A1 | 4/2002 | Deshpande et al. |
| 2002/0052965 A1 | 5/2002 | Dowling |
| 2002/0059633 A1 | 5/2002 | Harkness et al. |
| 2002/0066100 A1 | 5/2002 | Hoang |
| 2002/0069100 A1 | 6/2002 | Arberman |
| 2002/0072966 A1 | 6/2002 | Eldering et al. |
| 2002/0072982 A1 | 6/2002 | Barton et al. |
| 2002/0078456 A1 | 6/2002 | Hudson et al. |
| 2002/0083435 A1 | 6/2002 | Blasko et al. |
| 2002/0083441 A1 | 6/2002 | Flickinger et al. |
| 2002/0083443 A1 | 6/2002 | Eldering et al. |
| 2002/0087401 A1 | 7/2002 | Leapman et al. |
| 2002/0087545 A1 | 7/2002 | Bright et al. |
| 2002/0087975 A1 | 7/2002 | Schlack |
| 2002/0087976 A1 | 7/2002 | Kaplan et al. |

(56) References Cited

U.S. PATENT DOCUMENTS

| | | |
|---|---|---|
| 2002/0087978 A1 | 7/2002 | Nicholson et al. |
| 2002/0091763 A1 | 7/2002 | Shah et al. |
| 2002/0104083 A1 | 8/2002 | Hendricks et al. |
| 2002/0116195 A1 | 8/2002 | Pitman et al. |
| 2002/0116549 A1* | 8/2002 | Raffaele .......... G06F 9/468 719/330 |
| 2002/0120498 A1 | 8/2002 | Gordon et al. |
| 2002/0120925 A1 | 8/2002 | Logan |
| 2002/0123928 A1 | 9/2002 | Eldering et al. |
| 2002/0133490 A1 | 9/2002 | Conkwright et al. |
| 2002/0133534 A1 | 9/2002 | Forslow |
| 2002/0138842 A1 | 9/2002 | Chong et al. |
| 2002/0143782 A1 | 10/2002 | Headings et al. |
| 2002/0144262 A1 | 10/2002 | Plotnick et al. |
| 2002/0147611 A1 | 10/2002 | Greene et al. |
| 2002/0151992 A1 | 10/2002 | Hoffberg et al. |
| 2002/0152474 A1 | 10/2002 | Dudkiewicz |
| 2002/0161741 A1 | 10/2002 | Wang et al. |
| 2002/0162117 A1 | 10/2002 | Pearson et al. |
| 2002/0162118 A1 | 10/2002 | Levy et al. |
| 2002/0174197 A1 | 11/2002 | Schimke et al. |
| 2002/0178447 A1 | 11/2002 | Plotnick et al. |
| 2002/0196789 A1 | 12/2002 | Patton |
| 2003/0001883 A1 | 1/2003 | Wang |
| 2003/0009538 A1 | 1/2003 | Shah et al. |
| 2003/0023489 A1 | 1/2003 | McGuire et al. |
| 2003/0028433 A1 | 2/2003 | Merriman et al. |
| 2003/0030752 A1 | 2/2003 | Begeja et al. |
| 2003/0031176 A1 | 2/2003 | Sim |
| 2003/0036949 A1 | 2/2003 | Kaddeche et al. |
| 2003/0070167 A1 | 4/2003 | Holtz et al. |
| 2003/0079226 A1 | 4/2003 | Barrett |
| 2003/0097426 A1 | 5/2003 | Parry |
| 2003/0097657 A1 | 5/2003 | Zhou et al. |
| 2003/0101451 A1 | 5/2003 | Bentolila et al. |
| 2003/0101454 A1 | 5/2003 | Ozer et al. |
| 2003/0121037 A1 | 6/2003 | Swix et al. |
| 2003/0121046 A1 | 6/2003 | Roy et al. |
| 2003/0135513 A1 | 7/2003 | Quinn et al. |
| 2003/0135853 A1 | 7/2003 | Goldman et al. |
| 2003/0145323 A1 | 7/2003 | Hendricks et al. |
| 2003/0149975 A1 | 8/2003 | Eldering et al. |
| 2003/0154475 A1 | 8/2003 | Rodriguez et al. |
| 2003/0163583 A1 | 8/2003 | Tarr |
| 2003/0163828 A1 | 8/2003 | Agnihotri et al. |
| 2003/0172374 A1 | 9/2003 | Vinson et al. |
| 2003/0188318 A1 | 10/2003 | Liew et al. |
| 2003/0188321 A1 | 10/2003 | Shoff et al. |
| 2003/0226141 A1 | 12/2003 | Krasnow et al. |
| 2003/0229765 A1 | 12/2003 | Suzuoki et al. |
| 2004/0006693 A1 | 1/2004 | Vasnani et al. |
| 2004/0006706 A1 | 1/2004 | Erlingsson |
| 2004/0025034 A1 | 2/2004 | Alessi et al. |
| 2004/0025174 A1 | 2/2004 | Cerrato |
| 2004/0031052 A1 | 2/2004 | Wannamaker et al. |
| 2004/0045020 A1 | 3/2004 | Witt et al. |
| 2004/0059708 A1 | 3/2004 | Dean et al. |
| 2004/0078809 A1 | 4/2004 | Drazin |
| 2004/0088348 A1 | 5/2004 | Yeager et al. |
| 2004/0143349 A1 | 7/2004 | Roberts et al. |
| 2004/0148625 A1 | 7/2004 | Eldering et al. |
| 2004/0158858 A1 | 8/2004 | Paxton et al. |
| 2004/0163101 A1 | 8/2004 | Swix et al. |
| 2004/0207719 A1 | 10/2004 | Tervo et al. |
| 2004/0210630 A1 | 10/2004 | Simonnet et al. |
| 2004/0215509 A1 | 10/2004 | Perry |
| 2004/0215515 A1 | 10/2004 | Perry |
| 2004/0216171 A1 | 10/2004 | Barone et al. |
| 2004/0225686 A1 | 11/2004 | Li et al. |
| 2004/0226035 A1 | 11/2004 | Hauser |
| 2004/0237102 A1 | 11/2004 | Konig et al. |
| 2004/0240562 A1 | 12/2004 | Bargeron et al. |
| 2004/0260791 A1 | 12/2004 | Jerbi et al. |
| 2004/0267723 A1 | 12/2004 | Bharat |
| 2005/0002640 A1 | 1/2005 | Putterman et al. |
| 2005/0015795 A1 | 1/2005 | Iggulden |
| 2005/0015796 A1 | 1/2005 | Bruckner et al. |
| 2005/0021670 A1 | 1/2005 | Maes |
| 2005/0028200 A1 | 2/2005 | Sardera |
| 2005/0028201 A1 | 2/2005 | Klosterman et al. |
| 2005/0028206 A1 | 2/2005 | Cameron et al. |
| 2005/0071224 A1 | 3/2005 | Fikes et al. |
| 2005/0080876 A1 | 4/2005 | Peiffer et al. |
| 2005/0080878 A1 | 4/2005 | Cunningham et al. |
| 2005/0091301 A1 | 4/2005 | Oreizy et al. |
| 2005/0108213 A1 | 5/2005 | Riise et al. |
| 2005/0108745 A1 | 5/2005 | Linzer |
| 2005/0120391 A1 | 6/2005 | Haynie et al. |
| 2005/0165696 A1 | 7/2005 | Jakobsson et al. |
| 2005/0183143 A1 | 8/2005 | Anderholm et al. |
| 2005/0204381 A1 | 9/2005 | Ludvig et al. |
| 2005/0210502 A1 | 9/2005 | Flickinger et al. |
| 2005/0232411 A1 | 10/2005 | Srinivasan et al. |
| 2005/0235318 A1 | 10/2005 | Grauch et al. |
| 2005/0251491 A1 | 11/2005 | Medina et al. |
| 2005/0251577 A1 | 11/2005 | Guo et al. |
| 2005/0251820 A1 | 11/2005 | Stefanik et al. |
| 2005/0259819 A1 | 11/2005 | Oomen et al. |
| 2005/0267896 A1 | 12/2005 | Goodman et al. |
| 2005/0283796 A1 | 12/2005 | Flickinger |
| 2006/0029368 A1 | 2/2006 | Harville |
| 2006/0031381 A1 | 2/2006 | Van Luijt et al. |
| 2006/0064299 A1 | 3/2006 | Uhle et al. |
| 2006/0064583 A1 | 3/2006 | Birnbaum et al. |
| 2006/0072144 A1 | 4/2006 | Dowling et al. |
| 2006/0072542 A1 | 4/2006 | Sinnreich et al. |
| 2006/0085383 A1 | 4/2006 | Mantle et al. |
| 2006/0085642 A1 | 4/2006 | Multerer et al. |
| 2006/0092834 A1 | 5/2006 | Honishi et al. |
| 2006/0133414 A1 | 6/2006 | Luoma et al. |
| 2006/0136964 A1 | 6/2006 | Diez et al. |
| 2006/0143188 A1 | 6/2006 | Bright et al. |
| 2006/0149624 A1 | 7/2006 | Baluja et al. |
| 2006/0153296 A1 | 7/2006 | Deng |
| 2006/0156362 A1 | 7/2006 | Perrot |
| 2006/0168291 A1 | 7/2006 | van Zoest et al. |
| 2006/0168616 A1 | 7/2006 | Candelore |
| 2006/0195860 A1 | 8/2006 | Eldering et al. |
| 2006/0212908 A1 | 9/2006 | Hunter et al. |
| 2006/0218617 A1 | 9/2006 | Bradstreet et al. |
| 2006/0230130 A1 | 10/2006 | Cho et al. |
| 2006/0245724 A1 | 11/2006 | Hwang et al. |
| 2006/0247011 A1 | 11/2006 | Gagner |
| 2006/0247937 A1 | 11/2006 | Binding et al. |
| 2006/0248558 A1 | 11/2006 | Barton et al. |
| 2006/0253330 A1 | 11/2006 | Maggio et al. |
| 2006/0265493 A1 | 11/2006 | Brindley et al. |
| 2006/0287912 A1 | 12/2006 | Raghuvamshi |
| 2007/0047781 A1 | 3/2007 | Hull et al. |
| 2007/0050832 A1 | 3/2007 | Wright et al. |
| 2007/0050854 A1 | 3/2007 | Cooperstein et al. |
| 2007/0056008 A1 | 3/2007 | Nagamoto et al. |
| 2007/0061724 A1 | 3/2007 | Slothouber et al. |
| 2007/0061831 A1 | 3/2007 | Savoor et al. |
| 2007/0072676 A1 | 3/2007 | Baluja |
| 2007/0073581 A1 | 3/2007 | Kempe et al. |
| 2007/0078706 A1 | 4/2007 | Datta et al. |
| 2007/0083908 A1 | 4/2007 | McCarthy et al. |
| 2007/0088801 A1 | 4/2007 | Levkovitz et al. |
| 2007/0088852 A1 | 4/2007 | Levkovitz |
| 2007/0089158 A1 | 4/2007 | Clark et al. |
| 2007/0100690 A1 | 5/2007 | Hopkins |
| 2007/0106405 A1 | 5/2007 | Cook et al. |
| 2007/0106721 A1 | 5/2007 | Schloter |
| 2007/0108721 A1 | 5/2007 | Bayne et al. |
| 2007/0109449 A1 | 5/2007 | Cheung |
| 2007/0113243 A1 | 5/2007 | Brey |
| 2007/0113263 A1 | 5/2007 | Chatani |
| 2007/0116365 A1 | 5/2007 | Kloer |
| 2007/0124756 A1 | 5/2007 | Covell et al. |
| 2007/0129108 A1 | 6/2007 | Swanburg et al. |
| 2007/0143796 A1 | 6/2007 | Malik |
| 2007/0156726 A1 | 7/2007 | Levy |
| 2007/0157231 A1 | 7/2007 | Eldering et al. |

(56) References Cited

U.S. PATENT DOCUMENTS

| | | |
|---|---|---|
| 2007/0168389 A1 | 7/2007 | Lipscomb |
| 2007/0174059 A1 | 7/2007 | Rhoads et al. |
| 2007/0180459 A1 | 8/2007 | Smithpeters et al. |
| 2007/0186240 A1 | 8/2007 | Ward et al. |
| 2007/0192450 A1 | 8/2007 | Lewis |
| 2007/0198339 A1 | 8/2007 | Shen et al. |
| 2007/0208619 A1 | 9/2007 | Branam et al. |
| 2007/0208711 A1 | 9/2007 | Rhoads et al. |
| 2007/0220024 A1 | 9/2007 | Putterman et al. |
| 2007/0220575 A1 | 9/2007 | Cooper et al. |
| 2007/0234382 A1 | 10/2007 | Swix et al. |
| 2007/0244750 A1 | 10/2007 | Grannan et al. |
| 2007/0250590 A1 | 10/2007 | Flannery et al. |
| 2007/0250716 A1 | 10/2007 | Brunk et al. |
| 2007/0253594 A1 | 11/2007 | Lu et al. |
| 2007/0260520 A1 | 11/2007 | Jha et al. |
| 2007/0266403 A1 | 11/2007 | Ou et al. |
| 2007/0271300 A1 | 11/2007 | Ramaswamy |
| 2007/0274537 A1 | 11/2007 | Srinivasan |
| 2007/0283384 A1 | 12/2007 | Haeuser et al. |
| 2007/0283402 A1 | 12/2007 | Yu |
| 2007/0288985 A1 | 12/2007 | Candelore et al. |
| 2007/0291747 A1 | 12/2007 | Stern et al. |
| 2007/0291761 A1 | 12/2007 | Kauniskangas et al. |
| 2007/0294721 A1 | 12/2007 | Haeuser et al. |
| 2007/0300264 A1 | 12/2007 | Turner |
| 2007/0300273 A1 | 12/2007 | Turner |
| 2007/0300280 A1 | 12/2007 | Turner et al. |
| 2008/0004957 A1 | 1/2008 | Hildreth et al. |
| 2008/0010133 A1 | 1/2008 | Pyhalammi et al. |
| 2008/0040666 A1 | 2/2008 | Wang et al. |
| 2008/0040767 A1 | 2/2008 | McCarthy et al. |
| 2008/0046945 A1 | 2/2008 | Hanley |
| 2008/0052195 A1 | 2/2008 | Roth et al. |
| 2008/0059285 A1 | 3/2008 | Hamoui |
| 2008/0060002 A1 | 3/2008 | Noll et al. |
| 2008/0066080 A1 | 3/2008 | Campbell |
| 2008/0066098 A1 | 3/2008 | Witteman et al. |
| 2008/0089551 A1 | 4/2008 | Heather et al. |
| 2008/0109376 A1 | 5/2008 | Walsh et al. |
| 2008/0109844 A1 | 5/2008 | Baldeschwieler et al. |
| 2008/0109888 A1 | 5/2008 | Ullah |
| 2008/0127263 A1 | 5/2008 | Klosterman et al. |
| 2008/0140476 A1 | 6/2008 | Anand et al. |
| 2008/0154678 A1 | 6/2008 | Botelho |
| 2008/0155588 A1 | 6/2008 | Roberts et al. |
| 2008/0155591 A1 | 6/2008 | Mahajan et al. |
| 2008/0155627 A1 | 6/2008 | O'Connor et al. |
| 2008/0172243 A1 | 7/2008 | Kelly |
| 2008/0172747 A1 | 7/2008 | Hurtado et al. |
| 2008/0174570 A1 | 7/2008 | Jobs et al. |
| 2008/0181225 A1 | 7/2008 | Zampiello |
| 2008/0186933 A1 | 8/2008 | Willman et al. |
| 2008/0189757 A1 | 8/2008 | Schackow et al. |
| 2008/0195457 A1 | 8/2008 | Sherman et al. |
| 2008/0195749 A1 | 8/2008 | Krig |
| 2008/0201222 A1 | 8/2008 | Lahaix |
| 2008/0201734 A1 | 8/2008 | Lyon et al. |
| 2008/0221987 A1 | 9/2008 | Sundaresan et al. |
| 2008/0222045 A1 | 9/2008 | Mukerji et al. |
| 2008/0222711 A1 | 9/2008 | Michaelis |
| 2008/0228581 A1 | 9/2008 | Yonezaki et al. |
| 2008/0229335 A1 | 9/2008 | Robbin et al. |
| 2008/0243535 A1 | 10/2008 | Binding et al. |
| 2008/0244418 A1 | 10/2008 | Manolescu et al. |
| 2008/0263600 A1 | 10/2008 | Olague et al. |
| 2008/0268828 A1 | 10/2008 | Nagaraja |
| 2008/0276265 A1 | 11/2008 | Topchy et al. |
| 2008/0276266 A1 | 11/2008 | Huchital et al. |
| 2008/0276270 A1 | 11/2008 | Kotaru et al. |
| 2008/0288631 A1 | 11/2008 | Faisal et al. |
| 2008/0300011 A1 | 12/2008 | Rhoads et al. |
| 2008/0306820 A1 | 12/2008 | Passmore |
| 2008/0307460 A1 | 12/2008 | Knudson et al. |
| 2008/0310731 A1 | 12/2008 | Stojancic et al. |
| 2008/0313140 A1 | 12/2008 | Pereira et al. |
| 2008/0313648 A1 | 12/2008 | Wang et al. |
| 2008/0317278 A1 | 12/2008 | Lefebvre et al. |
| 2009/0006207 A1 | 1/2009 | Datar et al. |
| 2009/0011744 A1 | 1/2009 | Daley et al. |
| 2009/0044223 A1 | 2/2009 | Jiang et al. |
| 2009/0049384 A1 | 2/2009 | Yau |
| 2009/0052784 A1 | 2/2009 | Covell et al. |
| 2009/0055537 A1 | 2/2009 | Takei et al. |
| 2009/0061841 A1* | 3/2009 | Chaudhri .......... H04M 1/72527 455/420 |
| 2009/0063691 A1 | 3/2009 | Kalofonos et al. |
| 2009/0070473 A1 | 3/2009 | Baum et al. |
| 2009/0076821 A1 | 3/2009 | Brenner et al. |
| 2009/0077580 A1 | 3/2009 | Konig et al. |
| 2009/0083417 A1 | 3/2009 | Hughes et al. |
| 2009/0088878 A1 | 4/2009 | Otsuka et al. |
| 2009/0089251 A1 | 4/2009 | Johnston et al. |
| 2009/0094093 A1 | 4/2009 | Phan |
| 2009/0100361 A1 | 4/2009 | Abello et al. |
| 2009/0119576 A1 | 5/2009 | Pepper et al. |
| 2009/0147718 A1 | 6/2009 | Liu et al. |
| 2009/0153289 A1 | 6/2009 | Hope et al. |
| 2009/0163227 A1 | 6/2009 | Collins |
| 2009/0164483 A1 | 6/2009 | Miles |
| 2009/0164641 A1 | 6/2009 | Rogers et al. |
| 2009/0164904 A1 | 6/2009 | Horowitz et al. |
| 2009/0165140 A1 | 6/2009 | Robinson et al. |
| 2009/0172728 A1* | 7/2009 | Shkedi ................ G06Q 30/02 725/34 |
| 2009/0172746 A1 | 7/2009 | Aldrey et al. |
| 2009/0185723 A1 | 7/2009 | Kurtz et al. |
| 2009/0197524 A1 | 8/2009 | Haff et al. |
| 2009/0199236 A1 | 8/2009 | Barrett et al. |
| 2009/0199283 A1 | 8/2009 | Jain |
| 2009/0210899 A1 | 8/2009 | Lawrence-Apfelbaum et al. |
| 2009/0210902 A1 | 8/2009 | Slaney et al. |
| 2009/0216768 A1 | 8/2009 | Zwilling et al. |
| 2009/0231485 A1 | 9/2009 | Steinke |
| 2009/0232305 A1 | 9/2009 | Alessi et al. |
| 2009/0234738 A1 | 9/2009 | Britton et al. |
| 2009/0235312 A1 | 9/2009 | Morad et al. |
| 2009/0240821 A1 | 9/2009 | Juncker et al. |
| 2009/0248736 A1 | 10/2009 | Adelman et al. |
| 2009/0254554 A1 | 10/2009 | Hicken |
| 2009/0254572 A1 | 10/2009 | Redlich et al. |
| 2009/0259612 A1 | 10/2009 | Hanson |
| 2009/0271398 A1 | 10/2009 | Scherf et al. |
| 2009/0276313 A1 | 11/2009 | Wilhelm |
| 2009/0292610 A1 | 11/2009 | Quach et al. |
| 2009/0298480 A1 | 12/2009 | Khambete et al. |
| 2009/0299817 A1 | 12/2009 | Fok et al. |
| 2009/0299843 A1* | 12/2009 | Shkedi ................ G06Q 30/02 705/14.25 |
| 2009/0300109 A1 | 12/2009 | Porter |
| 2009/0300675 A1* | 12/2009 | Shkedi ............... H04N 7/17318 725/34 |
| 2009/0307048 A1 | 12/2009 | Grossman |
| 2009/0327076 A1 | 12/2009 | Sinyagin et al. |
| 2009/0327496 A1 | 12/2009 | Klemets et al. |
| 2010/0007797 A1 | 1/2010 | Stojancic |
| 2010/0022231 A1 | 1/2010 | Heins et al. |
| 2010/0023392 A1 | 1/2010 | Merriman et al. |
| 2010/0023499 A1 | 1/2010 | Johnson et al. |
| 2010/0023582 A1 | 1/2010 | Pedersen et al. |
| 2010/0049711 A1 | 2/2010 | Singh et al. |
| 2010/0050220 A1 | 2/2010 | Rys et al. |
| 2010/0058380 A1 | 3/2010 | Yu et al. |
| 2010/0063970 A1 | 3/2010 | Kim |
| 2010/0071070 A1 | 3/2010 | Jawa et al. |
| 2010/0083303 A1 | 4/2010 | Redei et al. |
| 2010/0094897 A1 | 4/2010 | Sumrall et al. |
| 2010/0099359 A1 | 4/2010 | Lee et al. |
| 2010/0107189 A1 | 4/2010 | Steelberg et al. |
| 2010/0119208 A1 | 5/2010 | Davis et al. |
| 2010/0121891 A1 | 5/2010 | Zampiello |
| 2010/0131363 A1 | 5/2010 | Sievert et al. |
| 2010/0131847 A1 | 5/2010 | Sievert et al. |
| 2010/0131973 A1 | 5/2010 | Dillon et al. |

(56) References Cited

U.S. PATENT DOCUMENTS

| | | |
|---|---|---|
| 2010/0145938 A1 | 6/2010 | Boetje et al. |
| 2010/0146552 A1 | 6/2010 | Hassell et al. |
| 2010/0158391 A1 | 6/2010 | Cunningham et al. |
| 2010/0161424 A1 | 6/2010 | Sylvain |
| 2010/0174605 A1 | 7/2010 | Dean et al. |
| 2010/0175078 A1 | 7/2010 | Knudson et al. |
| 2010/0180216 A1 | 7/2010 | Bates et al. |
| 2010/0185513 A1 | 7/2010 | Anderson et al. |
| 2010/0199188 A1 | 8/2010 | Abu-Hakima et al. |
| 2010/0205166 A1 | 8/2010 | Boulter et al. |
| 2010/0205562 A1 | 8/2010 | de Heer |
| 2010/0205628 A1 | 8/2010 | Davis et al. |
| 2010/0226582 A1 | 9/2010 | Luo et al. |
| 2010/0228611 A1 | 9/2010 | Shenfield |
| 2010/0228625 A1 | 9/2010 | Priyadarshan et al. |
| 2010/0251278 A1 | 9/2010 | Agarwal et al. |
| 2010/0251289 A1 | 9/2010 | Agarwal et al. |
| 2010/0257052 A1 | 10/2010 | Zito et al. |
| 2010/0269138 A1 | 10/2010 | Krikorian et al. |
| 2010/0287026 A1 | 11/2010 | Smith |
| 2010/0287049 A1 | 11/2010 | Rousso et al. |
| 2010/0306193 A1 | 12/2010 | Pereira et al. |
| 2010/0306773 A1 | 12/2010 | Lee et al. |
| 2010/0306805 A1 | 12/2010 | Neumeier et al. |
| 2010/0306808 A1 | 12/2010 | Neumeier et al. |
| 2010/0311345 A1 | 12/2010 | Santori et al. |
| 2010/0318628 A1 | 12/2010 | Pacella et al. |
| 2010/0318917 A1 | 12/2010 | Holladay et al. |
| 2010/0319062 A1 | 12/2010 | Danieli et al. |
| 2010/0324992 A1 | 12/2010 | Birch |
| 2010/0325495 A1 | 12/2010 | Talla et al. |
| 2010/0325552 A1 | 12/2010 | Sloo et al. |
| 2011/0010737 A1 | 1/2011 | Bouazizi et al. |
| 2011/0029555 A1 | 2/2011 | Gao et al. |
| 2011/0029666 A1 | 2/2011 | Lopatecki et al. |
| 2011/0032334 A1 | 2/2011 | Raveendran et al. |
| 2011/0043652 A1 | 2/2011 | King et al. |
| 2011/0061073 A1 | 3/2011 | Nicholson et al. |
| 2011/0078753 A1 | 3/2011 | Christianson et al. |
| 2011/0082939 A1 | 4/2011 | Montemurro et al. |
| 2011/0082940 A1 | 4/2011 | Montemurro et al. |
| 2011/0088075 A1 | 4/2011 | Eyer |
| 2011/0099065 A1 | 4/2011 | Georgis et al. |
| 2011/0099609 A1 | 4/2011 | Malhotra et al. |
| 2011/0107385 A1 | 5/2011 | Hudson et al. |
| 2011/0119139 A1 | 5/2011 | Dean et al. |
| 2011/0122836 A1 | 5/2011 | Kim |
| 2011/0125586 A1 | 5/2011 | Evans |
| 2011/0131597 A1 | 6/2011 | Cera et al. |
| 2011/0136539 A1 | 6/2011 | Jain et al. |
| 2011/0138059 A1 | 6/2011 | Schleifer et al. |
| 2011/0145926 A1 | 6/2011 | Dalcher et al. |
| 2011/0154498 A1 | 6/2011 | Fissel et al. |
| 2011/0179010 A1 | 7/2011 | Lin et al. |
| 2011/0179447 A1 | 7/2011 | Harkness et al. |
| 2011/0191178 A1 | 8/2011 | Newberg et al. |
| 2011/0191352 A1 | 8/2011 | Jones et al. |
| 2011/0213881 A1 | 9/2011 | Stavenow et al. |
| 2011/0219322 A1 | 9/2011 | Ramamurthy et al. |
| 2011/0238379 A1 | 9/2011 | Misra et al. |
| 2011/0247044 A1 | 10/2011 | Jacoby |
| 2011/0251987 A1 | 10/2011 | Buchheit |
| 2011/0251992 A1 | 10/2011 | Bethlehem et al. |
| 2011/0258211 A1 | 10/2011 | Kalisky et al. |
| 2011/0265114 A1 | 10/2011 | Legrand |
| 2011/0265116 A1 | 10/2011 | Stern et al. |
| 2011/0270672 A1 | 11/2011 | Hillard et al. |
| 2011/0273625 A1 | 11/2011 | McMahon et al. |
| 2011/0274179 A1 | 11/2011 | Holden |
| 2011/0279445 A1 | 11/2011 | Murphy et al. |
| 2011/0283322 A1 | 11/2011 | Hamano |
| 2011/0289114 A1 | 11/2011 | Yu et al. |
| 2011/0289524 A1 | 11/2011 | Toner et al. |
| 2011/0289532 A1 | 11/2011 | Yu et al. |
| 2011/0289544 A1 | 11/2011 | Goosen et al. |
| 2011/0296303 A1 | 12/2011 | Duquene et al. |
| 2011/0304771 A1 | 12/2011 | Blanchard et al. |
| 2011/0310100 A1 | 12/2011 | Adimatyam et al. |
| 2011/0313856 A1 | 12/2011 | Cohen et al. |
| 2011/0314051 A1 | 12/2011 | Cavet et al. |
| 2011/0317885 A1 | 12/2011 | Leung et al. |
| 2011/0321003 A1 | 12/2011 | Doig et al. |
| 2011/0321109 A1 | 12/2011 | Hudson et al. |
| 2012/0011541 A1 | 1/2012 | McCarthy |
| 2012/0017240 A1 | 1/2012 | Shkedi |
| 2012/0023522 A1 | 1/2012 | Anderson et al. |
| 2012/0047277 A1 | 2/2012 | Keidar et al. |
| 2012/0054300 A1 | 3/2012 | Marchwicki et al. |
| 2012/0054440 A1 | 3/2012 | Doig et al. |
| 2012/0069131 A1 | 3/2012 | Abelow |
| 2012/0072291 A1 | 3/2012 | Bharat |
| 2012/0072420 A1 | 3/2012 | Moganti et al. |
| 2012/0076049 A1 | 3/2012 | Rudolf et al. |
| 2012/0084814 A1 | 4/2012 | Olague et al. |
| 2012/0086857 A1 | 4/2012 | Kim et al. |
| 2012/0089700 A1 | 4/2012 | Safruti et al. |
| 2012/0101907 A1 | 4/2012 | Dodda |
| 2012/0102515 A1 | 4/2012 | Ramaswamy |
| 2012/0109755 A1 | 5/2012 | Birch et al. |
| 2012/0124498 A1 | 5/2012 | Santoro et al. |
| 2012/0130822 A1 | 5/2012 | Patwa et al. |
| 2012/0130825 A1 | 5/2012 | Evans |
| 2012/0131095 A1 | 5/2012 | Luna et al. |
| 2012/0144416 A1 | 6/2012 | Wetzer et al. |
| 2012/0150944 A1 | 6/2012 | Steelberg et al. |
| 2012/0151015 A1 | 6/2012 | Plastina et al. |
| 2012/0151521 A1 | 6/2012 | Gilley et al. |
| 2012/0159542 A1 | 6/2012 | Minwalla |
| 2012/0163770 A1 | 6/2012 | Kaiser et al. |
| 2012/0163776 A1 | 6/2012 | Hassell et al. |
| 2012/0167001 A1 | 6/2012 | Ortiz et al. |
| 2012/0167132 A1 | 6/2012 | Mathews et al. |
| 2012/0174155 A1 | 7/2012 | Mowrey et al. |
| 2012/0191716 A1 | 7/2012 | Omoigui |
| 2012/0207402 A1 | 8/2012 | Stojancic et al. |
| 2012/0209706 A1 | 8/2012 | Ramer et al. |
| 2012/0209726 A1 | 8/2012 | Dean et al. |
| 2012/0210224 A1 | 8/2012 | Wong et al. |
| 2012/0215622 A1 | 8/2012 | Ramer et al. |
| 2012/0233163 A1 | 9/2012 | Kirkpatrick |
| 2012/0240151 A1 | 9/2012 | Tapper |
| 2012/0245722 A1 | 9/2012 | Yamamura |
| 2012/0257110 A1 | 10/2012 | Amundsen |
| 2012/0260184 A1 | 10/2012 | Dawes et al. |
| 2012/0265616 A1 | 10/2012 | Cao et al. |
| 2012/0272134 A1 | 10/2012 | Steelberg et al. |
| 2012/0278825 A1 | 11/2012 | Tran et al. |
| 2012/0280908 A1 | 11/2012 | Rhoads et al. |
| 2012/0284746 A1 | 11/2012 | Evans et al. |
| 2012/0284757 A1 | 11/2012 | Rajapakse |
| 2012/0297406 A1 | 11/2012 | Bartholomay et al. |
| 2012/0303710 A1 | 11/2012 | Roberts et al. |
| 2012/0311074 A1 | 12/2012 | Arini et al. |
| 2012/0311629 A1 | 12/2012 | Zaslavsky et al. |
| 2012/0311702 A1 | 12/2012 | Krstic et al. |
| 2012/0315014 A1 | 12/2012 | Shuster |
| 2012/0317175 A1 | 12/2012 | Husain et al. |
| 2012/0317178 A1 | 12/2012 | Husain et al. |
| 2012/0317181 A1 | 12/2012 | Husain et al. |
| 2012/0324495 A1 | 12/2012 | Matthews et al. |
| 2012/0324566 A1 | 12/2012 | Baum et al. |
| 2013/0013665 A1 | 1/2013 | Sng et al. |
| 2013/0019262 A1 | 1/2013 | Bhatia et al. |
| 2013/0019268 A1 | 1/2013 | Fitzsimmons et al. |
| 2013/0036434 A1 | 2/2013 | Shkedi et al. |
| 2013/0041664 A1 | 2/2013 | McKoen et al. |
| 2013/0042262 A1 | 2/2013 | Riethmueller |
| 2013/0045681 A1 | 2/2013 | Dua |
| 2013/0051300 A1 | 2/2013 | He et al. |
| 2013/0055309 A1 | 2/2013 | Dittus |
| 2013/0060905 A1 | 3/2013 | Mickens et al. |
| 2013/0061259 A1 | 3/2013 | Raman et al. |
| 2013/0061267 A1 | 3/2013 | Cansino et al. |
| 2013/0078946 A1 | 3/2013 | Pecen et al. |

(56) References Cited

U.S. PATENT DOCUMENTS

| | | |
|---|---|---|
| 2013/0080242 A1 | 3/2013 | Alhadeff et al. |
| 2013/0085865 A1 | 4/2013 | Zhou et al. |
| 2013/0094423 A1 | 4/2013 | Wengrovitz et al. |
| 2013/0104160 A1 | 4/2013 | Beeson et al. |
| 2013/0104232 A1 | 4/2013 | Johnson et al. |
| 2013/0117782 A1 | 5/2013 | Mehta et al. |
| 2013/0139209 A1 | 5/2013 | Urrabazo et al. |
| 2013/0139210 A1 | 5/2013 | Huang et al. |
| 2013/0151728 A1 | 6/2013 | Currier |
| 2013/0185153 A1 | 7/2013 | Howcroft |
| 2013/0185422 A1 | 7/2013 | Rogers et al. |
| 2013/0202150 A1 | 8/2013 | Sinha et al. |
| 2013/0205317 A1 | 8/2013 | Sinha et al. |
| 2013/0205319 A1 | 8/2013 | Sinha et al. |
| 2013/0205348 A1 | 8/2013 | Hudson et al. |
| 2013/0238702 A1 | 9/2013 | Sheth et al. |
| 2013/0254884 A1 | 9/2013 | Dalcher et al. |
| 2013/0263166 A1 | 10/2013 | Fleischman |
| 2013/0290502 A1 | 10/2013 | Bilobrov et al. |
| 2013/0297727 A1 | 11/2013 | Levy |
| 2013/0311168 A1 | 11/2013 | Li |
| 2013/0318157 A1 | 11/2013 | Harrison |
| 2013/0326554 A1 | 12/2013 | Shkedi |
| 2013/0340011 A1 | 12/2013 | Rodriguez |
| 2013/0340050 A1 | 12/2013 | Harrison |
| 2014/0002247 A1 | 1/2014 | Harrison et al. |
| 2014/0007155 A1 | 1/2014 | Vemparala et al. |
| 2014/0007156 A1 | 1/2014 | Navin et al. |
| 2014/0007157 A1 | 1/2014 | Harrison et al. |
| 2014/0007162 A1 | 1/2014 | Harrison |
| 2014/0007187 A1 | 1/2014 | Harrison |
| 2014/0007262 A1 | 1/2014 | Metsäpelto et al. |
| 2014/0029847 A1 | 1/2014 | Frye et al. |
| 2014/0032286 A1 | 1/2014 | Lansford et al. |
| 2014/0040027 A1 | 2/2014 | Anderson et al. |
| 2014/0040443 A1 | 2/2014 | Syu et al. |
| 2014/0047480 A1 | 2/2014 | Knudson et al. |
| 2014/0074621 A1 | 3/2014 | Chai et al. |
| 2014/0074839 A1 | 3/2014 | Popp et al. |
| 2014/0082663 A1 | 3/2014 | Neumeier et al. |
| 2014/0090008 A1 | 3/2014 | Li et al. |
| 2014/0130076 A1 | 5/2014 | Moore et al. |
| 2014/0141714 A1 | 5/2014 | Ghosh et al. |
| 2014/0143043 A1 | 5/2014 | Wickramasuriya et al. |
| 2014/0150006 A1 | 5/2014 | Vemparala et al. |
| 2014/0181856 A1 | 6/2014 | Lewis |
| 2014/0184827 A1 | 7/2014 | Chartrand |
| 2014/0195584 A1 | 7/2014 | Harrison |
| 2014/0195620 A1 | 7/2014 | Srinivasan et al. |
| 2014/0195649 A1 | 7/2014 | Harrison |
| 2014/0195690 A1 | 7/2014 | Harrison et al. |
| 2014/0195934 A1 | 7/2014 | Harrison |
| 2014/0196085 A1 | 7/2014 | Dunker et al. |
| 2014/0201645 A1 | 7/2014 | Mo et al. |
| 2014/0201769 A1 | 7/2014 | Neumeier et al. |
| 2014/0201772 A1 | 7/2014 | Neumeier et al. |
| 2014/0201773 A1 | 7/2014 | Neumeier et al. |
| 2014/0201774 A1 | 7/2014 | Neumeier et al. |
| 2014/0201787 A1 | 7/2014 | Neumeier et al. |
| 2014/0218620 A1 | 8/2014 | Griffin et al. |
| 2014/0229271 A1 | 8/2014 | Clapp et al. |
| 2014/0237496 A1 | 8/2014 | Julian |
| 2014/0244351 A1 | 8/2014 | Symons |
| 2014/0244863 A1 | 8/2014 | Bradley et al. |
| 2014/0280304 A1 | 9/2014 | Scherf et al. |
| 2014/0282673 A1 | 9/2014 | Neumeier et al. |
| 2014/0282735 A1 | 9/2014 | Davis et al. |
| 2014/0289315 A1 | 9/2014 | Harrison |
| 2015/0003799 A1 | 1/2015 | Oostveen et al. |
| 2015/0074526 A1 | 3/2015 | Brenner et al. |
| 2015/0074703 A1 | 3/2015 | Cremer et al. |
| 2015/0082331 A1 | 3/2015 | Neumeier et al. |
| 2015/0089526 A1 | 3/2015 | Gordon |
| 2015/0095972 A1 | 4/2015 | Sharma et al. |
| 2015/0178280 A1 | 6/2015 | DiMaria et al. |
| 2015/0181263 A1 | 6/2015 | Gordon |
| 2015/0181268 A1 | 6/2015 | Navin et al. |
| 2015/0181311 A1 | 6/2015 | Navin et al. |
| 2015/0194151 A1 | 7/2015 | Jeyachandran et al. |
| 2015/0195597 A1 | 7/2015 | Gordon |
| 2015/0228306 A1 | 8/2015 | Roberts et al. |
| 2015/0229690 A1 | 8/2015 | Raesig et al. |
| 2015/0245090 A1 | 8/2015 | Davis et al. |
| 2015/0262229 A1 | 9/2015 | Brenner et al. |
| 2015/0302086 A1 | 10/2015 | Roberts et al. |
| 2015/0331660 A1 | 11/2015 | Kalampoukas et al. |
| 2015/0331661 A1 | 11/2015 | Kalampoukas et al. |
| 2015/0331938 A1 | 11/2015 | Kalampoukas et al. |
| 2015/0332669 A1 | 11/2015 | Kalampoukas et al. |
| 2015/0332687 A1 | 11/2015 | Kalampoukas et al. |
| 2015/0350725 A1 | 12/2015 | Zhu et al. |
| 2015/0356178 A1 | 12/2015 | Scherf et al. |
| 2015/0365456 A1 | 12/2015 | Harrison |
| 2016/0007083 A1 | 1/2016 | Gurha |
| 2016/0019598 A1 | 1/2016 | Harrison |
| 2016/0019876 A1 | 1/2016 | Jeffrey et al. |
| 2016/0110537 A1 | 4/2016 | Harrison |
| 2016/0112770 A1 | 4/2016 | Harrison |
| 2016/0124953 A1 | 5/2016 | Cremer et al. |
| 2016/0139756 A1 | 5/2016 | Benson et al. |
| 2016/0140122 A1 | 5/2016 | Harrison |
| 2016/0182971 A1 | 6/2016 | Ortiz |
| 2016/0196105 A1 | 7/2016 | Vartakavi et al. |
| 2016/0196270 A1 | 7/2016 | DiMaria et al. |
| 2016/0196344 A1 | 7/2016 | Cremer et al. |
| 2016/0217799 A1 | 7/2016 | Han et al. |
| 2016/0241540 A1 | 8/2016 | Jeffrey et al. |
| 2016/0267180 A1 | 9/2016 | Harron et al. |
| 2016/0323533 A1 | 11/2016 | Nagorski et al. |
| 2016/0373197 A1 | 12/2016 | Brenner et al. |

FOREIGN PATENT DOCUMENTS

| | | |
|---|---|---|
| CA | 2884534 A1 | 3/2014 |
| CN | 1726489 A | 1/2006 |
| CN | 101147378 A | 3/2008 |
| CN | 101622599 A | 1/2010 |
| CN | 101909201 B | 6/2013 |
| DE | 69815695 T2 | 6/2004 |
| DE | 602004008936 T2 | 6/2008 |
| EP | 1010098 A2 | 6/2000 |
| EP | 1010098 B1 | 6/2003 |
| EP | 1324567 A2 | 7/2003 |
| EP | 1324567 A3 | 8/2003 |
| EP | 1347661 A1 | 9/2003 |
| EP | 1410380 A2 | 4/2004 |
| EP | 1421521 A2 | 5/2004 |
| EP | 1573462 A3 | 10/2005 |
| EP | 1592198 A1 | 11/2005 |
| EP | 1605416 A1 | 12/2005 |
| EP | 1779659 A1 | 5/2007 |
| EP | 1803270 A1 | 7/2007 |
| EP | 1934828 A2 | 6/2008 |
| EP | 1362485 B1 | 8/2008 |
| EP | 1934828 A4 | 10/2008 |
| EP | 2001583 A2 | 12/2008 |
| EP | 1550297 B1 | 3/2009 |
| EP | 2100216 A2 | 9/2009 |
| EP | 1314110 B1 | 10/2009 |
| EP | 2100216 A4 | 12/2009 |
| EP | 2136306 A1 | 12/2009 |
| EP | 1324567 B1 | 1/2010 |
| EP | 2145411 A2 | 1/2010 |
| EP | 2169854 A1 | 3/2010 |
| EP | 1410380 B1 | 4/2010 |
| EP | 1797552 B1 | 4/2010 |
| EP | 2206114 A1 | 7/2010 |
| EP | 2001583 A4 | 9/2010 |
| EP | 2226757 A1 | 9/2010 |
| EP | 2206114 A4 | 7/2012 |
| EP | 1887754 B1 | 12/2012 |
| EP | 2541961 A2 | 1/2013 |
| EP | 2136306 B1 | 3/2013 |
| EP | 2541961 A3 | 4/2013 |

(56) References Cited

FOREIGN PATENT DOCUMENTS

| | | |
|---|---|---|
| EP | 1969810 B2 | 8/2013 |
| EP | 2520084 A4 | 11/2013 |
| EP | 2285066 B1 | 5/2014 |
| EP | 2747370 A1 | 6/2014 |
| EP | 2200258 B1 | 11/2014 |
| EP | 2895971 A2 | 7/2015 |
| EP | 2944051 A1 | 11/2015 |
| EP | 2895971 A4 | 5/2016 |
| EP | 3084646 A1 | 10/2016 |
| EP | 2944051 A4 | 11/2016 |
| EP | 3090330 A1 | 11/2016 |
| EP | 3090429 A1 | 11/2016 |
| EP | 3117390 A1 | 1/2017 |
| GB | 2457694 A | 8/2009 |
| JP | 2007220137 A | 8/2007 |
| JP | 2007257820 A | 10/2007 |
| JP | 2007280382 A | 10/2007 |
| JP | 2009075603 A | 4/2009 |
| JP | 2013013092 A | 1/2013 |
| KR | 20030005279 A | 1/2003 |
| KR | 20040021684 A | 3/2004 |
| KR | 20040024870 A | 3/2004 |
| KR | 20040029452 A | 4/2004 |
| KR | 20040086350 A | 10/2004 |
| KR | 20050046815 A | 5/2005 |
| KR | 20050061566 A | 6/2005 |
| KR | 20050061594 A | 6/2005 |
| KR | 20050086470 A | 8/2005 |
| KR | 20050113614 A | 12/2005 |
| KR | 20050117558 A | 12/2005 |
| KR | 20070095282 A | 9/2007 |
| KR | 20080043358 A | 5/2008 |
| KR | 100961461 B1 | 6/2010 |
| KR | 101487639 B1 | 1/2015 |
| KR | 20150054861 A | 5/2015 |
| KR | 20150106904 A | 9/2015 |
| KR | 1020160101979 A | 8/2016 |
| KR | 20160135751 A | 11/2016 |
| WO | 1995012278 A1 | 5/1995 |
| WO | 2000052929 A1 | 9/2000 |
| WO | 2000054504 A1 | 9/2000 |
| WO | 2001044992 A1 | 6/2001 |
| WO | 2001082625 A1 | 11/2001 |
| WO | 2001089213 A1 | 11/2001 |
| WO | 2001089217 A1 | 11/2001 |
| WO | 200231742 A2 | 4/2002 |
| WO | 2002061652 A2 | 8/2002 |
| WO | 2003009277 A2 | 1/2003 |
| WO | 2003012695 A2 | 2/2003 |
| WO | 2003019560 A2 | 3/2003 |
| WO | 2003025762 A1 | 3/2003 |
| WO | 2003009277 A3 | 9/2003 |
| WO | 2003019560 A3 | 1/2004 |
| WO | 2003012695 A3 | 3/2004 |
| WO | 2004040416 A2 | 5/2004 |
| WO | 2004044820 A1 | 5/2004 |
| WO | 2005041455 A1 | 5/2005 |
| WO | 2005050620 A1 | 6/2005 |
| WO | 2004040416 A3 | 8/2005 |
| WO | 2005125198 A2 | 12/2005 |
| WO | 2006018790 A1 | 2/2006 |
| WO | 2006041928 A1 | 4/2006 |
| WO | 2007022533 A2 | 2/2007 |
| WO | 2007022533 A3 | 6/2007 |
| WO | 2007103583 A2 | 9/2007 |
| WO | 2007114796 A1 | 10/2007 |
| WO | 2008029188 A1 | 3/2008 |
| WO | 2007103583 A3 | 5/2008 |
| WO | 2008052205 A2 | 5/2008 |
| WO | 2008086104 A2 | 7/2008 |
| WO | 2008086104 A3 | 8/2008 |
| WO | 2008112858 A1 | 9/2008 |
| WO | 2008131247 A1 | 10/2008 |
| WO | 2008137756 A2 | 11/2008 |
| WO | 2009023647 A1 | 2/2009 |
| WO | 2009042858 A1 | 4/2009 |
| WO | 2009091338 A1 | 7/2009 |
| WO | 2009114622 A2 | 9/2009 |
| WO | 2009131861 A2 | 10/2009 |
| WO | 2009132084 A1 | 10/2009 |
| WO | 2008137756 A3 | 12/2009 |
| WO | 2009150425 A2 | 12/2009 |
| WO | 2010022000 A2 | 2/2010 |
| WO | 2010046123 A1 | 4/2010 |
| WO | 2010054222 A1 | 5/2010 |
| WO | 2010072986 A2 | 7/2010 |
| WO | 2010129693 A1 | 11/2010 |
| WO | 2010151421 A1 | 12/2010 |
| WO | 2011011002 A1 | 1/2011 |
| WO | 2011030231 A1 | 3/2011 |
| WO | 2011090540 A2 | 7/2011 |
| WO | 2011090541 A2 | 7/2011 |
| WO | 2012005994 A1 | 1/2012 |
| WO | 2012013893 A1 | 2/2012 |
| WO | 2012021538 A1 | 2/2012 |
| WO | 2012028976 A1 | 3/2012 |
| WO | 2012051115 A1 | 4/2012 |
| WO | 2012109666 A1 | 8/2012 |
| WO | 2012120253 A1 | 9/2012 |
| WO | 2012151026 A1 | 11/2012 |
| WO | 2012154541 A1 | 11/2012 |
| WO | 2013028899 A1 | 2/2013 |
| WO | 2013032787 A1 | 3/2013 |
| WO | 2013068619 A1 | 5/2013 |
| WO | 2013089674 A1 | 6/2013 |
| WO | 2013147587 A1 | 10/2013 |
| WO | 2014042826 A2 | 3/2014 |
| WO | 2014052015 A1 | 4/2014 |
| WO | 2014042826 A3 | 5/2014 |
| WO | 2014107311 A1 | 7/2014 |
| WO | 2014142758 A1 | 9/2014 |
| WO | 2014145929 A1 | 9/2014 |
| WO | 2014145938 A1 | 9/2014 |
| WO | 2014145947 A1 | 9/2014 |
| WO | 2015094558 A1 | 6/2015 |
| WO | 2015102921 A1 | 7/2015 |
| WO | 2015103384 A1 | 7/2015 |
| WO | 2015138601 A1 | 9/2015 |
| WO | 2015167901 A1 | 11/2015 |
| WO | 2015183914 A1 | 12/2015 |
| WO | 2016018472 A2 | 2/2016 |
| WO | 2016018472 A3 | 3/2016 |
| WO | 2016109500 A1 | 7/2016 |
| WO | 2016109553 A2 | 7/2016 |
| WO | 2016109682 A2 | 7/2016 |
| WO | 2016109553 A3 | 8/2016 |
| WO | 2016109682 A3 | 9/2016 |

OTHER PUBLICATIONS

"HTML & CSS: The Complete Reference", The McGraw-Hill Companies, 2010 by Thomas A. Powell (pp. 857) http://www.pdfiles.com/pdf/files/English/Web_Apps_Programming_&_Internet/HTML_&_CSS_The_Complete_Reference.pdf.

"Web Services Essentials", O'Reilly, Feb. 2002 by Ethan Cerami (pp. 286) http://spurrier.gatorglory.com/PDFs/O'Reilly%20-%20Web%20Services%20Essentials.pdf.

"UPnP Device Architecture 1.0", UPnP Forum, Oct. 15, 2008 (pp. 81) http://upnp.org/specs/arch/UPnP-arch-DeviceArchitecture-v1.0.pdf.

"Mac OS X Snow Leopard: The Missing Manual", O'Reilly Media, Inc., 2009 by David Pogue (pp. 903) http://crypto.cs.mcgill.ca/~simonpie/webdav/ipad/EBook/MacOSX/Mac%20OS%20X%20Snow%20Leopard%20The%20Missing%20Manual.pdf.

"The Common Object Request Broker: Architecture and Specification Revision 2.0", Feb. 1997 (pp. 634) http://www.omg.org/spec/CORBA/2.0./PDF.

"Internet: The Complete Reference", Tata McGraw-Hill Education Pvt. Ltd., 2002 by Margaret Levine Young http://www.abebooks.com/Internet-Complete-Reference-Second-Edition-Margaret/5122896620/bd.

(56) References Cited

OTHER PUBLICATIONS

"HTML 4.0 Sourcebook", John Wiley & Sons, Apr. 1998 by Ian S. Graham (pp. 656) http://www.wiley.com/WileyCDA/WileyTitle/productCd-0471257249.html.
"Zero Configuration Networking: The Definitive Guide", O'Reilly Media, Dec. 2005 by Daniel H Steinberg et al. (pp. 254) http://shop.oreilly.com/product/9780596101008.do#tab_04_2.
https://web.archive.org/web/20110722022038/http://www.flingo.tv/.
https://web.archive.org/web/20120616002448/http://www.flingo.tv/.
https://web.archive.org/web/20130423033122/http://flingo.tv/.
https://web.archive.org/web/20101015033305/http://flingo.org/.
https://web.archive.org/web/20110609062427/http://www.flingo.org/.
"WAP Architecture" by Wireless Application Protocol Forum, Published on Jul. 12, 2001 (pp. 24) http://www.openmobilealliance.org/tech/affiliates/wap/wap-210-waparch-20010712-a.pdf.
"EFI Framework" by Wireless Application Protocol Forum, Published on Dec. 17, 2001 (pp. 50) http://www.openmobilealliance.org/tech/affiliates/wap/wap-231-efi-20011217-a.pdf.
"Push OTA Protocol" by Wireless Application Protocol Forum, Published on Apr. 25, 2001 (pp. 44) http://www.openmobilealliance.org/tech/affiliates/wap/wap-235-pushota-20010425-a.pdf.
"Pandora on the iPhone" uploaded on YouTube on Jul. 14, 2008 by Radiopandora, found online on May 24, 2017 (pp. 28) https://www.youtube.com/watch?v=tNMSntXtPc0.
"Pioneer Brings Pandora into Your Car" uploaded on YouTube on Aug. 4, 2010 by Pioneerelectronics, found online on May 24, 2017 (pp. 16) https://www.youtube.com/watch?v=HdyOKPhBoi4.
"iDA-X305S: Control Pandora from your dash" uploaded on YouTube on Mar. 26, 2010 by AlpineTV, found online on May 24, 2017 (pp. 14) https://www.youtube.com/watch?v=8TkWI_ILVzU.
"Sync + Retarget, Extend your TV campaign to all screen in real-time" by Samba TV, found online on May 24, 2017 (pp. 4) https://samba.tv/advertising/sync-retarget/.
"Pandora system everywhere", by Pandora, found online on May 24, 2017 (pp. 9) https://www.pandora.com/everywhere.
Title: Content Interaction Methods and Systems Employing Portable Devices, U.S. Appl. No. 61/112,573, Name of inventor: Bruce L. Davis, filed Nov. 7, 2008.
Title: Second Screen Methods and Arrangements, U.S. Appl. No. 61/152,226, Name of inventor: Bruce L. Davis, filed Feb. 12, 2009.
Title: Second Screen Methods and Arrangements, U.S. Appl. No. 61/160,660, Name of inventor: Bruce L. Davis, filed Mar. 16, 2009.
Title: Second Screen Methods and Arrangements, U.S. Appl. No. 61/167,828, Name of Inventor: Bruce L. Davis, filed Apr. 8, 2009.
"Cognitive Radio Technology", from the Guest Editor in IEEE Signal Processing Magazine on Nov. 2008 by Maria Gabriella di Benedetto et al. (p. 1) http://ieeexplore.ieee.org/stamp/stamp.jsp?arnumber=4644050.
"Automated Content Recognition creating content aware ecosystems", in CSI Magazine in Sep. 2012 (pp. 16) http://www.csimagazine.com/csi/whitepapers/ACR%20Creating%20%20content-aware%20ecosystems%20-Civolution%20White%20Paper%20-%20Sept%202012.pdf.
"A Confidence Based Recognition System for TV Commercial Extraction", in 2008 by Yijun Li et al. (pp. 8) http://crpit.com/confpapers/CRPITV75Li.pdf.
"Flingo is about to make your smart TV even smarter", Jul. 7, 2011, by Ryan Lawler (pp. 6) https://gigaom.com/2011/07/07/flingo-launch/.
"The TV That Watches You", Aug. 19, 2011, by Tom Simonite (pp. 5) https://www.technologyreview.com/s/425081/the-tv-that-watches-you/.
"TV Retargeting", Market View, wywy—Maximizing TV Advertising ROI, Dec. 31, 2015 (pp. 2) http://wywy.com/market-view/tv-retargeting/.
"The New Age of Second Screen: Enabling Interaction", admonsters webpage, Jun. 5, 2013, Joshua R. Weaver (pp. 3) https://www.admonsters.com/blog/second-screen-enabling-interaction.
"Complaint for Patent Infringement", Case 2:15-cv-01725-RWS Document 1, Nov. 6, 2015 (pp. 7).
"Secure Browsing with Ceedo", Ceedo Flexible computing (pp. 2).
"Sandboxes and Silver Bullets: Vendors Promote New/Old Detection Techniques to Stop Zero-Day Threats", IT Current Analysis Connection Blogs, Mar. 29, 2013 by Paula Musich (p. 1) http://itcblogs.currentanalysis.com/2013/03/29/sandboxes-and-silver-bullets-vendors-promote-newold-detection-techniques-to-stop-zero-day-threats/.
"Introduction to security" (pp. 8) http://help.adobe.com/en_US/flex/using/WS2db454920e96a9e51e63e3d11c0bf6167e-7fff.html#WS2db454920e96a9e51e63e3d11c0bf6167e-7ff9.
"Screenshot of Wikipedia page of Samba TV", Jan. 5, 2015 (pp. 2) http://en.wikipedia.org/wiki/Samba_TV.
"Screenshot of Wikipedia page of Smart TV", Jan. 5, 2015 (pp. 4) http://en.wikipedia.org/wiki/Smart_TV.
"Screenshot of Wikipedia page of interactive television", From Wikipedia, Jan. 5, 2015 (pp. 8) http://en.wikipedia.org/wiki/interactive_television.
"Screenshot of Wikipedia page of Social television", From Wikipedia, Jan. 5, 2015 (pp. 3) http://en.wikipedia.org/wiki/Social_television.
"Screenshot of Wikipedia page of Enhanced TV", From Wikipedia, Jan. 5, 2015 (p. 1) http://en.wikipedia.org/wiki/Enhanced_TV.
"Screenshot of Wikipedia page of Digital video fingerprinting", From Wikipedia, Jan. 5, 2015 (pp. 4) http://en.wikipedia.org/wiki/Digital_video_fingerprinting.
"Screenshot of Wikipedia page of Second screen", From Wikipedia, Jan. 5, 2015 (pp. 3) http://en.wikipedia.org/wiki/Second_screen.
Reverse Sandboxing with SafeCentral, SafeCentral (pp. 3) http://www.safecentral.com/pdfs/ReverseSandboxing.pdf.
"Collect, Manage, and Analyze everything occurring on your network", RSA Security Analytics, Detect & Investigate Threats. (pp. 5) http://www.emc.com/collateral/data-sheet/security-analytics-infrastructure-ds.pdf.
"Metazen—metadata capture for metagenomes", Standards in Genomic Sciences, by Jared Bischof et al. (pp. 6) http://www.standardsingenomics.com/content/pdf/1944-3277-9-18.pdf.
"Semantic Annotation of Images and Videos for Multimedia Analysis", by Stephan Bloehdorn et al. (pp. 15) http://image.ntua.gr/papers/345.pdf
"Architecture for Interoperability of Services between an ACAP Receiver and Home Networked Devices", Jan. 15, 2006, by Yu-Seok Bac et al. (pp. 6).
"Smart SoftPhone Device for Networked AudioVisual QoS/QoE Discovery & Measurement", Digital Media Laboratory, Information and Communications University, Republic of Korea, by Jinsul Kim, (pp. 23) http://cdn.intechopen.com/pdfs-wm/5446.pdf.
"Market Potential for Interactive Audio-visual Media", IEEE Xplore, by Andra Leurdijk et al., (p. 1) http://ieeexplore.ieee.org/xpl/login.jsp?tp=&arnumber=1592082&url=http%3A%2F%2Fieeexplore.ieee.org%2Fxpls%2Fabs_all.jsp%3Farnumber%3D1592082.
"Design of a multi-sender 3D videoconferencing application over an end system multicast protocl". '03 Proceedings of the eleventh ACM international conference on Multimedia, New York, NY, USA, 2003 by Mojtaba Hosseini et al., (p. 1) http://dl.acm.org/citation.cfm?id=957119.
"Cisco Medianet Data Sheet", Cisco 3900 Series Integrated Services Routers, (p. 8) http://www.cisco.com/c/en/us/products/collateral/routers/3900-series-integrated-services-routers-isr/data_sheet_c78-612429.html.
"Delivery of Personalized and Adaptive Content to Mobile Devices: A Framework and Enabling Technology", Communications of the Association for Information Systems (vol. 12, 2003)183-202, By D. Zhang, (pp. 22) http://aisel.aisnet.org/cgi/viewcontent.cgi?article=3178&context=cais.
"Single Sign-On for Java Web Start Applications Using MyProxy", by Terry Fleury et al. (pp. 7) http://grid.ncsa.illinois.edu/papers/sws-myproxy-jws.pdf.
"MonALISA : A Distributed Monitoring Service Architecture", CHEP03, La Jolla, California, Mar. 24-28, 2003 by H.B. Newman et al. (pp. 8) http://monalisa.caltech.edu/documentation/MOET001.pdf.
"Exploratory geospatial analysis using GeoVISTA Studio: from a desktop to the Web", IEEE Xplore, Dec. 3-6, 2001, by M. Takatsuka

(56) References Cited

OTHER PUBLICATIONS et al. (p. 1) http://ieeexplore.ieee.org/xpl/login.jsp?tp=&arnumber=996715&url=http%3A%2F%2Fieeexplore.ieee.org%2Fxpls%2Fabs_all.jsp%3Farnumber%3D996715.
"Comprehensive Multi-platform Collaboration", Department of Computer Science, Columbia University, by kundan Singh et al. (p. 36) http://www.cs.columbia.edu/~library/TR-repository/reports/reports-2003/cucs-027-03.pdf.
"Privacy-Preserving Remote Diagnostics", The University of Texas at Austin, by Justin Brickell et al. (pp. 10) https://www.cs.utexas.edu/~shmat/shmat_ccs07.pdf.
"Supporting Dynamic Ad hoc Collaboration Capabilities", LBNL, Berkeley, CA 94720, USA, by D. Agarwal et al. (pp. 6) http://arxiv.org/ftp/cs/papers/0307/0307037.pdf.
"A Framework for Classifying Peer-to-Peer Technologies", IEEE Xplore, May 21-24, 2002, by K. Kant et al. (p. 1) http://ieeexplore.ieee.org/xpl/login.jsp?tp=&arnumber=1540491&url=http%3A%2F%2Fieeexplore.ieee.org%2Fiel5%2F10335%2F32898%2F01540491.pdf%3Farnumber%3D1540491.
U.S. Appl. No. 61/112,573, Content Interaction Methods and Systems Employing Portable Devices, filed Nov. 7, 2008.
U.S. Appl. No. 61/152,226, Second Screen Methods and Arrangements, filed Feb. 12, 2009.
U.S. Appl. No. 61/160,660, Second Screen Methods and Arrangements, filed Mar. 16, 2009.
U.S. Appl. No. 61/167,828, Second Screen Methods and Arrangements, filed Apr. 8, 2009.
"Security in the Large: Is Java's Sandbox Scalable?", HP Hewlett Packard Apr. 1998, by Qun Zhong et al.(pp. 9) http://www.hpl.hp.com/techreports/98/HPL-98-79.pdf.
"For Developers", Flingo Article, Oct. 2010, by Flingo https://web.archive.org/web/20101028221214/flingo.org/developers.html.
"Anomaly Detection in Dynamic Execution Environments", NSPW 2002, by Hajime Inoue et al. (pp. 9) http://www.nspw.org/papers/2002/nspw2002-inoue.pdf.
"IPhone Security Analysis", Department of Computer Science San Jose State University, May 2008, by Vaibhav Pandya. (pp. 44) http://www.cs.sjsu.edu/faculty/stamp/students/pandya_vaibhav.pdf.
"I, Me and My Phone: Identity and Personalization using Mobile Devices", HP Invest, Nov. 2007 by Riddhiman Ghosh et al. (pp. 14) http://www.hpl.hp.com/techreports/2007/HPL-2007-184.pdf.
"Extending the web to support personal network services", SAC '13, Mar. 2013, by John Lyle et al. (pp. 6) https://www.cs.ox.ac.uk/files/5273/sac2013.pdf.
"Java and Java Virtual Machine Security Vulnerabilities and their Exploitation Techniques", Black Hat Briefings, Singapore, Oct. 2002, by Delirium. (pp. 91) http://www.blackhat.com/presentations/bh-asia-02/LSD/bh-asia-02-lsd.pdf.
"Shazam Announces Application for iPhone", by Shazam, Jul. 2008. http://news.shazam.com/pressreleases/shazam-announces-application-for-iphone-890432.
"Shazam Launches Android Application Integrated with MySpace and Amazon MP3", by Shazam, Oct. 2008. http://news.shazam.com/pressreleases/shazam-launches-android-application-integrated-with-myspace-and-amazon-mp3-890456.
"The Shazam music recognition service",Communications of the ACM—Music information retrieval, Aug. 2006, by Shazam. https://www.researchgate.net/publication/220423945_The_Shazam_music_recognition_service.
"An Industrial-Strength Audio Search Algorithm", International Conference on Music Information Retrieval, 2003, by Avery Wang. https://www.ee.columbia.edu/~dpwe/papers/Wang03-shazam.pdf.
"It Just Works: UPnP in the Digital Home", The Journal of Spontaneous Networking, Oct. 2004, by Michael Jeronimo. http://www.artima.com/spontaneous/upnp_digihome.html.
"Data-Confined HTML5 Applications", European Symposium on Research in Computer Security, London Mar. 2013, by Devdatta Akhawe (pp. 18) http://devd.me/papers/dcs-esorics.pdf.

"A Component-based Software Infrastructure for Ubiquitous Computing", Parallel and Distributed Computing, 2005, by Areski Flissi et al. (pp. 22) http://www.lifl.fr/ispdc2005/presentations/flissi_ispdc_slides.pdf.
"A robust image fingerprinting system using the Radon transform", Signal Processing: Image Communication 19 (2004) 325-339, May 2004, by Jin Seo et al. http://www.123seminarsonly.com/Seminar-Reports/027/60224236-Finger-Printing.pdf.
"An Authentication and Authorization Architecture for Jini Services", CiteSeer, by Oct. 2000, by Thomas Schoch et al. http://www.vs.inf.ethz.ch/publ/papers/da-schoch.pdf.
"Analysis and Prediction of Set-Top-Box Reliability in Multi-Application Environments using Artificial Intelligence Techniques", Spring Technical Forum, 2004,Louis Slothouber et al. (pp. 9) file:///C:/Users/User/Downloads/2004-analysis-and-prediction-of-set-top-box-reliability-in-multi-application-environments-using-artificial-intelligence-techniques%20(1).pdf.
"Artificial Intelligence in Cable TV Application", Advancing Technology's Agends, Louis Slothouber et al., 2003, (pp. 8) file:///C:/Users/User/Downloads/2003-artificial-intelligence-in-cable-tv-applications%20(2).pdf.
"Exploiting Cross Context Scripting Vulnerabilities in Firefox", Security-Assessment.com Addendum, Apr. 2010, by Nick Freeman et al. (pp. 8) http://www.security-assessment.com/files/whitepapers/Exploiting_Cross_Context_Scripting_vulnerabilities_in_Firefox.pdf.
"Design and Implementation of Fingerprinting-based Broadcasting Content Identification System", Creative Content Research Laboratory, ETRI(Electronics and Telecommunications Research Institute), Feb. 2014, by Jihyun Park et al. http://www.icact.org/upload/2014/0249/20140249_biography.pdf.
"Efficient Software-Based Fault Isolation", SOSP '93 Proceedings of the fourteenth ACM symposium on Operating systems principles, Dec. 1993, by Robert Wahbe et al. (pp. 14) https://crypto.stanford.edu/cs155/papers/sfi.pdf.
"Java and .NET Security",Secure Computer Systems, Oct. 2005 by Martin Russold et al. (pp. 6) https://www.it.uu.se/edu/course/homepage/sakdat/ht05/assignments/pm/programme/Java_and_NET.pdf.
"JAVA™ Web Start Overview", White Paper, May 2005, by Sun Microsystems, Inc. (pp. 14) http://www.oracle.com/technetwork/java/javase/jws-white-paper-150004.pdf.
"Programming the Grid with gLite", Enabling Grids for E-Science, Mar. 2006, by Laure et al. (pp. 18) http://cds.cern.ch/record/936685/files/egee-tr-2006-001.pdf.
"Shazam Turns Up the Volume on Mobile Music", Nov. 2007, by Shazam. http://news.shazam.com/pressreleases/shazam-turns-up-the-volume-on-mobile-music-890300.
"The Evolution of the JAVA Security Model", International Conference on Computer Systems and Technologies—CompSysTech'2005, by Nikolaj Cholakov et al. (pp. 6) http://ecet.ecs.uni-ruse.bg/cst05/Docs/cp/SIII/IIIB.12.pdf.
"The iPhone Developer's Cookbook—Building Applications with the iPhone SDK", Developer's Library, 2008, by Erica Sadun. (pp. 380) http://www.ebooksbucket.com/uploads/itprogramming/iosappdevelopment/The_iPhone_Developers_Cookbook.pdf.
"Towards Distributed Service Discovery in Pervasive Computing Environments", IEEE Transactions on Mobile Computing, vol. 5, No. , pp. 97-112, Feb. 2006, by Dipanjan Chakraborty. https://www.computer.org/csdl/trans/tm/2006/02/h0097-abs.html.
"Twisted Python and Bonjour", Indelible.org, Jan. 2009, by Parise. http://www.indelible.org/ink/twisted-bonjour/.
"UPnP in Digital Home Networking", Quest, by Quest Global Services; 2015. (pp. 7) https://www.quest-global.com/wp-content/uploads/2015/08/UPnP-in_Digital_Home_Networking.pdf.
"Cross Context Scripting with Firefox", Security-Assessment.com White Paper, Apr. 2010, by Roberto Liverani. (pp. 24) http://www.security-assessment.com/files/documents/whitepapers/Cross_Context_Scripting_with_Firefox.pdf.
"Vulnerabilities and Threats to Mobile Device Security From a Practitioner's Point of View", Issues in Information Systems, vol. XII, No. 2, pp. 181-193, 2011, by Joseph Laverty et al.. (pp. 13) http://iacis.org/iis/2011/181-193_AL2011_1693.pdf.

(56) References Cited

OTHER PUBLICATIONS

"Android (operating system)", Sep. 2008, by SPICE. (pp. 9) "http://www.si2imobility.com/spicemobiles/pdf/Support-%20FAQs/Android.pdf".

"Inglorious Installers: Security in the Application Marketplace", by Jonathan Anderson et al., Published on Jun. 7, 2010 (pp. 46) https://www.cl.cam.ac.uk/~fms27/papers/2010-AndersonBonStainglourious.pdf "Shazam Launches Android Application Integrated with MySpace and Amazon MP3", by Shazam, Published on Apr. 28, 2014 (pp. 2) https://www.slideshare.net/warychum9099/shazam-launches-android-application-integrated-with-myspace-and-amazon-mp3.

"Fingerprinting—More than Just Piracy Detection", by Ken Pyle, Published on Sep. 7, 2010 (p. 1) http://viodi.com/2010/09/07/fingerprinting/.

"Audio-Video Content Fingerprinting for Smart TV and Synchronous Mobile Content Identification", by Mihailo Stojancic, Published on Jun. 28, 2011 (pp. 50) http://sites.ieee.org/scv-ces/files/2015/06/Zeitera_IEEE_CE_SantaClara-5.pdf "New Tech Offers Ce Suppliers Ad Opportunities in Linear TV", by Screen Plays Magazine, Published on Oct. 20, 2010 (p. 1) http://www.screenplaysmag.com/2010/10/20/new-tech-offers-ce-suppliers-ad-opportunities-in-linear-tv/.

"Spate of ACR Initiatives Brings New Efficiencies to Ads & Apps", by Screen Plays Magazine, Published on May 4, 2011 (p. 2) http://www.screenplaysmag.com/2011/05/10/spate-of-acr-initiatives-brings-new-efficiencies-to-ads-apps/.

"Ensequence and Zeitera Partner to Enable TV Programmers and Advertisers to Deploy Synchronized Interactive Experiences on Tablets and Smartphones", by Ensequence, Published on Aug. 8, 2011 (pp. 2) http://www.marketwired.com/press-release/ensequence-zeitera-partner-enable-tv-programmers-advertisers-deploy-synchronized-1546996.htm.

"Ensequence Targets Second-Screen Apps With Zeitera", by Todd Spangler, Published on Aug. 8, 2011 (pp. 2) https://www.multichannel.com/news/ensequence-targets-second-screen-apps-zeitera-258185.

\* cited by examiner

DISCOVERY, ACCESS CONTROL, AND COMMUNICATION WITH NETWORKED SERVICES

CLAIM OF PRIORITY

This patent application is a Continuation Application of, and hereby incorporates the entirety of the disclosures of, and claims priority to, each of the following cases:
(1) Co-pending U.S. patent application Ser. No. 15/011,696 titled DISCOVERY, ACCESS CONTROL, AND COMMUNICATION WITH NETWORKED DEVICES filed on Feb. 1, 2016,
(2) U.S. Provisional Patent Application No. 62/183,756 titled SECOND SCREEN NETWORKING, TARGETING, AND COMMUNICATION METHODOLOGIES AND SYSTEMS filed on Jun. 24, 2015,
(3) U.S. Continuation-in-Part patent application Ser. No. 14/018,408 titled EXPOSURE OF PUBLIC INTERNET PROTOCOL ADDRESSES IN AN ADVERTISING EXCHANGE SERVER TO IMPROVE RELEVANCY OF ADVERTISEMENTS filed on Sep. 4, 2013 and issued as U.S. Pat. No. 9,589,456,
   a. which further claims priority to U.S. Provisional Patent Application No. 61/696,711 titled SYSTEMS AND METHODS OF RECOGNIZING CONTENT filed on Sep. 4, 2012, and
   b. which further claims priority to U.S. Provisional Patent Application No. 61/803,754 titled APPLICATIONS OF ZEROCONF BIDIRECTIONAL COMMUNICATIONS BETWEEN A NETWORKED DEVICE AND A SECURITY SANDBOX COMPRISING TARGETED ADVERTISEMENT, ENVIRONMENT AWARENESS, USER MAPPING, GEOLOCATION SERVICES, AND CONTENT IDENTIFICATION filed on Mar. 20, 2013,
(4) U.S. Continuation-in-Part patent application Ser. No. 14/981,938 titled RELEVANCY IMPROVEMENT THROUGH TARGETING OF INFORMATION BASED ON DATA GATHERED FROM A NETWORKED DEVICE ASSOCIATED WITH A SECURITY SANDBOX OF A CLIENT DEVICE filed on Dec. 29, 2015 and issued as U.S. Pat. No. 9,519,772,
   a. which is a U.S. Continuation-in-Part Patent Application of U.S. patent application Ser. No. 14/274,800 titled MONETIZATION OF TELEVISION AUDIENCE DATA ACROSS MULTIPLE SCREENS OF A USER WATCHING TELEVISION filed on May 12, 2014 and issued as U.S. Pat. No. 9,258,383,
      i. which itself is a Continuation Patent Application of U.S. patent application Ser. No. 13/943,866 titled RELEVANCY IMPROVEMENT THROUGH TARGETING OF INFORMATION BASED ON DATA GATHERED FROM A NETWORKED DEVICE ASSOCIATED WITH A SECURITY SANDBOX OF A CLIENT DEVICE filed on Jul. 17, 2013 and issued as U.S. Pat. No. 8,819,255,
         1. which further is Continuation Patent Application of U.S. patent application Ser. No. 13/904,015 titled REAL-TIME AND RETARGETED ADVERTISING ON MULTIPLE SCREENS OF A USER WATCHING TELEVISION filed on May 28, 2013 and issued as U.S. Pat. No. 9,026,668,
            a. which further claims priority to U.S. Provisional Patent Application No. 61/652,153 titled CONTENT RECOGNITION SYSTEM filed on May 26, 2012,
   2. which further is a Continuation-in-Part Patent Application of U.S. patent application Ser. No. 13/736,031 titled ZERO CONFIGURATION COMMUNICATION BETWEEN A BROWSER AND A NETWORKED MEDIA DEVICE filed on Jan. 7, 2013 and issued as U.S. Pat. No. 9,154,942,
      a. which further claims priority to U.S. Provisional Patent Application No. 61/584,168 titled CAPTURING CONTENT FOR DISPLAY ON A TELEVISION filed on Jan. 6, 2012,
   3. Which further is a Continuation-in-Part Patent Application of U.S. patent application Ser. No. 13/470,814 titled GENERATION OF A TARGETED ADVERTISEMENT IN AN UNTRUSTED SANDBOX BASED ON A PSUEDONYM filed on May 14, 2012 and issued as U.S. Pat. No. 8,539,072,
      a. which itself is a Continuation Patent Application of U.S. patent application Ser. No. 12/592,377 titled DISCOVERY, ACCESS CONTROL, AND COMMUNICATION WITH NETWORKED SERVICES FROM WITHIN A SECURITY SANDBOX, filed on Nov. 23, 2009 and issued as U.S. Pat. No. 8,180,891,
         i. which claims priority to U.S. Provisional Patent Application No. 61/118,286 titled DISCOVERY, ACCESS CONTROL, AND COMMUNICATION WITH NETWORKED SERVICES FROM WITHIN A SECURITY SANDBOX filed on Nov. 26, 2008.

BACKGROUND

Particular embodiments are in the technical field of networking technology. More particularly, particular embodiments are in the technical field of computer and embedded device communications.

The Internet and home entertainment devices usually do not communicate with one another. Attempts have been made to bridge these two: game consoles communicate over the Internet so allowing many players to engage in the same game, Apple TV downloads videos from iTunes, Microsoft media extenders play media housed on a user's personal computer. The dominant paradigm is to extend the home entertainment device so that users can search the Internet or nearby computers from the device. Less has been done to extend the PC to push content to the entertainment device.

Set-top boxes exist that stream videos from websites to the TV. The set-top boxes all assume the user sits in front of the TV when navigating between videos. Due to the limitations of TV remote controls, no acceptable user interface has been devised to enable users to hunt through catalogs of thousands of titles. Computers have the advantage of a keyboard and mouse: rich input devices that have performed well for inputting queries to web search engines and video web sites. An entertainment system might exploit the advantages of the computer to push the most relevant content to the TV leaving the home entertainment user interface to handle the smaller problem of hunting through tens or hundreds of titles.

In the case of a joint venture between Amazon and TiVo, a user of Amazon Unboxed can click on a purchased video and it is then downloaded to the user's TiVo Internet-equipped digital video recorder. The TiVo then plays the video directly to the user's TV. NetFlix has a similar arrangement with Roku. However, both products require user configuration and a pre-existing user registration, e.g., for Amazon/TiVo the user must have an account that is linked to the user's TiVo account which is associated with the user's TiVo. The Amazon-TiVo relationship is explicit and does not extend beyond Amazon to other websites. The "click to send" to your TiVo functionality is an example of extending the computer to push content to a device over a network.

SUMMARY

Particular embodiments provide a building block enabling any website to send video to an entertainment device within the user's home without requiring user configuration or account registration, and without exposing the user's device unduly to spam, i.e., unsolicited content pushed from websites or other users.

Particular embodiments enable the following scenario: Alice uses her laptop to browse a website foo.com that serves video. The website contains an Adobe Flash-based video player. Alice watches a video v for a few seconds and decides it is interesting and would like to view the video on her television. Below the video is a button that says, "Send to your living room TV," Alice clicks the button, and a dialog box appears, "foo.bar is attempting to send V to your living room TV. Do you want to allow foo.bar to send videos to your TV?" She clicks "yes," and video V starts playing on her living room TV.

The next day Alice goes to work. While browsing the web she stumbles on a video on bar.com that she would like to watch when she gets home. Even though bar.com and foo.com are not the same website, she sees the name of her television in a button on the website. She clicks on the button, the same message "bar.com is attempting . . . " appears to which she again clicks "yes." When she gets home that night, the program is available on her television.

The discovery of the TV did not require Alice to install anything on her laptop; it did not require her to provide any configuration on her laptop; it did not require her to have any account with foo.com, bar.com or any third party; and it did not require her to configure her television other than to provide it with a human-friendly name when she first purchased the TV. If the TV is manufactured with a reasonable human-friendly name (e.g., Company X 36" TV) then even this step can be skipped. This allows minimal configuration or a truly zero-configuration solution. All of this is achieved within the security constraints imposed by the web browser, and in a manner that resists spam i.e., particular embodiments resist web sites and other users sending unsolicited content to Alice's TV.

Alice's forays are compelling example uses of particular embodiments. More generally the television could be any device: a stereo, game console, another computer. The communication between the website and the device need not be a message telling the device to play a video but could be any communiqué. Adobe Flash could be replaced with Microsoft Silverlight or any runtime environment imposing a security sandbox that meets the constraints described in Section 0. Lastly the dialog prompting the user for permission to send the message could be replaced with any user interface component that requests a policy decision from the user regarding the communication to take place. Or default or previously established policy might forgo the policy prompt.

Particular embodiments specify how devices are discovered and how messages are conveyed to these devices without revealing any unique identifiers for the devices to web sites. Particular embodiments also specify how policy car be implemented with little or no local persistent storage on the user's personal computer, without requiring the user to make policy decisions repeatedly for the same website when there is non-zero persistent storage, and without permitting the website to modify or subvert the policy.

In one aspect, a system includes a television executing a discoverable service thereon to provide a communication, and a device residing in a same private network of a computer network as the television. The device is configured to constrain an executable environment in a security sandbox, execute a sandboxed program in the executable environment, use a pseudonym of a user, and call a discovery agent to find the discoverable service of the television within the same private network in accordance with the communication provided by the television. The device and the television are associated with one another by way of the sandboxed program and the discoverable service executing thereon respectively using at least the communication from the discoverable service within the same private network.

The system also includes a targeting system to receive the pseudonym, identify the user of the device using the pseudonym, and target advertising to the identified user of the device using the sandboxed program and/or the discoverable service.

In another aspect, a system includes a television executing a discoverable service thereon to provide a communication, and a device residing in a same private network of a computer network as the television. The device is configured to constrain an executable environment in a security sandbox, execute a sandboxed program in the executable environment, use a pseudonym of a user, and call a discovery agent to find the discoverable service of the television within the same private network in accordance with the communication provided by the television. The pseudonym of the user is a hardware address of a node of the sandboxed program within the same private network, and the device and the television are associated with one another by way of the sandboxed program and the discoverable service executing thereon respectively using at least the communication from the discoverable service within the same private network.

The system also includes a targeting system to receive the pseudonym, identify the user of the device using the pseudonym, and target advertising to the identified user of the device.

In yet another aspect, a method includes initiating a discoverable service executing on a television to provide a communication, and through a device residing in a same private network of a computer network as the television, constraining an executable environment in a security sandbox, executing a sandboxed program in the executable environment, using a pseudonym of a user, and calling a discovery agent to find the discoverable service of the television within the same private network in accordance with the communication provided by the television.

The method also includes associating the device and the television with one another by way of the sandboxed program and the discoverable service executing thereon respectively using at least the communication from the discoverable service within the same private network, and through a targeting system, receiving the pseudonym; identifying the user of the device using the pseudonym, and targeting advertising to the identified user of the device using the sandboxed program and/or the discoverable service.

A further understanding of the nature and the advantages of particular embodiments disclosed herein may be realized by reference of the remaining portions of the specification and the attached drawings.

Figure 1:
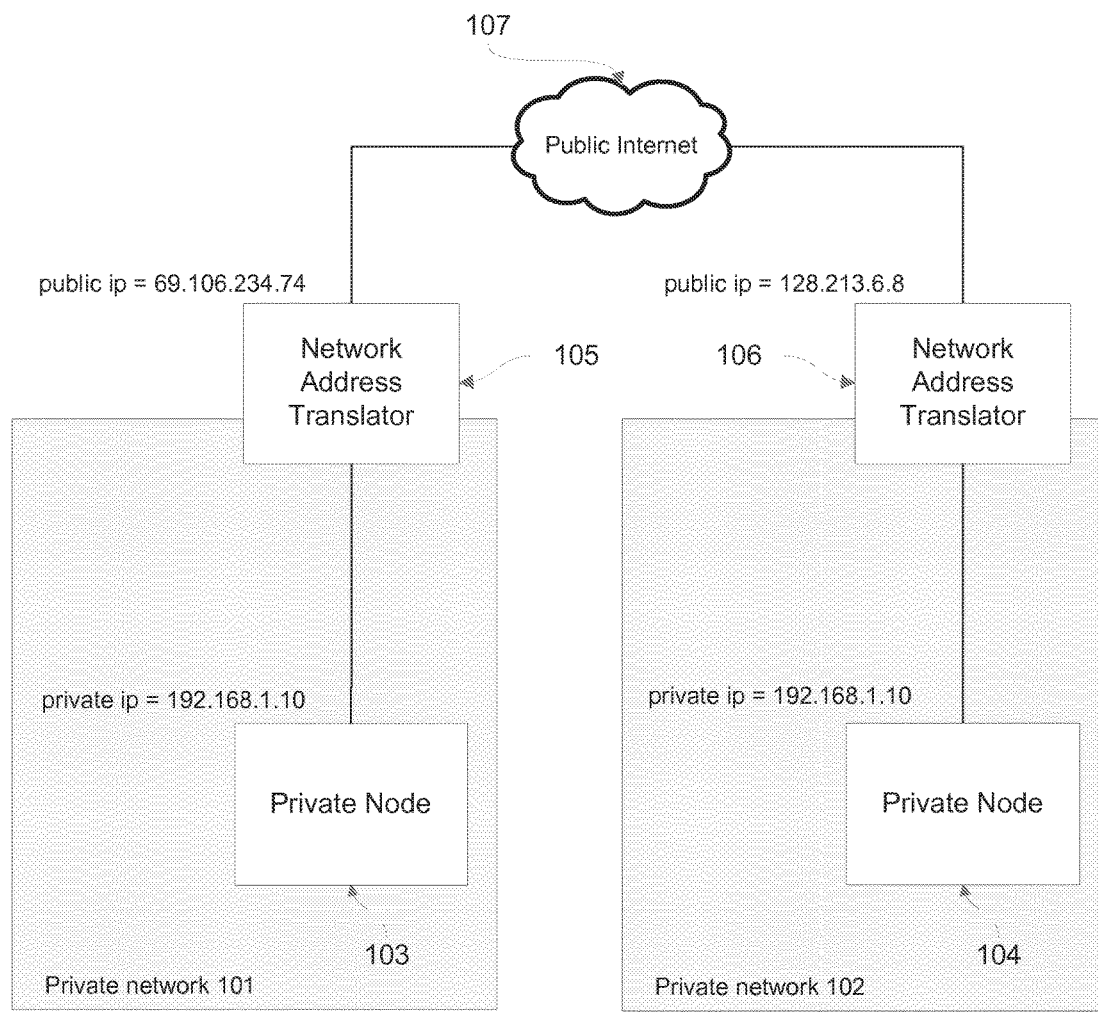
FIG. 1 illustrates the terminology "private networks" and "public networks" used in describing the present invention.

In all figures, this document adopts notation with syntax identical to that of the programming language Python. Brackets [ ] surround a list; curly brackets { } surround a dictionary; and commas separate elements in a dictionary, elements in a list, or arguments in a call. Lists appearing in figures sometimes contain a single element, but this should be taken to mean that there can be zero or more elements in the list. In some cases the semantics of a zero element list may be ill-defined. For example, there is no reason and no possibility for a device with zero network interfaces to announce itself to the network. Dictionaries contain key-value pairs. Keys are unique, but values need not be so. The key and value are separated by a colon. In a call, particular embodiments present variable name and value separated by the assignment operator '='. Values are represented using italics. Values are provided for purposes of illustration with the understanding that they should be replaced for each real-world scenario, e.g., replace "name" with the actual name of some entity.

DETAILED DESCRIPTION OF EMBODIMENTS

When the Internet was first designed in the late 60's and early 70's all nodes were provided with static IP address assignments and all packets were routed only based on IP address. IP addresses were hard to remember so nodes were assigned names, but not until the Domain Name System (DNS) was there a single scalable distributed database for translating domain names to IP addresses.

The DNS uses domain names not only to name nodes but also to specify administrative boundaries and has been overloaded to locate nodes serving a particular function and to locate services running on particular ports. For example www.example.com refers to the nodes providing World Wide Web services in the administrative domain example.com. If a user working at the example company wishes to find a printer he or she might look up ipp.example.com where ipp stands for "Internet Printing Protocol." However, to do so would require the user to know he or she is on a network under the same administration as example.com. When a computer boots for the first time, it has no IP address and it does not know its administrator's domain. If a computer moves its IP address might change and the administrator of the network in which the computer finds itself might have changed. The printer ipp.example.com may no longer be the appropriate printer or may no longer be accessible.

To allow users to boot or move their computers into networks without requiring any a priori knowledge or user configuration, most computers implement some form of Zero Configuration networking (Zeroconf). All modern Apple computers implement a form of Zeroconf called Multicast DNS (MDNS) and DNS-based Service Discovery (DNS-SD) as parts of Bonjour. Multicast DNS is similar to the Internet's Domain Name System (DNS) except every node in the network acts as a server. When a computer multicasts a query for the IP address of the node with domain "foo," if "foo" is on the network then "foo" responds with its IP address. As with DNS, the query need not be for a node's IP address, but may be a query for a named service. PoinTeR (PTR) resource records point from one domain name to another. With DNS-SD, the user looking for service "bar" queries for a PTR record for domainbar.example.com, where "bar" and "example.com" can be replaced with any service and domain name respectively. The PTR record maps to a domain name of the form <instance>. <service>. <domain> where <instance> is replaced with a human-friendly name and <domain> can be any domain name, but for discovering services on the local network, the domain name is "local." For example, to discover the printers on the local network, a client queries for the PTR record for _ipp.tcp.local. Assume there are two printers in the network named "$1^{st}$" floor and "mezzanine." These two printers return PTR resource records to the respective domain names:

1st floor._ipp._tcp.local mezzanine._tcp._tcp.local

Assume the client wants to print to the printer named "$1^{st}$ floor," the query client then sends a second query for the service (SRV) record for "$1^{st}$ floor." The SRV record contains the port number and canonical domain name for the printer. Now that the client has uniquely identified the printer d the port number on inch the printer's print service application is running, the client sends the to the printer.

Apple's MDNS and DNS-SD work when the application has access to multicast. However, the security sandbox as described in Section 0 does not allow access to multicast: Adobe Flash employs such a sandbox and thus a flash-based application running in the browser cannot directly discover a printer, TV, or other local networked peripheral. When a user wishes to print a web page, the browser rather than a sandboxed program initiates the print process. The browser has access to multicast or indirectly has access to MDNS via the Bonjour system service provided by OS X or as an installed service on nodes running Unix or Microsoft Windows.

Microsoft's competing discovery mechanism Simple Service Discovery Protocol (SSDP) relies on UDP unicast and multicast. Neither UDP unicast nor multicast is available within the security sandbox described in Section 0.

Similarly the IETF's Service Location Protocol (SLP)(4), UPnP (which is based on SSDP), and uTorrent's Local Service Discovery (LSD) use multicast to discover services within the local area network and thus share the same problem with MDNS/DNS-SD and SSDP.

A node on the Internet is a computer or device that has an Internet Protocol (IP) address. Nodes include but are not limited to laptops, printers, desktop computers, and IP-equipped televisions, stereos, and game consoles. When a node communicates with another node it sends a packet that like an envelope in the postal mail system contains a message and bears a source and destination address. Messages, especially lengthier messages, may span multiple packets. With a packet, the addresses are IP addresses. The IP address is a numeric address not generally intended for human consumption, but rather is used by nodes inside the Internet to forward packets toward the destination node. Many nodes on the Internet also have a human-friendly domain name that uniquely names the node. A domain name may also refer to a set of nodes. For example www.google.com refers to the set of computers that provide the human-facing portion of google's web search service.

A server refers to a node or set of nodes that respond to queries from clients. A node may be both a server and a client depending on the role the node takes in processing a particular query/response. Google's nodes running at www-.google.com are servers and the nodes that query google-.com with web searches are clients.

Particular embodiments refer to devices or discovering services offered by a device. For illustration, this is appropriate since embodiments are applicable to discovering services offered by televisions, digital video recorders, printers, or other special-purpose electronics that consumers usually refer to as "devices." For example, the service provided by a printer is to print a document while the service offered by a networked TV may be to play a video. More generally this document describes mechanisms to discover services within a network. Any service which can be discovered using embodiments of the discovery service is a discoverable service.

The Internet may be divided into public and private networks (as illustrated in FIG. 1). All nodes in the public network have IP addresses that any other node in the public Internet can use as a destination IP address, and the public Internet will try its best to forward any packet so addressed to the appropriate destination node. Each node on a private network has an IP address that is only guaranteed unique within its private network. This document refers to each node in a private network as a private node. FIG. 1 illustrates a collision between IP address assignments meaning two private nodes 103, 104 in different private networks 101, 102 have the same IP address. Private IP addresses can be used to route packets within their respective private networks 101, 102, but due to the ambiguity resulting from collisions in address assignments, private IP addresses cannot he used to route packets on the public Internet 107. Home users and corporations often have their own private networks on which multiple nodes can communicate with each other using their private IP addresses.

To communicate with nodes over the public Internet, private nodes communicate via a Network Address Translator (NAT) 105, 106. A NAT straddles private and public networks and has both a public IP address and a private IP address. The NAT replaces the source address on each packet destined for the public Internet with the NATs public IP address. A response to the packet is addressed for the NAT. The NAT translates the destination address from packets arriving from the public Internet to the appropriate private IP address within its private network. In FIG. 1, all given IP addresses are examples that serve for the following illustration: a packet from private node 103 destined for private node 104 would start with source address 192.168.1.10 and destination address 128.213.6.8. Private node 103 may not even be aware of private node 104's private IP address. When the packet leaves private network 101, the NAT 105 translates the source address from 192.186.1.10 to 69.106.234.74. As the packet transits the public Internet 107, the packet has source address 69.106.234.74 and destination address 128.213.6.8. When the packet arrives at NAT 106, the NAT replaces the destination address with the appropriate private IP address 192.168.1.10 and then forwards the packet to private node 104.

To address a packet to a specific application running on a node, packets also contain source and destination port numbers. Any given application may send from or listen on any number of ports, but a port belongs to only one application at any given time. As a shorthand this document often refers to a sender's or receiver's IP address x and port number y as the address pair (x,y). The pair is denoted as a sender's or receiver's address. When the IP address in an address pair is a private IP address, this is denoted the private address. When a packet passes through a NAT from a private network to a public network, the sender's private address is mapped to a port on the NAT's public-facing network interface. The port number on a NAT mapped to a private address and the NAT's public IP address together constitute a sender's or receiver's public address. Many NATs attempt to preserve port numbers when mapping from private to public IP addresses, but this is not always possible. Assume two packets destined for www.goole.com port 80 arrive from the private network: packet 1 has sender private-IP and port (x,y), packet 2 has sender private-IP and port (w,y). Both packets have the same sender port. A NAT often has only 1 public IP address here denoted n. If the NAT maps packet 1 to (n,y) aps packet 2 to (n,y) then both packets appear to come from the same private node. Instead the NAT maps either packet 1 or packet 2 onto a sender port other than y so that when responses arrive from google, the NAT can forward those responses back to the correct private nodes. The ambiguities and limitations imposed by NATs may influence the design of certain embodiments.

When a user visits a web site, the web browser downloads a number of web pages often containing one or more scripts written in Javascript or Actionscript. Such scripts or anything that executes in a web page are usually constrained in the types of operations they can perform. These constraints protect the user's privacy and the security of the user's computer. These constraints together comprise a security sandbox or more tersely a sandbox. Hereafter anything that executes in a security sandbox is referred to as a sandboxed program. The sandboxed program may be a script, binary executable, intermediate bytecode, abstract syntax tree, or anything that can be executed with the appropriate runtime environment security sandbox may or may not run inside a web browser Particular embodiments assume a user runs a sandboxed program. This program wishes to communicate with services running on devices that reside in the same private network. The program calls a discovery age that finds discoverable services within the same private network and updates contact information (addresses) for services that were previously contacted but may now reside in another private network. The discovery agent tells the sandboxed program about the discovered services. Section 0 details the constraints imposed by the security sandbox. Subsequent sections describe he discovery process, and several variations that permit direct communication when the sandboxed program and discoverable service reside in different private networks.

Security Sandbox

Particular embodiments operate within a security sandbox that imposes the following restrictions:

Sandboxed programs may have no storage that persists between executions of the sandboxed program.

Sandboxed programs may have no access to the network other than to open unicast connections to the origin server and no access to any other server less the server explicitly permits the communication. The communications may be further constrained to using TCP and/or UDP, or even further to HTTP or a subset of application-layer unicast protocols.

Sandboxed programs may not have access to any local resources (file system, devices, etc.) other than memory, computation, and space to render a user interface on the user's screen.

Sandboxed programs may not be permitted to communicate with other programs running on the local system.

Sandboxed programs may not be permitted to communicate with other programs running within other security sandboxes except via a limited, mutually agreed programming interface enforced by the sandboxes.

Particular embodiments may also work in security sandboxes that impose a subset of these restrictions or weaker versions of these restrictions.

Particular embodiments may not require substantial computation or memory and reasonable constraints on computation or memory usage will not affect the proposed embodiments.

In the case of Adobe Flash, the explicit permission to communicate with a server comes in the form of a cross-domain.xml file that specifies permissions to access a domain x and is stored at URL http://x/crossdomain.xml. After the crossdomain.xml file has been communicated, further communication with existing Adobe Flash 8 through 10 libraries occurs over HTTP. With Adobe Flash 8 through 10, sandboxed programs can communicate with each other via LocalConnection objects or via Javascript calls exported via the ActionScript ExternalInterface. LocalConnection and ExternalInterface mechanisms are provided as examples, other mechanisms may exist for sandboxed programs to communicate with each other, and other mechanisms may be introduced in future versions of Adobe Flash.

A service that is designed to communicate with sandboxed programs is called a sandbox-reachable service. A service designed to communicate with a program running in an Adobe Flash sandbox is called a flash-reachable service. Specifically, a flash-reachable service speaks HTTP and returns a sufficiently permissive crossdomain.xml file.

Centralized Embodiment

Traditionally a program multicasts or broadcasts to its local network to discover available networked services. Because sandboxed programs cannot use multicast or broadcast, they discover services via some intermediary. This intermediary is referred to as the discovery service. Services announce themselves to the discovery service, and discovery agents running with the sandboxed program query the discovery service to discover previously announced devices.

Figure 2:
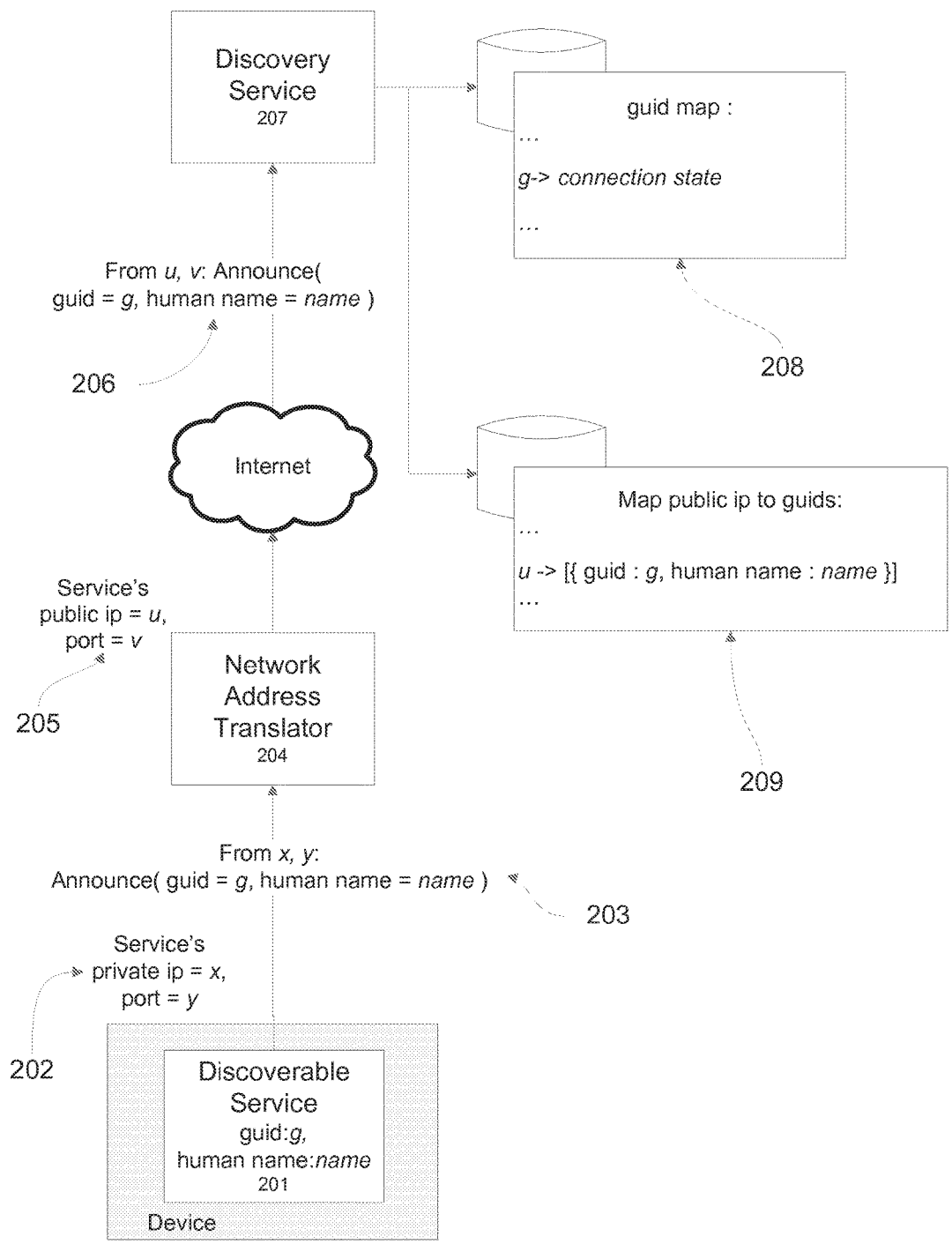
FIG. 2 illustrates a discoverable service using the centralized embodiment announcing its existence to the discovery service.

In the centralized embodiment of this invention, as shown in FIG. 2, a device 201 announces its existence to the discovery service 207.

Each discoverable service running on device 201 has a globally unique id (GLAD) denoted g. The GLAD is provided only to the discovery service 207 and to nodes on the same private network. The GUID is valuable in that it identifies the device even when the device's public or private addresses change, e.g., the user's service provider may reallocate the customer's public IP address(es), the device owner may change Internet service providers, or the private network's Dynamic Flost Configuration Protocol (DHCP) may reassign IP addresses. In practice the GUM can be assigned during manufacture, or the GUID can be a random number drawn from a large enough space that the resulting number is unique with high probability. The latter allows the GUID to be changed at any time without contacting a central authority. An owner might wish to change a device's GUID if he or she believes the GUID has been compromised, e.g., as might be evidenced by a sudden increase in spam appearing on her TV.

The discoverable service on device 201 also has a human-friendly name denoted by the key "human name" with value "name." The human name is not intended to be globally unique and possibly not even locally unique, but rather to be meaningful to the users of a service. Example names include "living room TV" and "bedroom printer." Device 201 also has at least or one IP address 202 in order for it to communicate to the network. Device 201 may have more than one IP address. If the device 201 sits inside a private network that is connected to the public Internet via a NAT 204 then all of the device's IP addresses are private IP addresses. Any communication sent or received by this device must originate or be destined to a program with a port number. Thus device 201 has a both a private IP and port pair 202, hereafter called the address pair and illustrated as (x,y) in FIG. 2. Quite often the port number(s) assigned to a service are the same across the node's IP addresses, but this is not a requirement imposed by the Internet Protocol and thus the address and port are oft considered an indivisible pair when announcing, discovering, or communicating with a device.

When announcing, device 201 sends its service information: its GUID, and its human name 203. As the announce message propagates from the private network via the NAT 204 to the public Internet, the NAT 204 translates the device's announce message's private address (x,z) to its public address (u,w) 205 where u is the public IP address of the NAT 204. (x,z) differs from (x,y) because the connection over which the device announces may use an ephemeral source port, i.e., a port allocated for use by a single connection. Ephemeral ports are described in any textbook on TCP/IP. The end result of this translation is the message 206, which the Discovery Service 207 receives. The Discovery Service stores the service information for later lookup 208 during the discovery process.

In the centralized embodiment, the connection used for announcing is also used for forwarding all communications between sandboxed programs and the discoverable services. Thus the table 208 also contains connection state such as a socket file descriptor. Since a connection is initiated by the discoverable service to the discovery service, it is likely that such connections will be permitted by any NAT, especially if those connections use HTTP. Since the connection between the discoverable service and the discovery service is maintained, it can probably be used to route messages back through any number of intervening NATs so long as those NATs permit long-run HTTP connections to the discovery service. To prevent NAT mappings from timing out, the discoverable service, sends periodic keep-alive messages.

If only infrequent and small communications take place between sandboxed programs and any given discoverable service then the centralized embodiment is the best solution due to its simplicity.

When a user runs a sandboxed program that queries the discover service, the discovery service returns the GUID and any human names for the services behind the same NAT. The GUID ensures that the sandboxed program can distinguish between devices that have identical human names.

Figure 3:
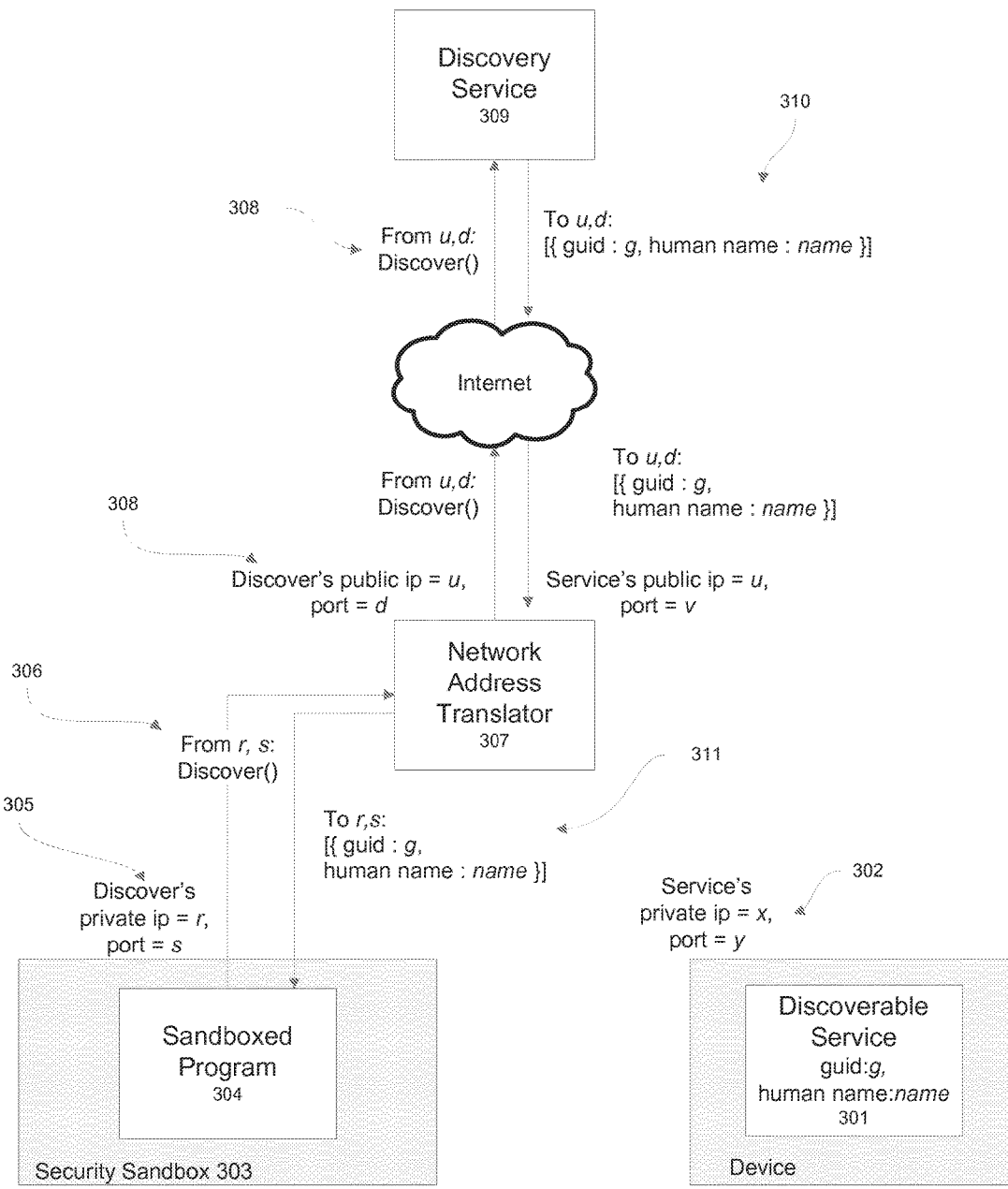
FIG. 3 illustrates a sandboxed program using the centralized embodiment discovering and communicating with the discoverable service.
Figure 4:
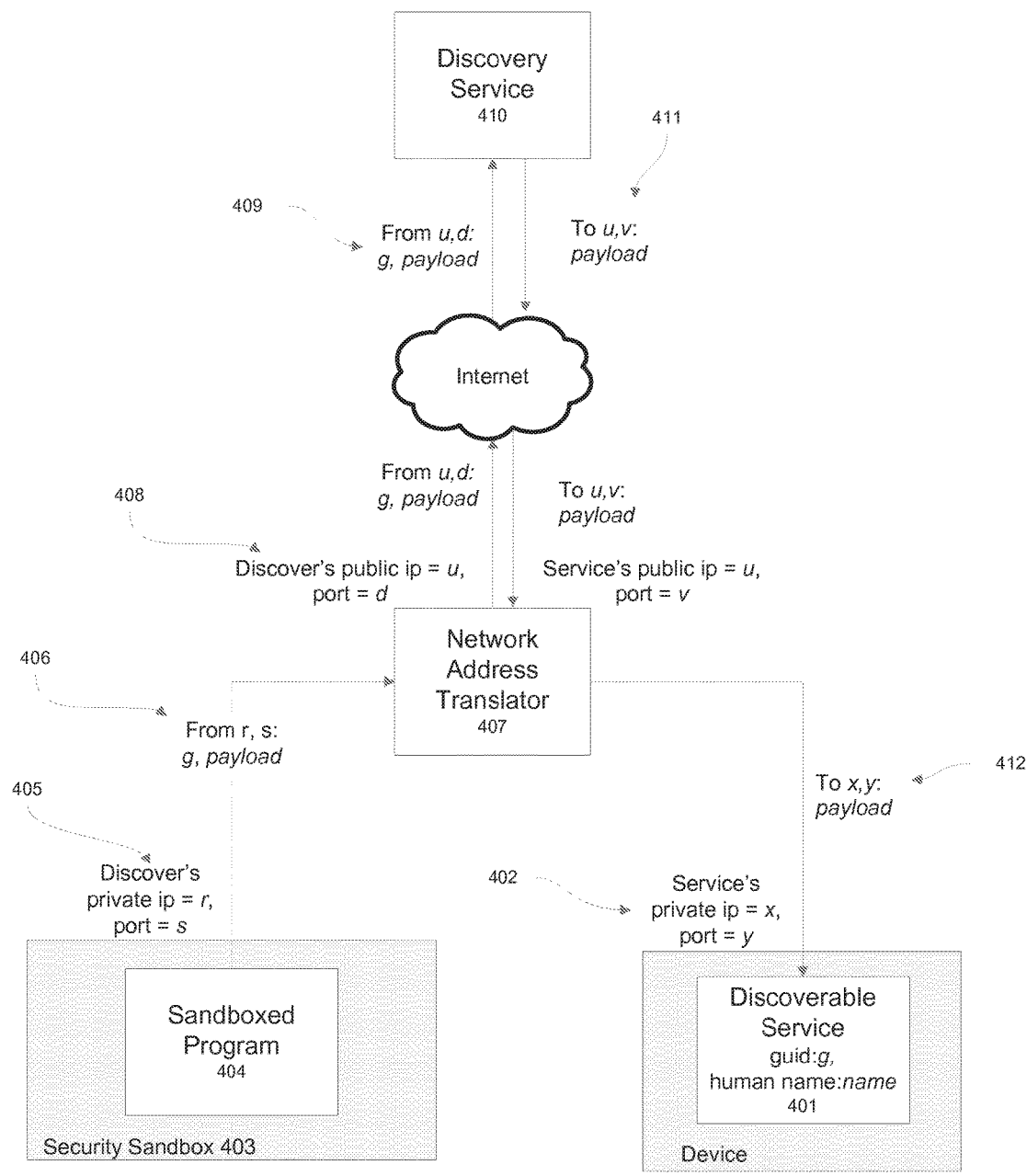
FIG. 4 illustrates sandboxed program using the centralized embodiment to forward communications via central infrastructure called the discovery service to a discoverable service when both the sandboxed program and the discoverable service reside on the same private network.

FIG. 3 illustrates the discovery process. A sandboxed program 304 running in security sandbox 303 sends a discovery message 306 to the discovery service 309. The discovery message 306 is addressed from the sandboxed program's 304 private address r,s 305. When the discovery message transits the Network Address Translator 307, the private address is translated to the sandboxed program's public address u,d 308 creating an otherwise identical discovery message but addressed from u,d. As with z in FIG. 2, d is most likely an ephemeral port allocated by the operating system on which the sandboxed program runs for use by this discovery message's connection. The discovery service 309 performs a lookup based on the message's public IP address u. If one or more devices are found that have the same public IP address u as the sandboxed program then the device(s) are assumed to reside in the same private network with the sandboxed program. This illustration follows from the illustration in FIG. 2 where there device 201, 301 with the same public IP address u. Thus the discovery service responds with the service information 310 for device 301.

Once the sandboxed program 304 has obtained device 301's service information, the sandboxed program has the necessary information to contact 301. When the sandboxed program 304 404 decides to communicate with the discoverable service 301 401, it forwards the desired payload to communicate with the destination service's said 406 409 through the NAT 407 to the discovery service 410. The discovery service looks up the connection state such as a file descriptor from the table shown in 208 and forwards the payload through this connection 411 412 to the discoverable service 401.

Figure 5:
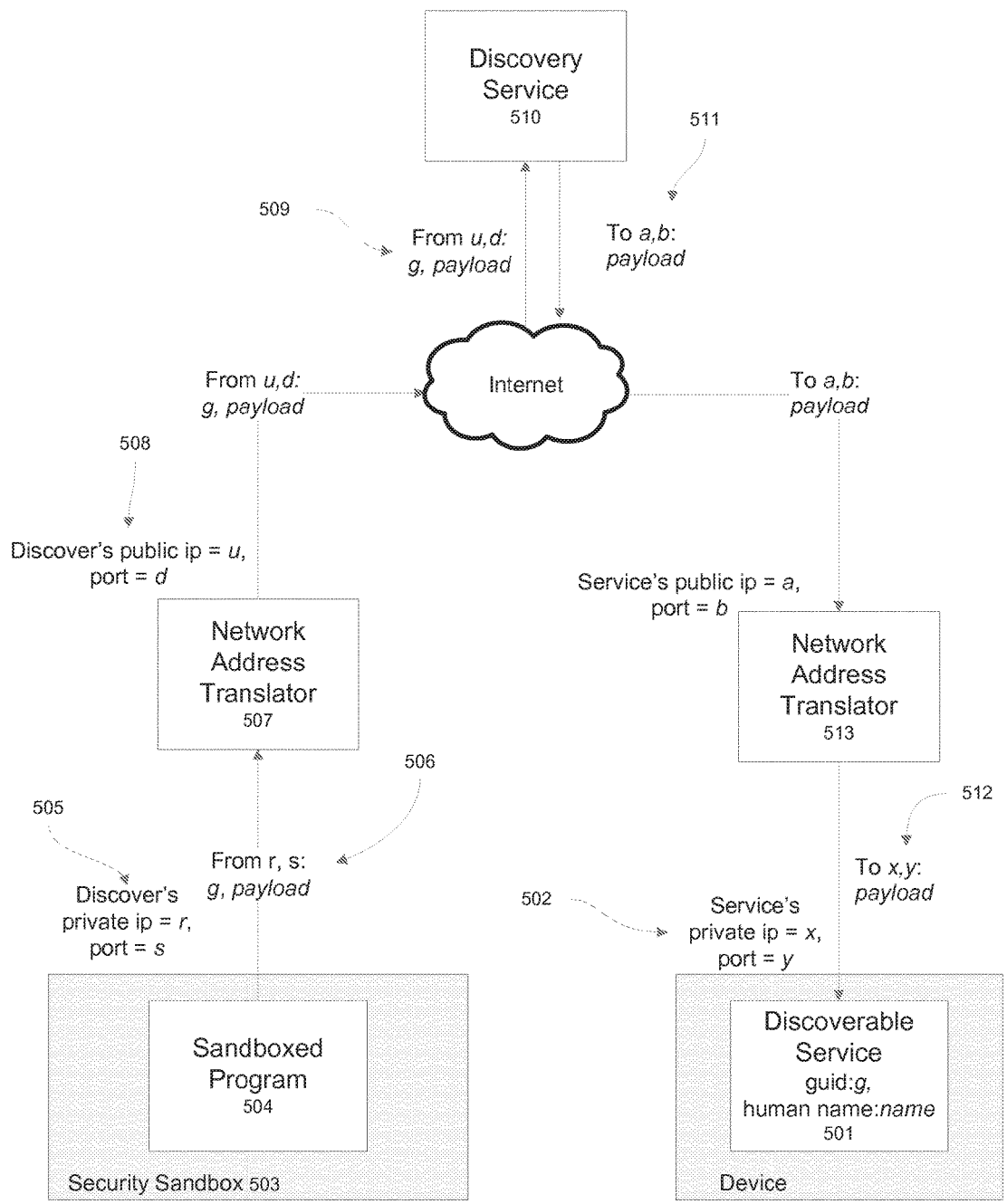
FIG. 5 illustrates how a sandboxed program implementing the centralized embodiment forwards communications to a discoverable service when the discoverable service and the sandbox reside on separate private networks.

By virtue of passing all communications through central infrastructure and having devices maintain connections to the central infrastructure, the centralized embodiment can penetrate commercially available NATs. FIG. 5 illustrates the centralized embodiment enabling communication between the sandboxed program 504 and the discoverable service 501 when they reside behind different NATs 507 and 513 respectively.

Figure 6:
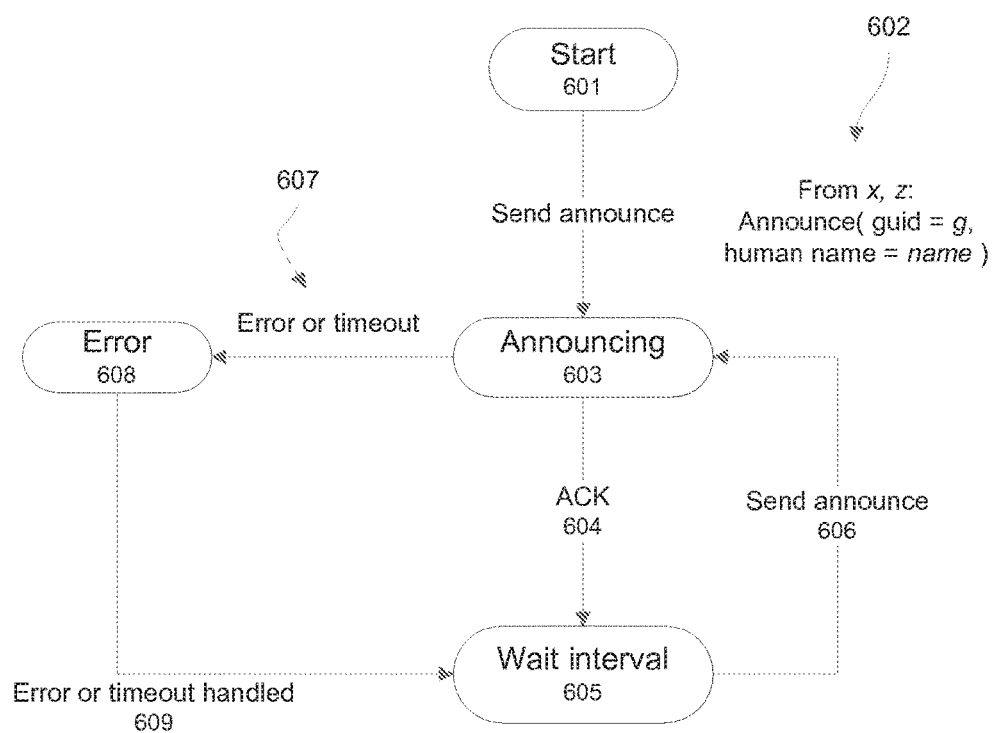
FIG. 6 presents a minimalist state machine for the announce functionality of a discoverable service implementing the centralized embodiment.
Figure 7:
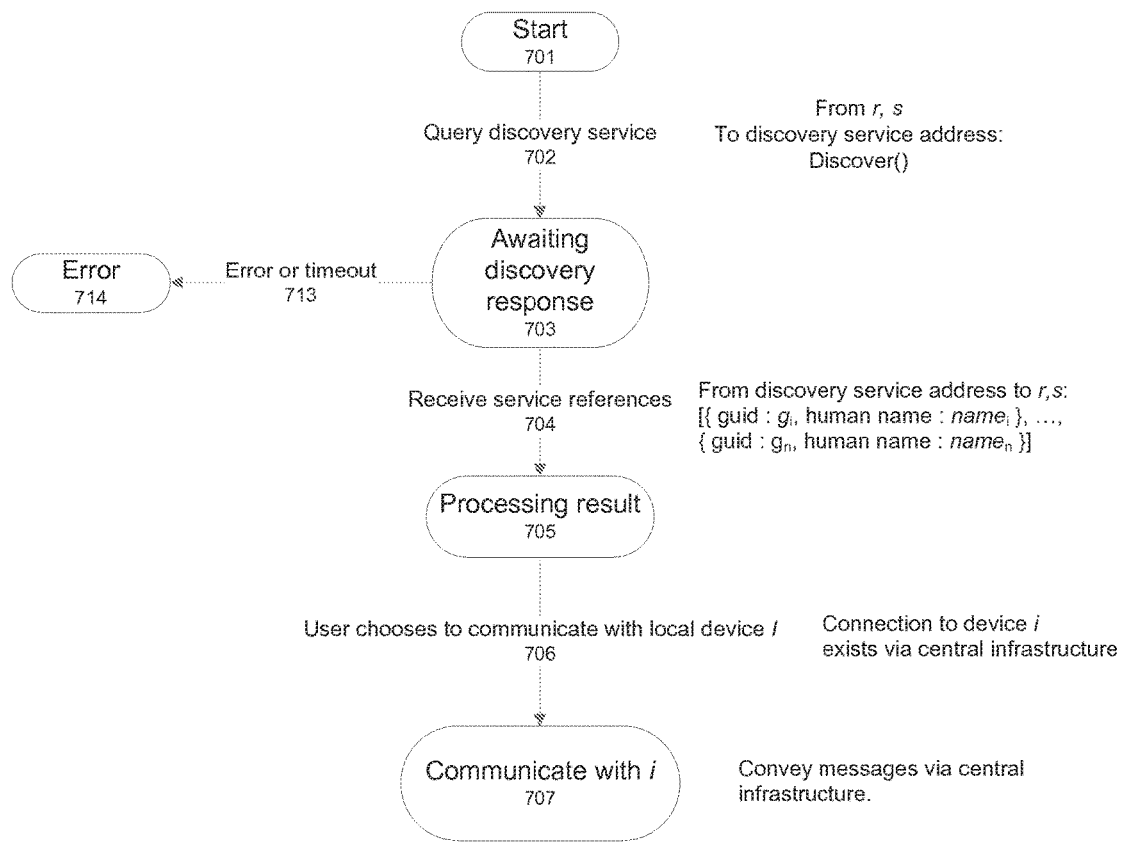
FIG. 7 presents a minimalist state machine for a sandboxed program implementing the centralized embodiment to discover discoverable services.
Figure 8:
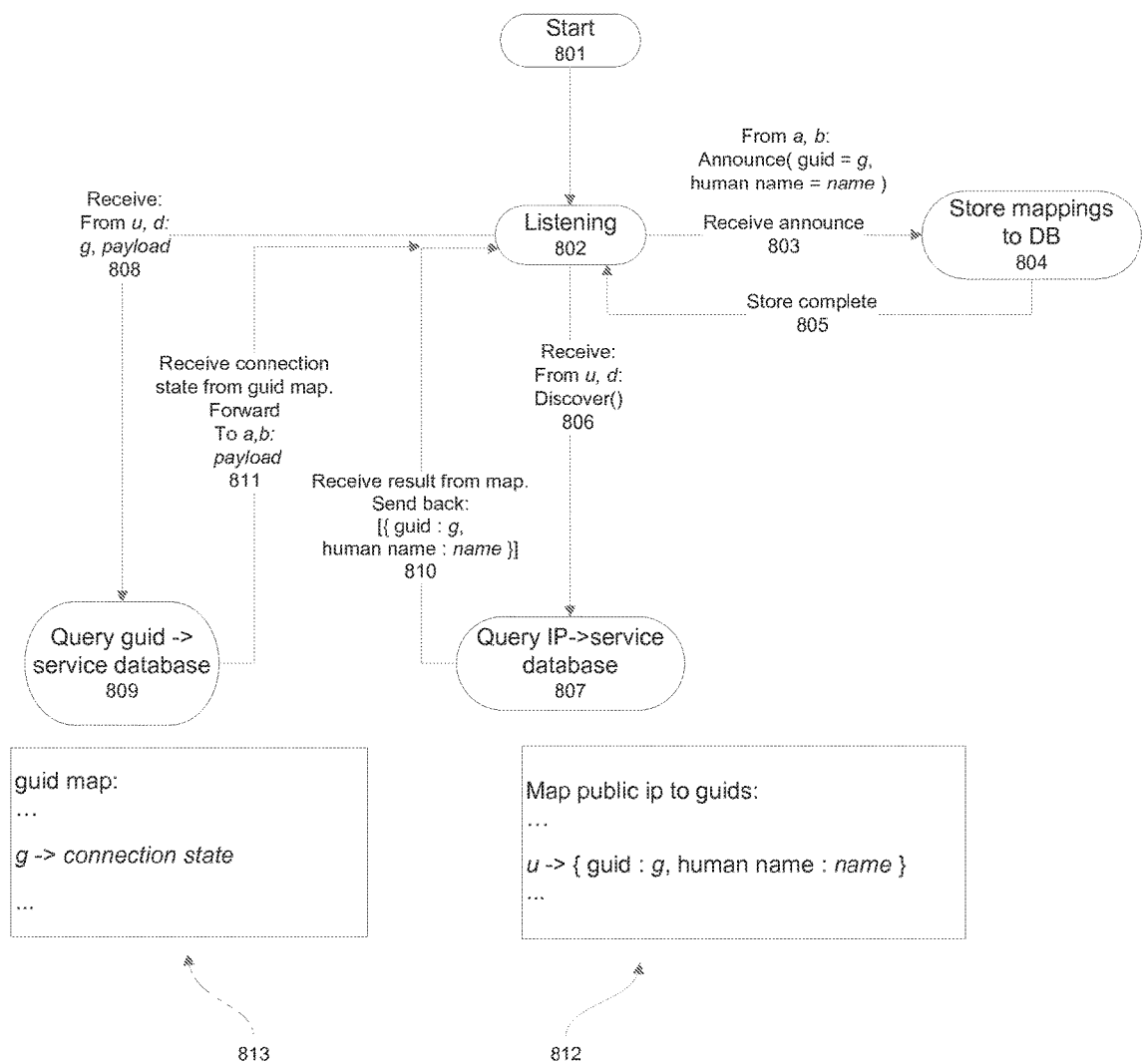
FIG. 8 presents a minimalist state machine for a discovery service implementing the centralized embodiment to store state for announcements from discoverable services and to answer discovery requests from sandboxed programs.

FIGS. 6 through 8 show state-transition diagrams for the centralized embodiment.

If there is no user configuration and devices and the sandboxed program come from disparate organizations, e.g., the device manufacturer and a website respectively, then the discovery service may be known to both a priori. In practice, this means the discovery service is global.

Variations on the Centralized Embodiment

In another embodiment, the announce message omits the human name. The human name would then not appear in the mappings maintained by the discovery service, and world not be communicated from the discovery service to the sandboxed program. The guide is all that is necessary to route packets through central infrastructure to the sandboxed program and device reside on the same private network. The human name could thus be obtained from further communication between the sandboxed program and the discovered service. The no-human-name embodiment has the drawback that the human name cannot be presented to the user until after at least the first call between the sandboxed program and the device has completed. Thus there would be no human name to present a meaningful or message when the sandboxed program cannot communicate with the discovered service. This may not be deemed a drawback if the sandboxed program calls the services to confirm they are reachable before their human names in the user interface.

For the centralized embodiment, the term "discovery service" is a bit of a misnomer. Central infrastructure provides both discovery and application-layer routing between the sandboxed programs and the discoverable services. The discovery service is logically centralized, but may be distributed across multiple servers to provide scale and robustness. The IP address space and the quid address space may be partitioned across these servers and/or replicated across subsets of the servers to provide failover.

For reasonable performance the service information for the two queries based on GUID or based on IP address may be stored in separate mappings (a.k.a., indices): from GUID to service information 208 and from public IP to service information 209. The traditional data structure for such lookups is a hash table though the mappings can be stored with different trade-offs in time and space complexity using a variety of data structures (e.g., tries, balanced trees, radix trees).

With some cost in lookup time, a Distributed Hash Table (DHT) permits a physically decentralized lookup data structure and associated message routing where the data structure can be spread across a wide number of nodes including the devices themselves. However DHTs introduce occasional NAT traversal problems, since many of the nodes in the DHT may be behind NATs. Furthermore, the nodes in a decentralized data structure are less trustworthy and thus using a DHT introduces potential spam problems (see Section 0).

Embodiment that Allows Direct Communication

With the centralized embodiment, all communications between sandboxed programs and discoverable services pass through the discovery service. The centralized embodiment requires an amount of infrastructure linear to the volume of communications between sandboxed programs and discovered services. Communicating without passing packets through central infrastructure is denoted as direct communications. By this definition, directly communicated packets may transit between two nodes on a Local Area Network (LAN) or may pass through multiple routers and NATs between two nodes on disparate networks. This section presents an embodiment wherein central infrastructure is still used to discover services, but once a service has been discovered all further communications takes place directly between the sandboxed program and the discoverable service. The embodiment that enables direct communications is hereafter called the direct embodiment.

With the direct embodiment, the central infrastructure requirement scales linearly with the number of announces and discovery requests it must process as opposed to linearly with all communications transiting between sandboxed programs and discovered services.

TVs, DVRs, and set-top boxes are usually not considered mobile devices. Non-mobile nodes may retain IP address assignments for days or longer even when repeatedly turned off. Discoverable services running on those nodes can choose to reuse the same port numbers whenever possible, thus making ip and port stable values worthy of caching. If the sandboxed program caches ip-port pairs as long as the ip-port pairs remain valid, the sandboxed program may communicate with the device hundreds of times for each time the sandboxed program must contact the discovery service.

To achieve direct communications between the sandboxed program and the discoverable service, the system communicates more information via the discovery service: the sandboxed program must at least know the private address of the discoverable service. For remote access the sandboxed program also needs the discoverable service's public address. Once a sandboxed program knows the discoverable service's addresses, it can attempt to establish communications. If the sandboxed program resides on the same private network with the discoverable service then opening a connection to the private address likely succeeds. Establishing direct communication between private networks and thus through one or more NATs is more complicated. Related discussion is thus deferred until Section 0.

Figure 9:
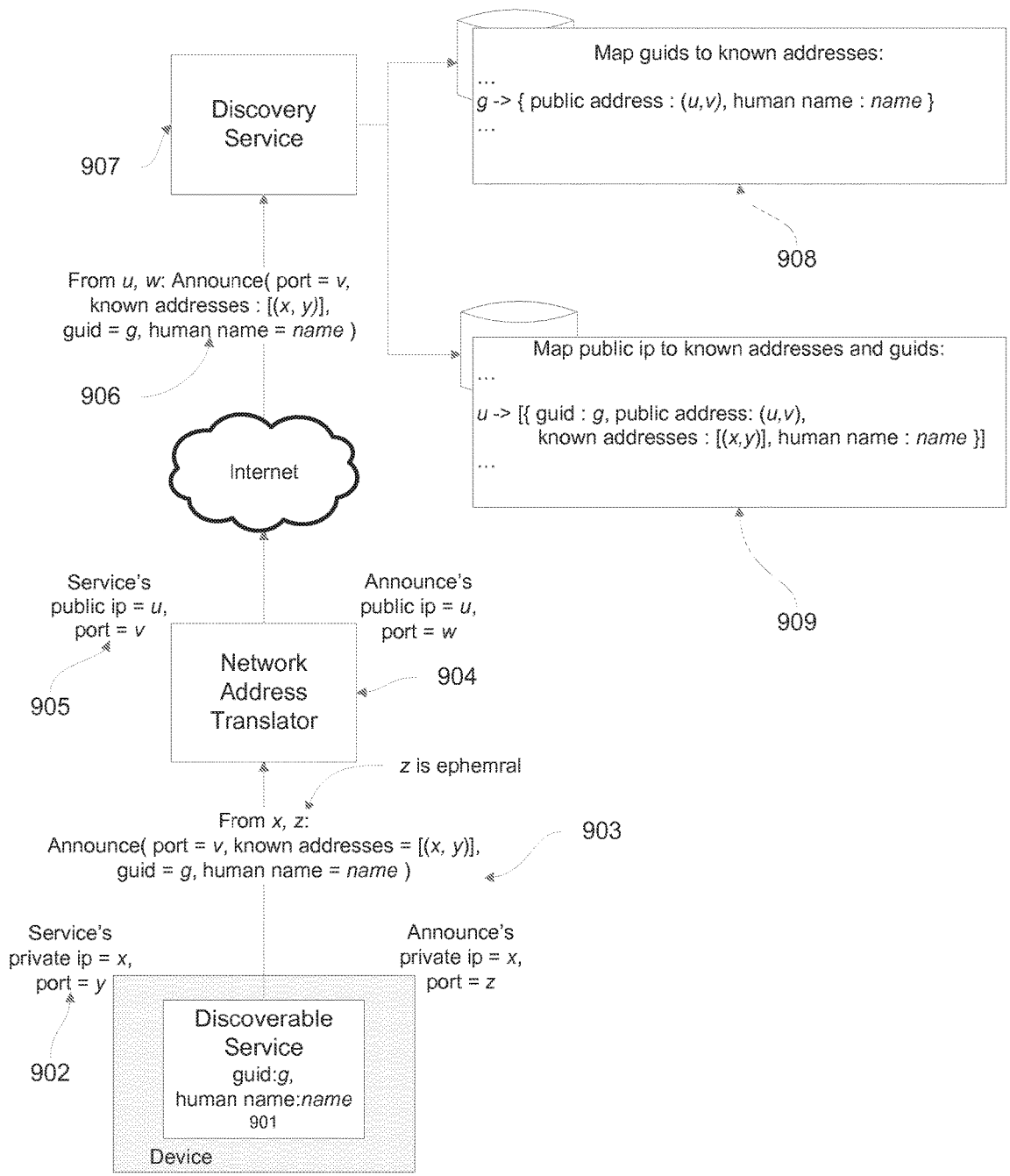
FIG. 9 illustrates a discoverable service using the direct embodiment announcing its existence to the discovery service.

When announcing, discoverable service 901 sends its service information: a list of all of its known addresses, the service's port v mapped on the NAT, its GUID, and its human name 903. In the centralized embodiment, the known addresses are the IP addresses of the discoverable service's device's network interfaces with their respective ports on which the discoverable service listens. In FIG. 9, the device has private IP address x and listens on port y 902.

As the announce message propagates from the private network via the NAT 904 to the public Internet, the NAT 904 translates the device's announce message's private address (x,z) to its public address (u,w) 905 where u is the public IP address of the NAT 904. (x,z) differs from (x,y) because the connection over which the device announces may use an ephemeral source port, i.e., a port allocated for use by a single connection. Ephemeral ports are described in any textbook on TCP/IP. The end result of this translation is the message 906, which the Discovery Service 907 receives. The Discovery Service stores the service information for later lookup during the discovery process.

Figure 10:
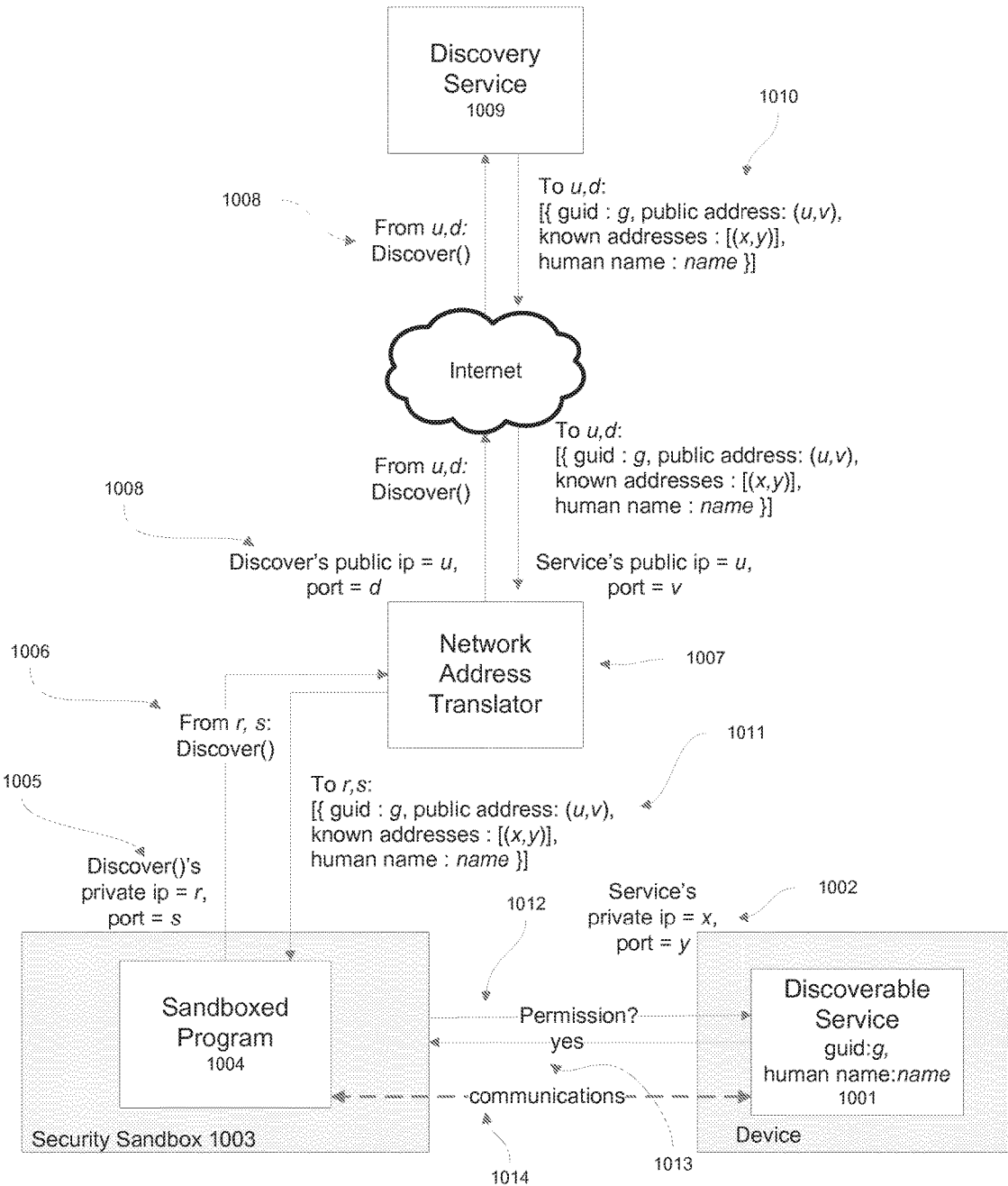
FIG. 10 illustrates a sandboxed program using the direct embodiment discovering and then communicating directly with a discoverable service residing in the same private network.

FIG. 10 illustrates the discovery process. A sandboxed program 1004 running in security sandbox 1003 sends a discovery message 1006 to the discovery service 1009. The discovery message 1006 is addressed from the sandboxed. program's 1004 private address r,s 1005. When the discovery message transits the Network Address Translator 1007, the private address is translated to the sandboxed program's public address u,w 1008 creating an otherwise identical discovery message but addressed from u,d. As with z in FIG. 2, d is most likely an ephemeral port allocated by the operating system on which the sandboxed program runs for use by this discovery message's connection. The discovery service 1009 performs a lookup based on the message's public IP address u. If one or more devices are found that have the same public IP address u as the sandboxed program then the device(s) are assumed to reside in the same private network with the sandboxed program. This illustration follows from the illustration in FIG. 2 where there is a device 901, 1001 with the same public IP address u. Thus the discovery service responds with the service information 1010 for discovered service 1001. The service information contains the known private 1002 and public addresses of the discovered service 1001.

Once the sandboxed program 1004 obtains device 1001's service information, the sandboxed program has the necessary information to contact 1001. When the sandboxed program 1004 decides to communicate with device 1001, to satisfy the requirements of the security sandbox, the sandbox queries the discovered service to obtain permission 1012 to communicate. Assuming the discovered service grants permission 1013, the sandboxed program 1004 proceeds to communicate with the discovered service 1014.

FIGS. 11 through 14 provide state-transition diagrams for the direct embodiment.

Figure 11:
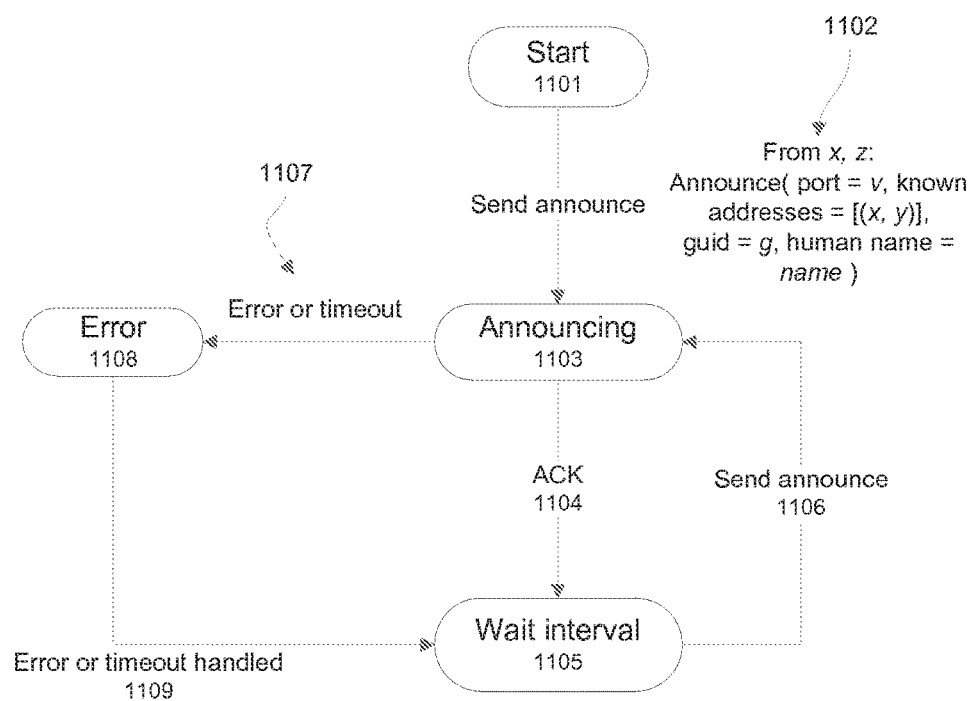
FIG. 11 presents a minimalist state machine for the announce functionality of a discoverable service implementing the direct embodiment.

FIG. 11 shows the state machine for a discoverable service implementing the direct embodiment that periodically announces itself to the discovery service. The discoverable service starts 1101 by announcing 1102 to the discovery service and then periodically 1105 1106 thereafter. If the announcing service cannot establish a connection to the discovery service or the discovery service does not acknowledge the announce message then the announce tunes out 1107. Timeouts and other errors result in the announcing device delaying before attempting another announce. Variations on this state machine include exponentially backing off after a timeout or load-related error condition to avoid overwhelming the discovery service. The wait interval 1105 can be a system constant or the discovery service can suggest a wait interval just as BitTorrent trackers return an announce interval to BitTorrent clients.

Figure 12:
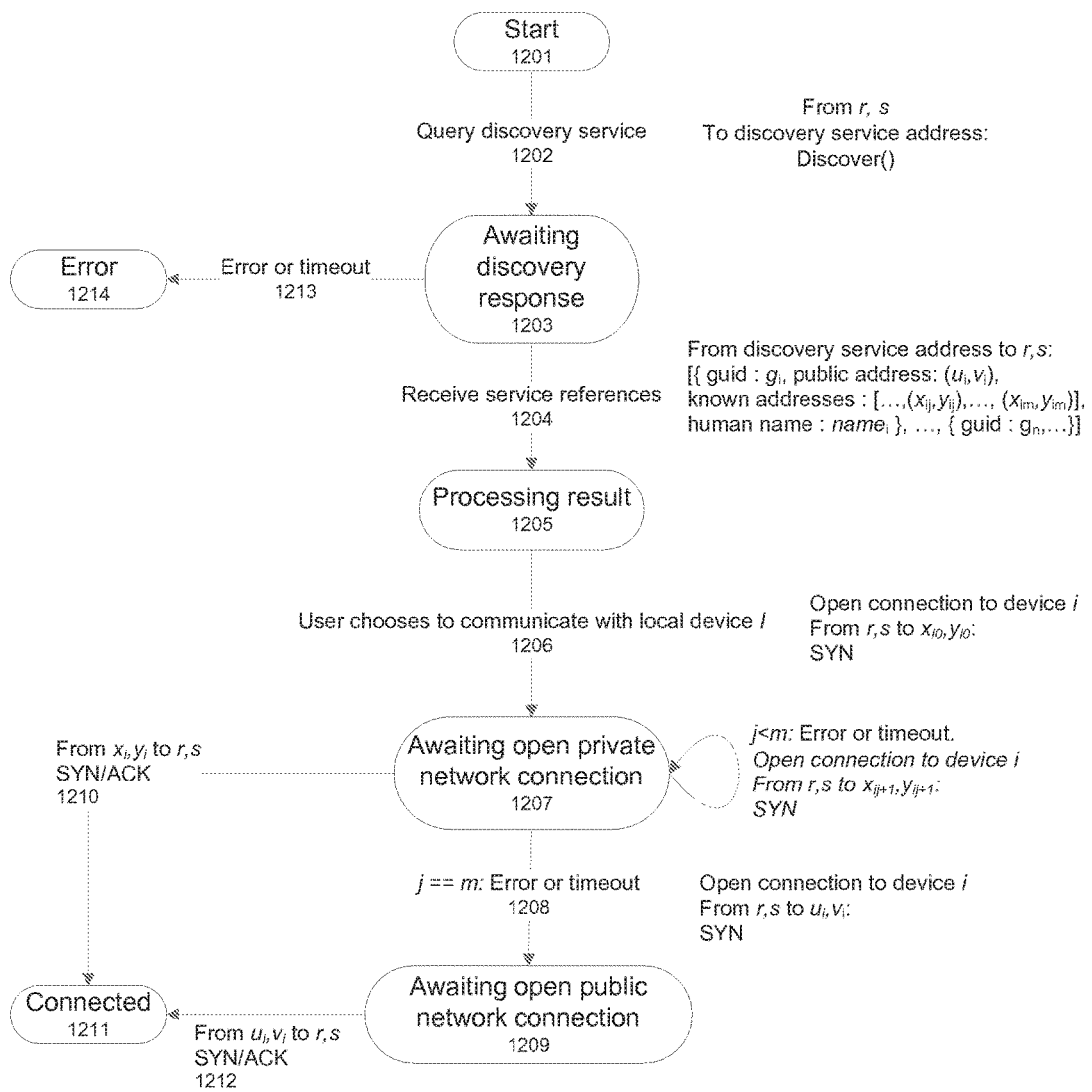
FIG. 12 presents a minimalist state machine for a sandboxed program implementing the direct embodiment to discover discoverable services within its private network.

FIG. 12 shows the state machine for a sandboxed program attempting to discover a service in the local private network then connecting to one selected by the user. Since more than one address may be reported for a given service, the sandboxed program attempts each in succession. Although this state machine shows each attempt to open a connection to the discoverable service occur in series, it is a trivial modification to the centralized embodiment's state machine to permit the connection attempts to proceed in parallel to reduce lookup time at the expense of potentially performing unnecessary queries.

The discovery state machine completes once the connection has been established 1211 because what is communicated over the connection is orthogonal to the discovery process.

Figure 13:
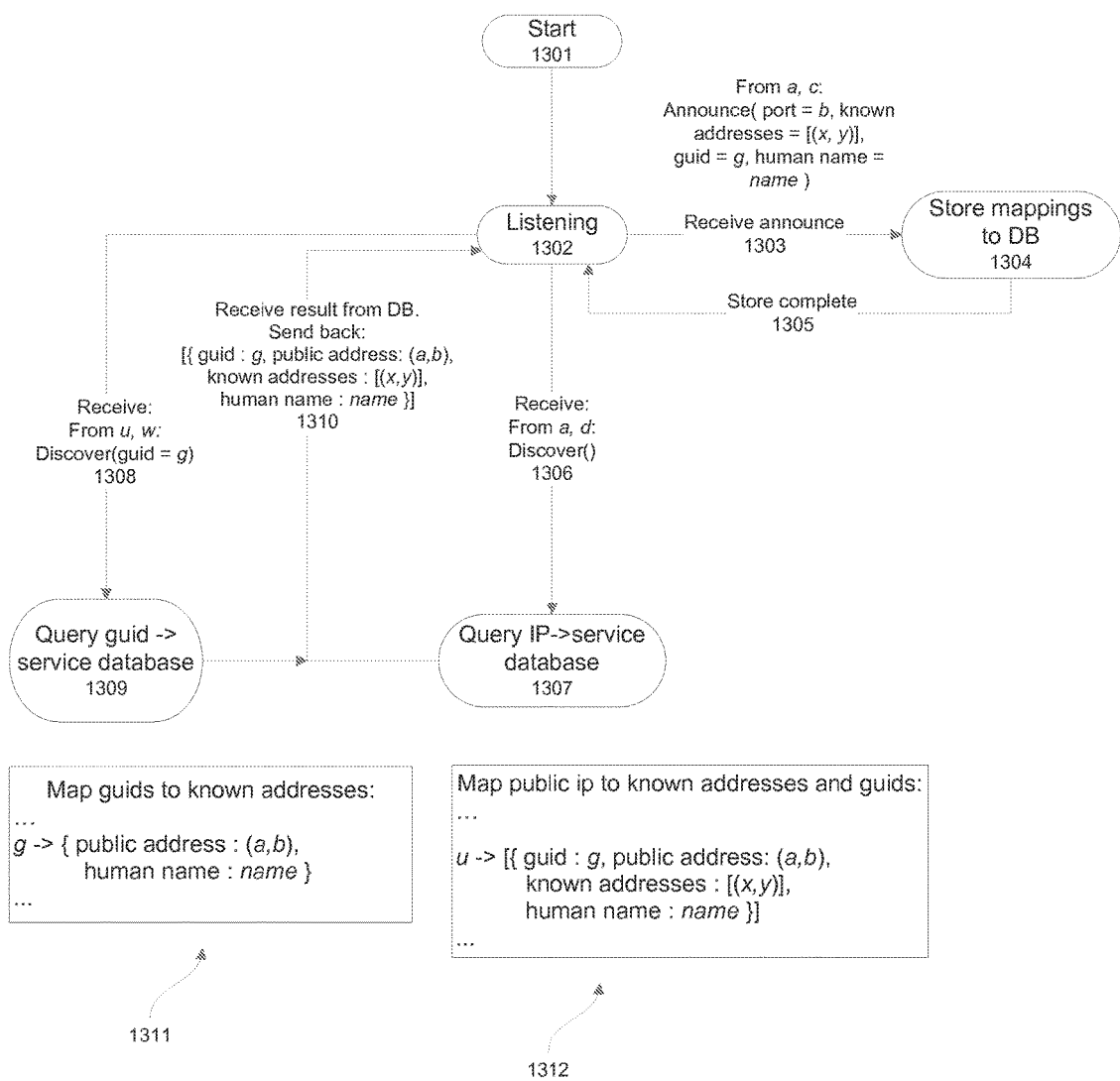
FIG. 13 presents a minimalist state machine for a discovery service implementing the direct embodiment to store state for announcements from discoverable services and to answer discovery requests from sandboxed programs.
Figure 14:
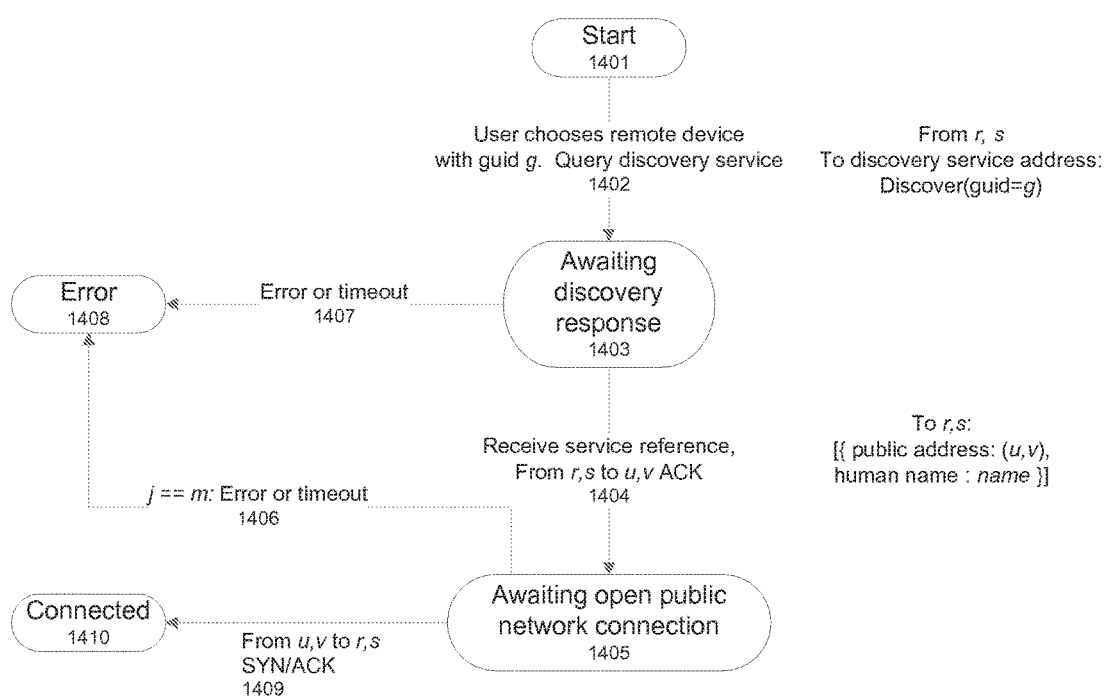
FIG. 14 presents a minimalist state machine for a sandboxed program implementing the direct embodiment to lookup a discoverable service's public address and other service information for a discoverable service believed to reside in a remote private network.

FIG. 13 shows the state machine for a sandboxed program looking up the current public address of a previously discovered service that is believed to not reside on the current private network, e.g., because it was returned in a preceding request to the discovery service for services on the same private network. If a timeout or error occurs while waiting for a response 1303 to a lookup on a GUID the state machine moves 1313 to the error 1314 state and stops: since there is only one public address once a request fails the centralized embodiment provides no further recourse for this service. Section 0 discusses embodiments that employ NAT traversal techniques and/or fallback to a global message queue.

Figure 15:
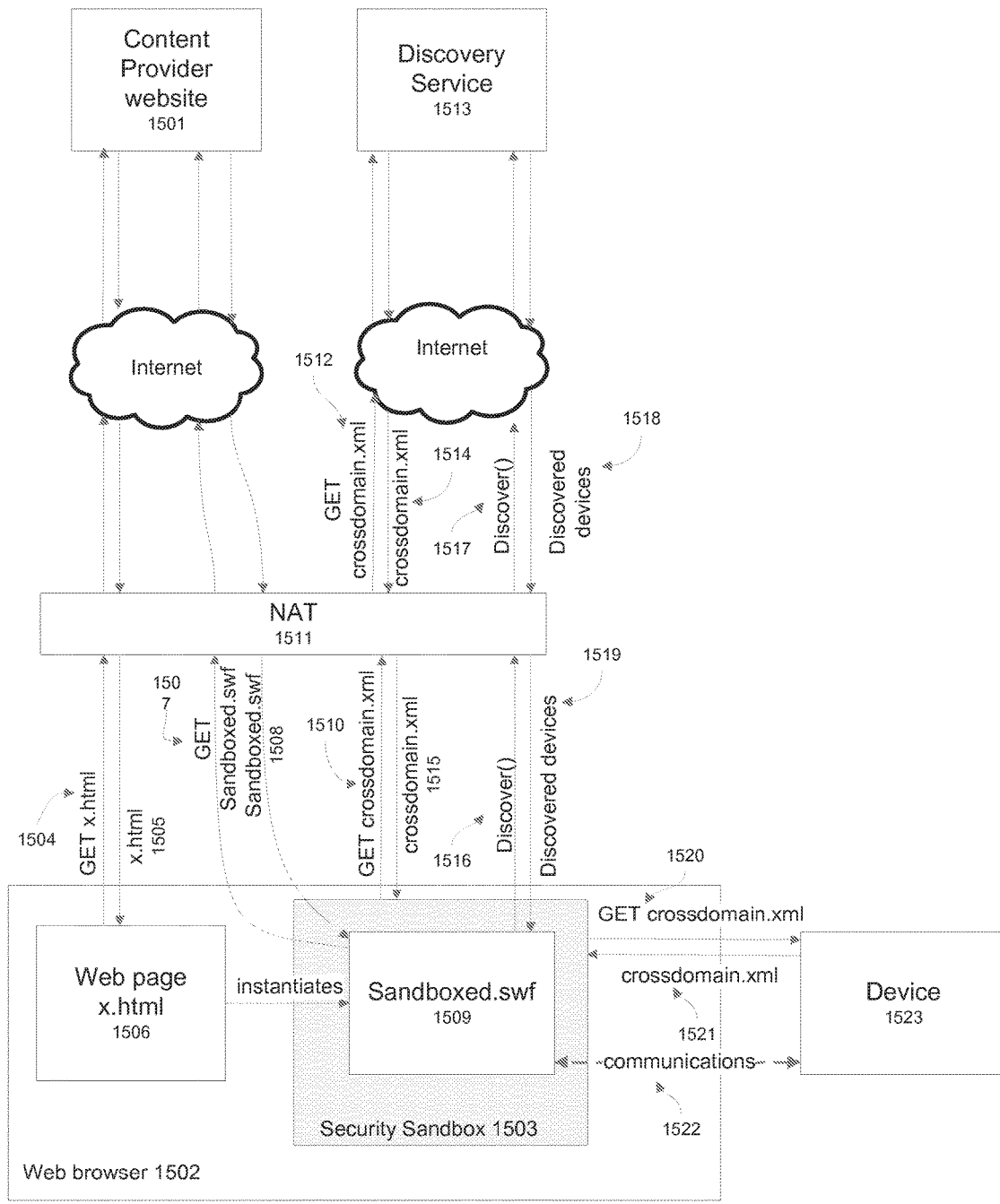
FIG. 15 provides an example of an embodiment where the security sandbox is Adobe Flash running within a web browser. The sandboxed program discovers a device running a discoverable service.

FIG. 15 shows a specific example of the direct embodiment. A web user surfs to a website 1501 downloads 1504 1505 a file x.html 1506 into his web browser 1502. The web page x.html 1506 contains markup that instantiates an instance of the Adobe Flash Player browser plugin passing "Sandboxed.swf." The Flash Player downloads 1507 1508 the Adobe Shockwave File (.swf) named "Sandboxed.swf" 1509 from the content provider's web site 1501. The "Sandboxed.swf" is written in Adobe ActionScript. The Adobe Flash Player runs "Sanbox.swf" 1509 in a security sandbox 1503. To find devices in its network, "Sandboxed.swf" calls the discovery service 1513, e.g., using an ActionScript XMLSocket or URLRequest. Since the discovery service 1513 resides across the network, the security sandbox 1503 requests permission to call the discovery service by requesting the discovery service's crossdomain.xml file 1510 1512 1514 1515. If the discovery service permits any website to query it then it has a crossdomain.xml file semantically identical to the following:

```
<?xml version=" 1.0"?>
<cross-domain-policy>
<site-control permitted-cross-domain-policies="all"/>
<allow-access-from domain="*" />
</cross-domain-policy>
```

Once the security sandbox 1503 interprets the crossdomain.xml file, assuming access is permitted the sandbox allows "Sandboxed.swf" 1509 to send a Discovery( ) query 1516 1517 to the Discovery Service 1513. Assuming device 1523 has previously announced to the Discovery Service and resides behind the same NAT 1511, the Discovery Service returns a list of discovered devices 1518 1519 containing the service information for device 1523.

Assuming the device 1523 has address (x,y), "Sandboxed.swf" 1509 references device 1523 as if it were a server using URL http://x:y/ . . .

Before permitting any communication with device 1523, the Flash security sandbox 1509 performs an HTTP GET 1520 for the URL http://x:y/crossdomain.xml and interprets returned crossdomain.xml file 1521. If the device allows communication from any website then the crossdomain.xml file 1521 is semantically identical to the crossdomain.xml file returned from the Discovery Service 1513.

Once the security sandbox 1509 has determined that communications are permitted, communication between the "Sandbox.swf" and the device commences.

Variations of the Direct Embodiment

As with variations of the centralized embodiment, a variation of the direct embodiment could omit the human name from the announce message with the same drawbacks.

In another variation, the announce message may omit the GUID, but when the GUID is omitted the sandboxed program lacks any identifier by which to lookup services on previously visited private networks. If no device communicates its GUID then there is no reason for the discovery service maintain the mapping from GUID to service information and GUIDs may be omitted from all other communication.

A variation that omits both GUID and human name in announce messages is also possible with the drawbacks of both the variations that omit only one of the two.

Security and Spam Prevention: The Two Sandbox Extension

In the embodiments discussed so far, the sandboxed program is given the known addresses and/or the GUID of the discoverable service. Although the sandboxed program is limited regarding what it can do to its local node, the sandboxed program is allowed to communicate across the Internet. Any information given to the sandboxed program could become public knowledge including the public address and the GUID: potentially anyone can forever communicate with the discoverable service. This section extends the direct embodiment to limits access to the GUIDs and addresses of discoverable service.

One traditional way to prevent undesired access is to introduce usernames and/or passwords. This is a reasonable solution, however usernames and passwords are examples of user configuration-in this case the configuration is often called user registration. Particular embodiments are provided that avoid user registration.

For purposes of illustration this section hereafter limits the scope of the services addressed to those offered by entertainment devices. However, this does not preclude using any embodiments with other types of services.

A prominent example use of the proposed embodiments is to allow video web sites to find televisions in the user's home and then tell the TV to play a video. This TV has enough persistent storage to store content metadata: information about videos, such as titles, descriptions, and URLs from which the videos can be streamed. The IP-enabled, on-demand TV exports a discoverable service by which a caller can list, add or remove, metadata. What are the threats posed by an attacker from somewhere on the Internet?

An attacker could
  add unsolicited metadata,
  delete metadata, or
  steal metadata the user has added to the TV thereby revealing viewing preferences.

IP-enabled Digital Video Recorders (DVRs) differ from IP-enabled on-demand TVs in that they have substantial persistent storage. If an IP-enabled DVR exports functions to the IP interface to list downloaded/recorded videos, download/record video, delete video, and share video then the attacker could
- steal a list of the videos a user has downloaded or recorded,
- consume storage with unsolicited videos.
- remove videos the user wishes to keep, or
- steal videos the user wishes to not share.

For most entertainment devices there appear to be three classes of attack: deletion, privacy invasion, and spam. The prior two could be damaging; the last is mostly annoying. In the worst case spam attacks could use up all storage on a DVR preventing desired recording.

A way to protect against deletion is to not export any deletion functions as part of the discoverable service. The easiest way to protect against privacy invasions is to not expose any metadata already in the device via the discoverable service. This leaves only spam attacks. The most damaging form of spam attacks can be mitigated by imposing resource restrictions. Do not allow newly added items to the device to consume more than allotted resources.

To address these threats consider a two-level security model for functions implemented by a device: protected and local. A local function is only available via interfaces that require the user's physical proximity to the device, e.g., buttons on the TV or on an infrared remote control. A protected function available via IP as a discoverable service but only to programs running on nodes in the same private network, programs that know the device's public address, or programs that know the device's GUID. Functions that perform critical activities like deleting files would probably be local. Functions that add content or metadata, or that tell the device to play content are still sensitive to spam and are thus deemed protected.

Spam is prevented to the extent the system protects the GUID and public address of the device untrusted, visited websites. Fortunately these pieces of information can be well protected using the constraints imposed by the security sandbox. As stated in Section 0:

Sandboxed programs may not be permitted to communicate with other programs running within other security sandboxes except via a limited, mutually agreed programming interface enforced by the sandboxes.

A program running in a separate sandboxed program downloaded from a trusted website performs service discovery. Devices then only expose service information to the trusted website. This example assumes that the discovery service and the website delivering the discovery sandboxed program work together as a trusted entity. Particular embodiments hereafter refer to the discovery sandboxed program as the discovery agent.

Particular embodiments hereafter refer to this as the two sandbox extension. The two sandbox extension can be applied to the centralized and direct embodiments though this section presents it in the context of the direct embodiment.

Figure 16:
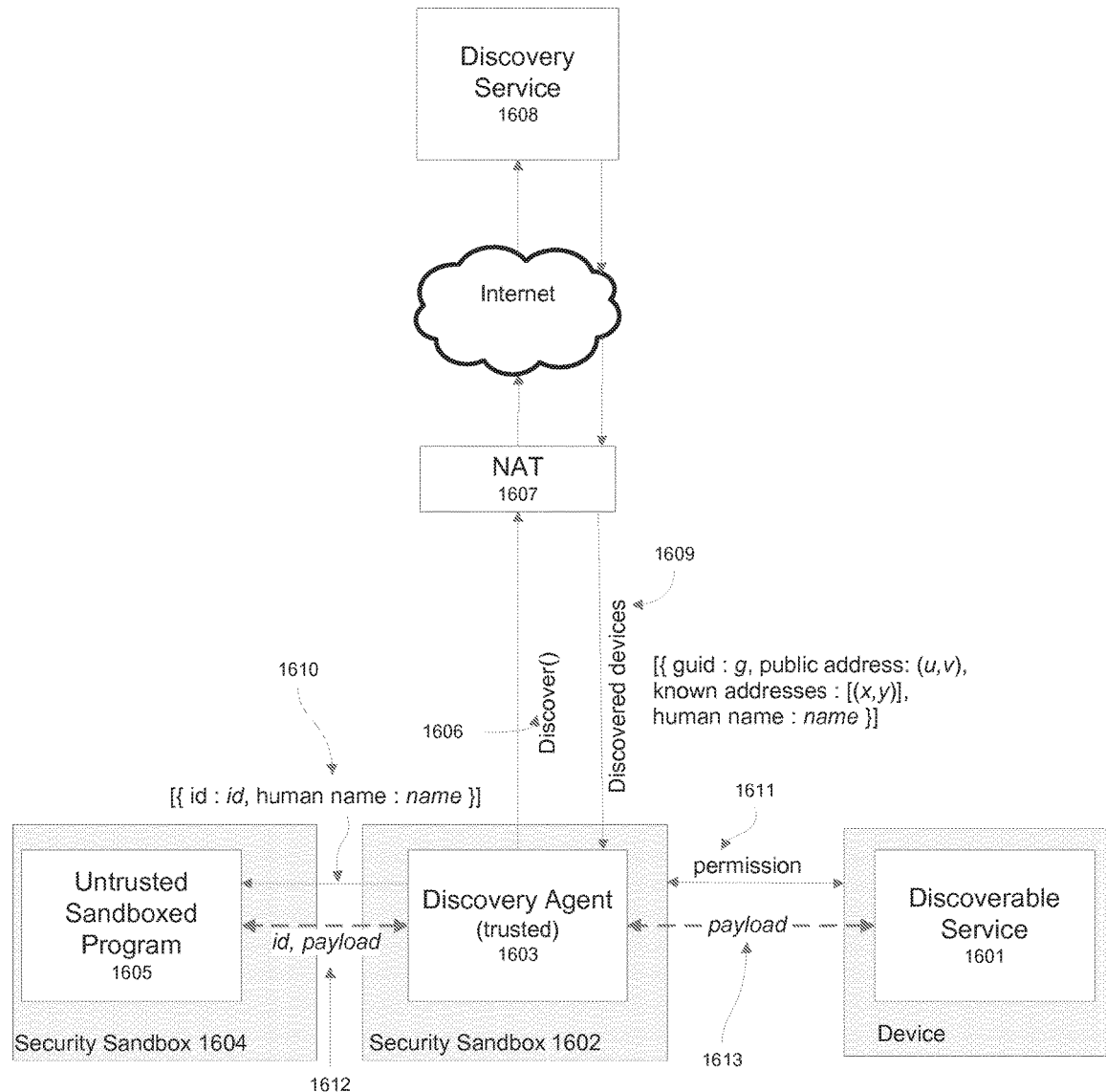
FIG. 16 illustrates the separate discovery agent extension to the direct embodiment.
Figure 17:
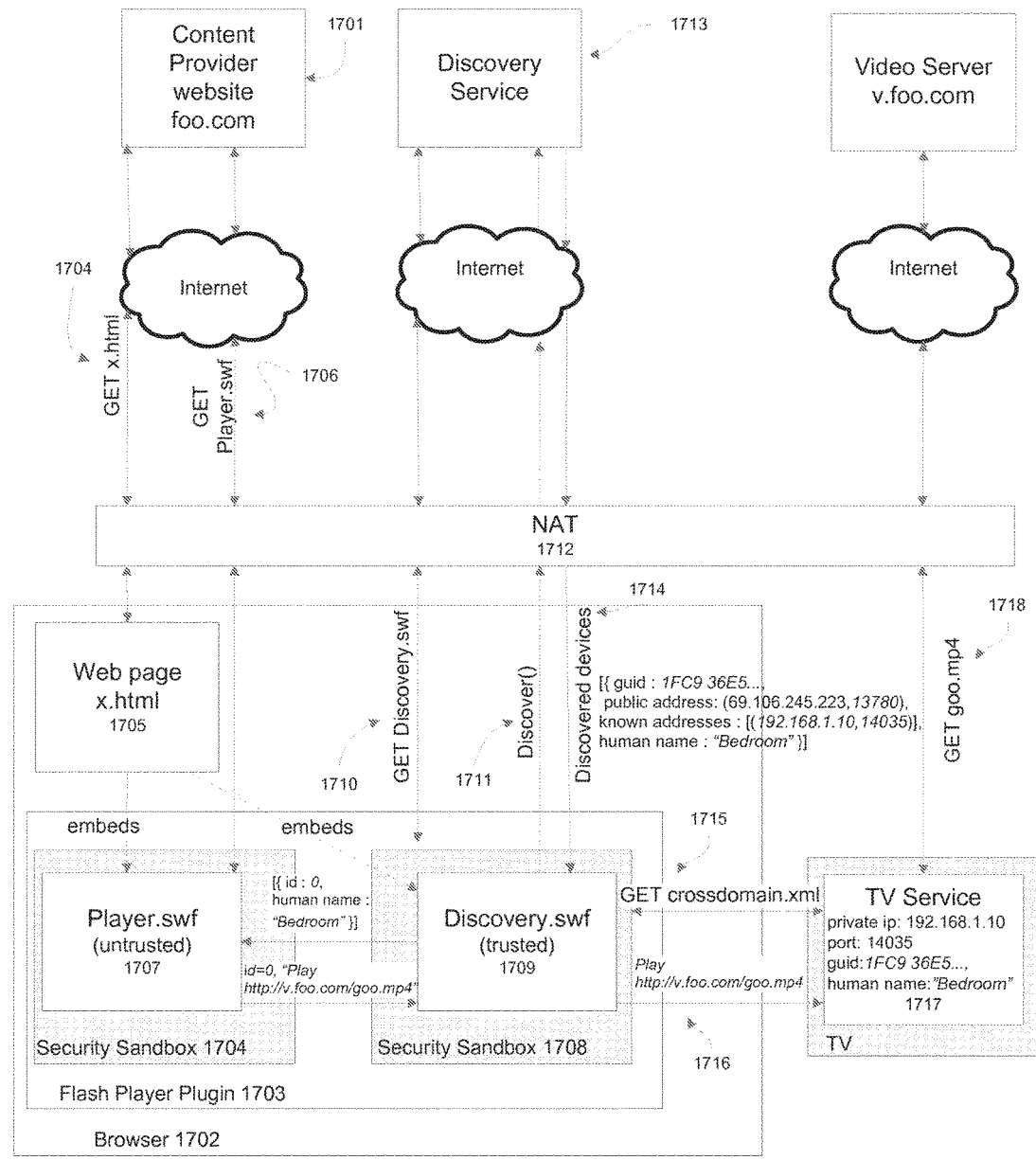
FIG. 17 illustrates the separate discovery agent extension as exemplified using Adobe Hash embedded in a web page.

FIG. 16 illustrates the two sandbox extension and FIG. 17 illustrates the TV example discussed in the previous paragraphs.

In FIG. 16, the are two sandboxed programs: untrusted 1604 1605 and the discovery agent 1602 1603. The two sandboxed programs communicate via a mutually agreed programming interface. The discovery service 1608 and discoverable service 1601 act the same as in prior embodiments and with any of the discussed extensions. The discovery agent 1603 calls Discover( ) 1606 on the discovery service 1608. The discovery service returns a set of discovered services 1609. The discovery agent remembers then strips everything from the discovery service response except the human names of each service. It then associates a locally unique identifier id 1610 with each human name. If the human names are ordered then the index in this ordering is a unique identifier. The purpose of including a separate id is to allow consistent identifiers while human names appear or disappear from the list across updates sent from the discovery agent during the lifetime of the untrusted sandboxed program.

Since the untrusted sandboxed program 1604 only has access to human names and local identifiers and those local identifiers are only meaningful to the discovery agent, the untrusted sandboxed program can only communicate with discovered services via the discovery agent. When the untrusted sandboxed program wishes to communicate some arbitrary payload to a discovered service, it sends the payload 1612 to the discovery agent with the id of the sandboxed program to which the payload should be sent. The discovery agent then forwards the payload 1613 to the discoverable service with or without the id and likewise the discovery agent forwards any response from the discoverable service to the sandboxed program.

If the entrusted sandboxed program leaks the human names to a third-party this does not compromise any address or global identifier that the third party could exploit to communicate with the discovered service.

FIG. 17 provides an example instantiation of the direct embodiment with the two sandbox extension. The example uses Adobe Flash using two SWFs: "Player.swf" 1707 and the discovery agent here named "Discovery.swf" 1707. "Player.swf" represents an untrusted sandboxed program as are all sandboxed programs downloaded from any server other than the discovery service. The user visits web page 1705, containing references to both SWF's causing the browser to start the flash player plug-in 1703. The flash player plug-in 1703 constructs a separate security sandbox 1704 1708 for each SWF. The flash player then loads 1706 "Player.swf" 1707 from the content provider website 1701, and then the flash player 1703 loads the discovery agent from the discovery service 1713. Once instantiated, the discovery agent 1707 queries 1711 the discovery service 1713. The discovery service then returns 1714 references to any devices residing behind the same NAT 1712 as the discovery agent, i.e., the discovery services return references to devices announcing from within the same private network.

The discovery service and the content website have different domain names and thus the flash player prevents the two sandboxed programs from communicating with one another except via a programming interface explicitly exported by each SWF. For example, the two SWFs can export JavaScript call interfaces using ActionScript's ExternalInterface:

ExternalInterface.addCallback("play", play);
function play(tv_id:int, video_metainfo:Object):void { . . . }

The discovery agent might use the above code to export a call named "play" that allows "Player.swf" 1707 to tell the device to play content described by the video_metainfo argument. The video metainfo is represented as an URL in a "play" call 1716 passed from "Player.swf" identifying service with id=0 and then forwarded. by "Discovery.swf" to the TV service 1717. The TV then downloads 1718 the video from foo.com.'s video server.

Similarly "Player.swf" 1707 might export a JavaScript call via which the discovery agent communicates references to newly discovered devices:

ExternalInterface.addCallback("tv_update", tv_update);
function tv_update(tv:Array):void { . . . }

Because all communications between the untrusted sandboxed program and the discovered service, e.g., the TV, pass through the discovery agent, the discovery agent stands in the unique position to enforce policy: preventing or modifying communications between the untrusted sandboxed program and the discovered service according to rules imposed by the user.

Figure 18:
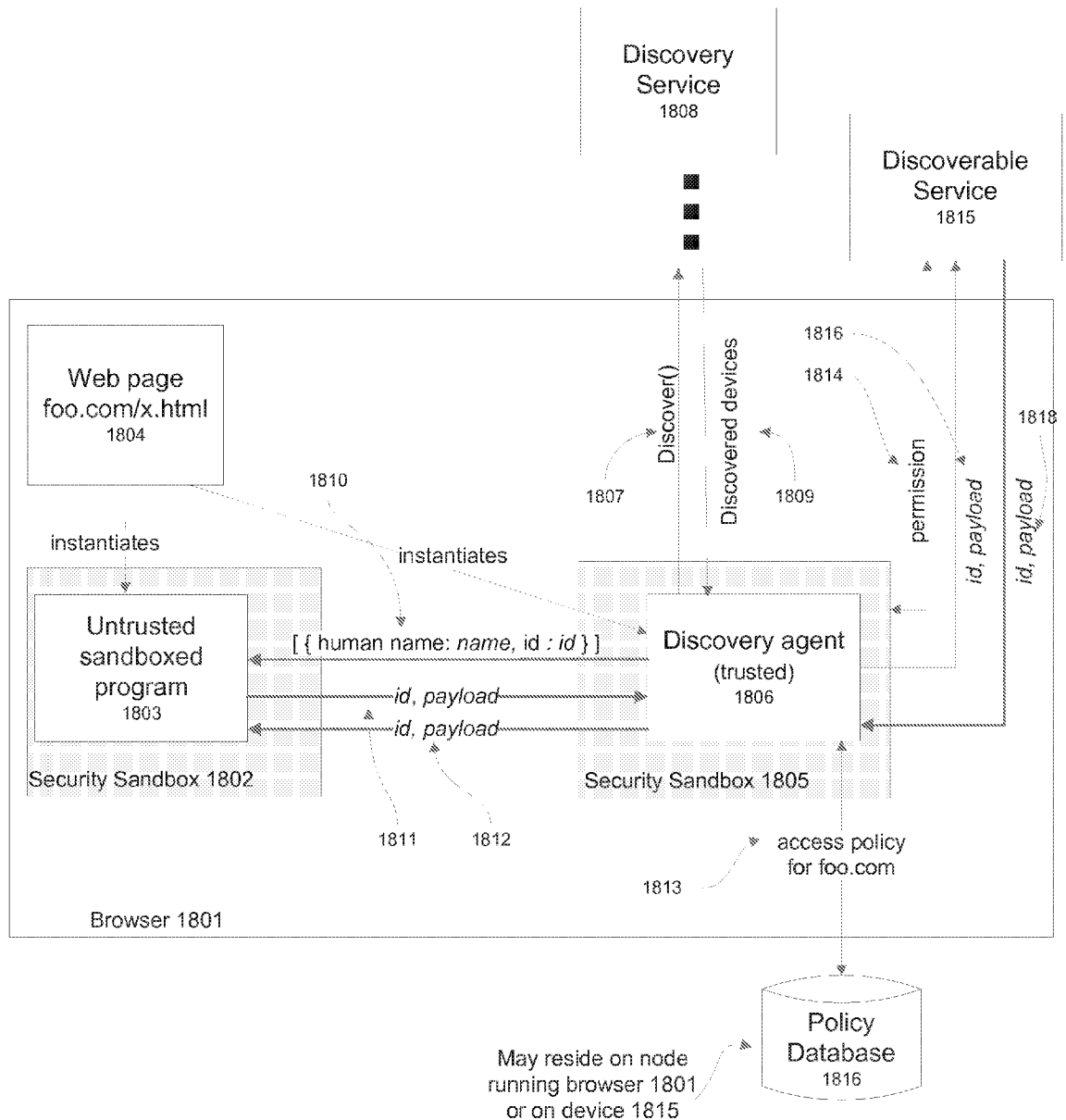
FIG. 18 illustrates he policy extension as used with the direct embodiment.

FIG. 18 illustrates a policy extension to the direct embodiment with the two-sandbox extension. Once the discovery agent 1806 has obtained references 1807 1808 1809 to discoverable services announcing from within the same private network, the discovery agent 1806 sanitizes the discoverable service references by replacing the globally unique identifiers with local identifiers and by removing all network routing information including each service's public and private IP addresses and ports. The discovery agent then passes the sanitized references to the untrusted sandboxed program 1803. Since the untrusted sandboxed program only knows locally unique information, it cannot directly open connections to the referenced devices and thus must forward all communications 1811 to discoverable service 1815 through the discovery agent 1806.

Upon receiving a communique the discovery agent 1806 determines the sender of the communication. For example with ActionScript, the discovery agent can determine the URL of http://foo.com/x.html 1804 via the ExternalInterface:

var page_url=ExternalInterface.call("eval", "window-
.location.href");

From page_url, the discovery agent 1806 extracts the domain name of the content provider website foo.com. The discovery agent then queries a policy database for access restrictions for foo.com. When there is no policy present in the database, the discovery agent may prompt the user. For example if the discovery agent 1806 is a SWF, the discovery agent could use ActionScript's ExternalInterface to prompt the user with a confirm modal dialog box asking whether a website is allowed to send a video to a TV:

var allow:Boolean=ExternalInterface.call("confirm",
"Allow"+domain_name(page_url)+"to send
video to your TV?"); update_policy(domain-
_name(page_url), allow);

if (allow) send_to_tv( . . . );

In the code snippet above, update_policy stores policy for domain_name(page_url). domain_name(page_url) returns the domain name portion of page_url.

The policy database can reside in persistent storage on the computer running the discovery agent or the policy database can reside in the device on which the discovery agent runs or the policy database can he distributed across both. When the policy device is in the computer running the discovery agent, the policy moves with the personal computer (e.g., a laptop) and can be applied across devices. When the policy is stored in the device running the discoverable service, the policy can apply to all users of that device. Furthermore policy stored in the personal computer is available before communication with the device is achieved and can thus be used to rapidly remove unavailable user options, but a policy database on the personal computer is also limited to the constraints imposed by the sandbox. Adobe Flash, by default, limits each website to 100 KB. This is sufficient to locally store domain names and a few associated Boolean access flags for thousands of web sites. Unfortunately if the user clears Adobe Flash website storage then all policy is lost. A device may have much larger storage for policy and is less likely to allow a user to accidentally delete all policy.

"Player.swf" 1707 may be replaced with any sandboxed program including those not running in Adobe Flash. Likewise the discovery agent 1709 1806, may be written in any language and run-time environment that imposes a security sandbox meeting the constraints specified in Section 0. The device references 1714 1809 returned from the discovery service 1713 1808 contain all of the information illustrated in FIG. 3 (see messages labeled 310 and 311), or subsets of this information as described in Section 0. In this example, the discovery service communicated references to TVs, but the device can be any device. Furthermore, the communications need not be limited to communicating "play" messages but rather anything that can be communicated over a network.

Sharing Discovery State Across Web Pages Domains

In the example in FIG. 17, the discovery agent 1709 is a SWF downloaded from the discovery service 1713. SWFs run in an Adobe Flash sandbox. Adobe Flash allows Discovery.swf to access state stored by Discovery.swf regardless of which website embedded Discovery.swf. Disocovery.swf could thus store a query result from foo.bar and reuse it at bar.com. Since Discovery.swf may be cached, the user may be able to surf the web without contacting the discovery service on every page load that contains Discovery.swf.

Sharing state between page loads also enables a user to visit a network once and be able to communicate with a discovered service when the service is no longer in the same private network and thus does not appear in a response from the discovery service. Remote communications is discussed in Section 0.

Variations on the Two Sandbox Extension

The discovery agent may have its own UI for selecting discoverable services. The sandboxed program may communicate what it wants to communicate that the discovery agent, which then ands to the discoverable service. In this variation the untrusted sandboxed program is not old a locally unique id or human name of any discoverable services.

As another Adobe Flash example of the two sandbox extension, the limited, mutually agreed programming interface between the two sandboxes could use the LocalConnection class rather than JavaScript. However, any limited, mutually agreed programming interface suffices.

Remote Communications

Problems related to communicating between nodes with one or more intervening NAT are generally known as NAT traversal problems. This section describes how the direct embodiment enables a client that previously discovered a service to communicate with that service when the client and service no longer reside in the same private network. Such communication by the definition of private network implies traversing one or more NATs. This section then discusses embodiments that handle a wider array of NAT traversal problems.

When contacting a service's known addresses fails and the service does not appear in the response to a query for local private network services, the sandboxed program assumes the previously discovered service resides in another private network or is no longer operational.

In the direct embodiment presented in Section 0 and as illustrated in FIG. 3, the service information returned in response to Discover( ) 310 311 contains each service's GUID. The GUID is a globally unique identifier that persists across time and across network changes, and thus can be used to identify a service even when the service is no longer in the same private network. Because the identifier persists across network changes, its value is independent of network routing, and thus to route packets to a service not on the same private network requires mapping the GUID onto the service's public-address. As shown in FIG. 2, the discovery service maintains a mapping from GUID to service information that includes the service's public address 208.

Figure 19:
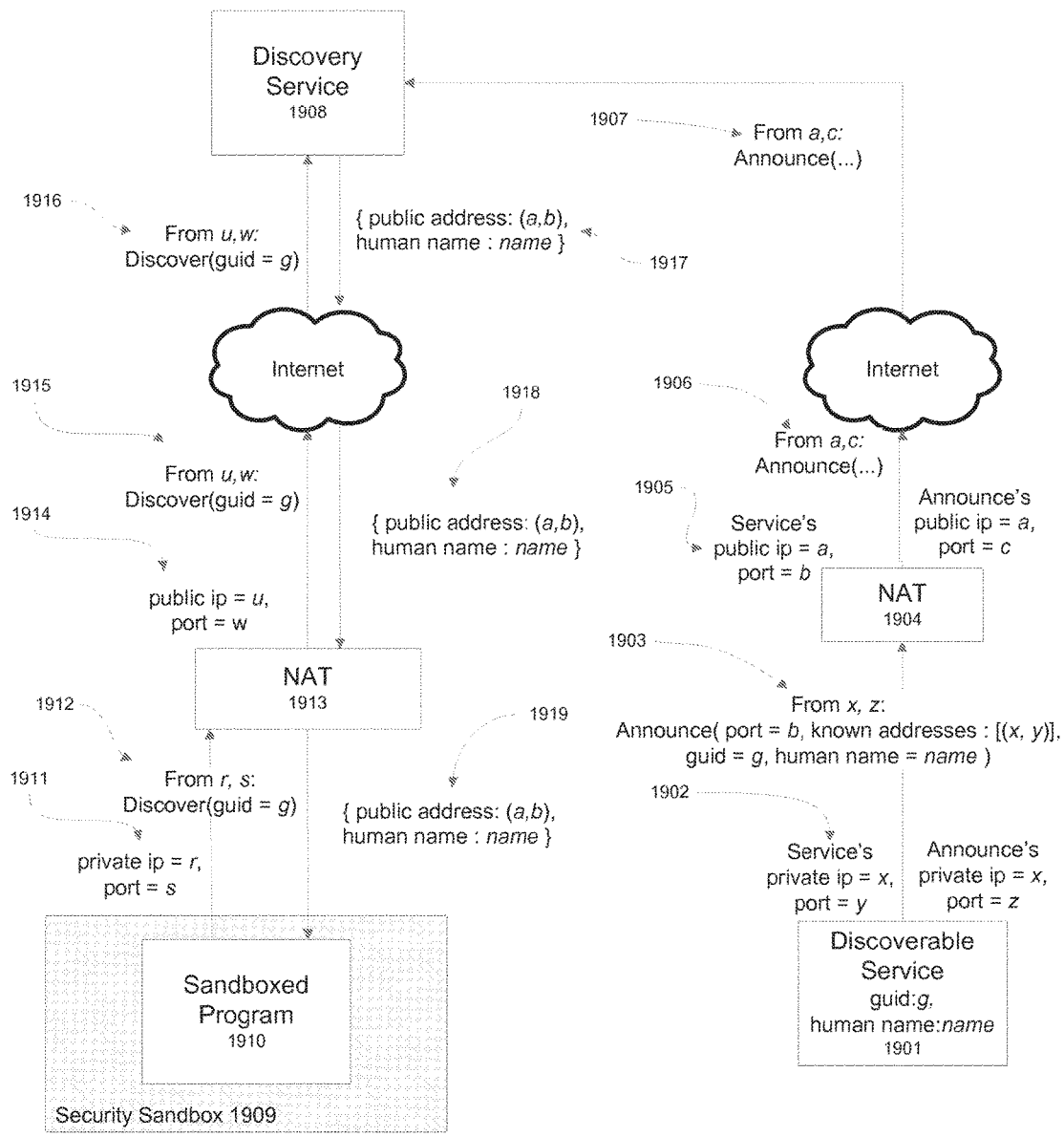
FIG. 19 illustrates announcing and discovery the remote extension to the direct embodiment.

FIG. 19 illustrates the process used by the direct embodiment of discovering service information based on GUID. The device 1901 901 announces using the same process as illustrated in FIG. 9. The discoverable service 1901 communicates its service's private addresses 1902 902, the public port mapping setup in the NAT (discussed momentarily), the GUID and the human name 1903 1906 to the discovery service. As the packets communicating this information pass through the NAT 1904, the private IP and port 1902 that were placed in the IP headers are mapped onto the public IP of the NAT and a port mapped for the service's announce 1905. The discovery service 1908 then stores the service information including the GUID in the two mappings 908 and 909. When the sandboxed program 1910 queries passing the GUID 1912 1915 1916, the discovery service maps 908 from GUID to the service information and returns the service's public address and human name 1917 1918 1919. Once the sandboxed program has the service's public address, it may open a connection to that address over which it communicates with the service.

A port mopping is the mapping between a private ip-port to one of the NAT's public IP addresses and one of the NAT's public ports. A NAT usually sets up a port mapping automatically when a program inside the NAT's private network initiates a TCP connection or starts a UDP packet exchange with any node outside the private network. However when a packet arrives on one of the NAT's public network interfaces bearing a port number for which there exists no mapping, the NAT typically discards the packet. There is one exception: some NATs implement a way to designate a single node within the private network to handle all packets that arrive on a public port for which there exists no port mapping. Forwarding all packets addressed to unmapped ports to a particular private node is sometimes called placing the private node in the DeMilitarized Zone (DMZ). Some NATs support mechanisms for explicit port mapping, whereby an application running within the NAT's private network can tell the NAT to establish a port mapping without initiating a connection to any particular node outside the private network. NAT-PNP and uPNP specify mechanisms for explicit port mapping. NAT-PNP and uPNP are preferable to placing a node in the DMZ since placing a node in the DMZ opens that node up to various security threats.

Because a user trying to communicate with a service running on a different different private network is initiating a connection via a NAT, the NAT must either be particularly unrestrictive (e.g., implementing a DMZ) or it must provide explicit port mapping. This section later describes embodiments that do not require explicit port mapping.

If a NAT does not support NAT-PNP or uPNP, most NATs provide a web user interface by which user's can manually set up port mappings or designate a device responsible for all packets to unmapped ports. NAT-PNP or uPNP are obviously preferable since they do not require any user configuration.

Figure 20:
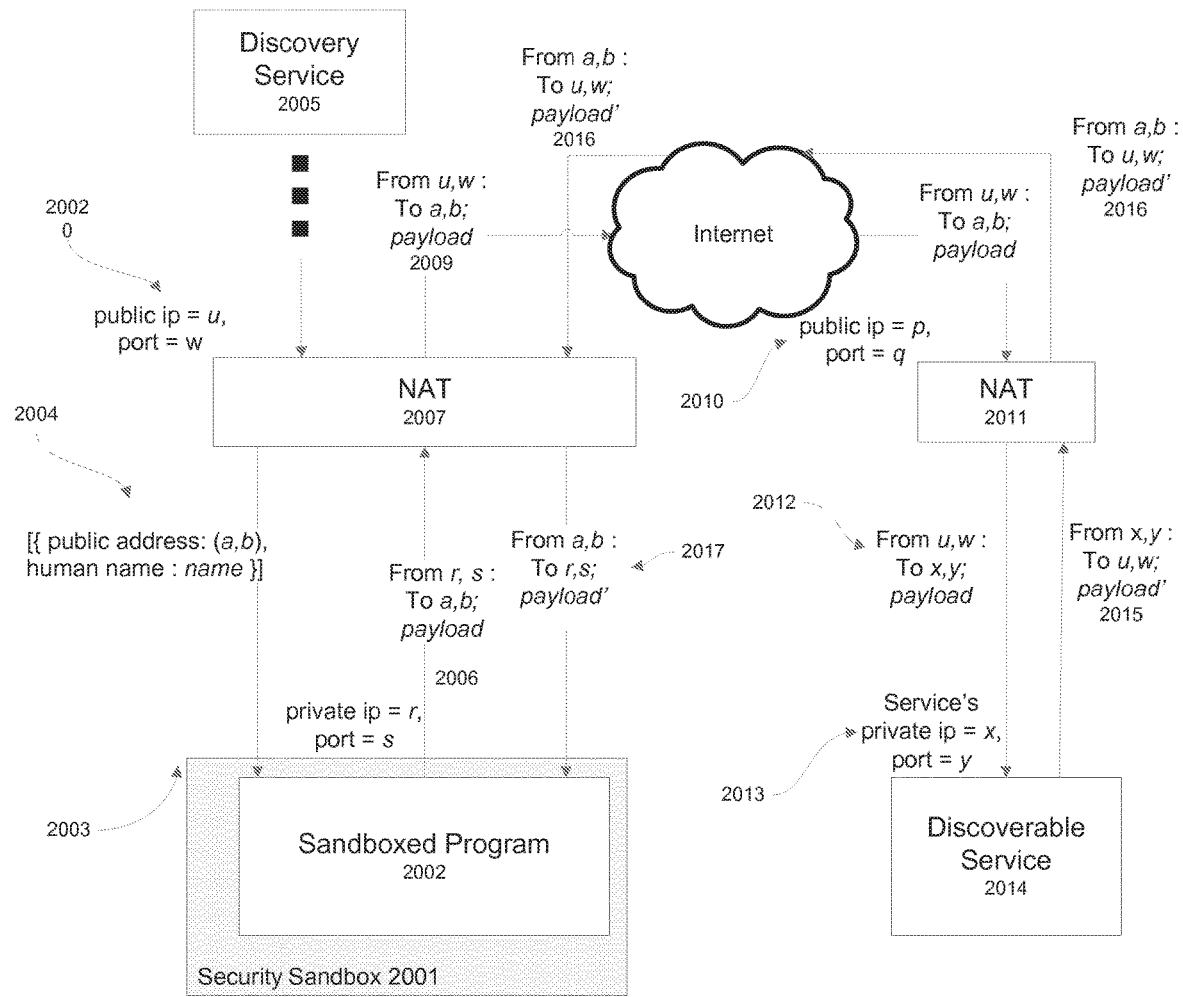
FIG. 20 illustrates direct communication between a sandboxed program and a discoverable service on different private networks.

FIG. 20 illustrates a sandboxed program opening a TCP connection to and then communicating with device 2014 on another private network assuming a port mapping exists in NAT 1904 2011 from the device's public address (p,q) to its private address (x,y). The sandboxed program 2002 obtains the public address of the device 2014 from the discovery service 2005. The sandboxed program establishes a connection by sending a packet containing a TCP SYN 2006 addressed from the sandboxed program's node's private address (r,s) to (x,y). Since the connection initiator is within NAT 2007's private network, the NAT automatically creates a port mapping from the connection's private address (r,s) to the NAT's public IP address u and a newly allocated public port w. NAT 2007 then replaces the sandboxed program's private address (r,s) with (u,w) in the SYN's IP and TCP headers. The NAT then forwards the newly addressed SYN packet 2009 across the Internet to NAT 2010.

Assume prior to the events depicted in FIG. 20, explicit port mapping or user manual configuration was used to setup up a port mapping in the NAT between public address (p,q) and the service's private address (x,y). Because a port mapping exists when the SYN arrives at NAT 2010, the NAT replaces the destination address (p,q) with the discovered service's private address (x,y) and forwards the SYN 2011 to the private network and on to device 2012. The discovered service running on device 2012 responds with a SYN/ACK 2013 2014 addressed to the source address (p,q) taken from the received SYN. When SYN/ACK 2014 reaches NAT 2007, the NAT uses the mapping that had been created by the initial SYN 2006, to forward the SYN/ACK packet 2015 back to the sandboxed program 2002 running at (r, s).

Once the SYN/ACK arrives, the sandboxed program acknowledges the SYN/ACK. The ACK to the SYN/ACK follows the same path through the illustration as the initiating SYN. At this point, the connection has been established between the sandboxed program and the discovered service on device 2012.

Once the connection has been established, communication commences. What is communicated is orthogonal to the discovery process.

FIG. 20 illustrates how the direct embodiment with the addition of explicit port mapping handles NAT traversal across two NATs: one sits between the sandboxed program and the public Internet and the other between the discoverable service and the public Internet. The cases where 1 or both NATs are omitted are degenerate cases that are easily handled: when there is no intervening NAT between a party and the public network, the party's private address and public address become one.

Multiple NATs between the sandboxed program and the public Internet represents little difficulty in practice since the sandboxed program initiates communications 2008. However, explicit port mapping may fail when there are multiple NATs between the discoverable service and the public Internet.

The direct embodiment without explicit port mapping often requires some form of manual user configuration to permit remote access over TCP.

The next section considers embodiments that can traverse a wider variety of NAT scenarios.

Advanced NAT Traversal

NATs implement port translation in various ways. For all descriptions consider the case when a private node initiates communications by sending a packet bearing private source address (x,y) and publicly routable destination address (a,b). The most restrictive NATs are sometimes called symmetric NATs. With symmetric NATs, the mapping exists only between (x,y) and (a,b). Packets arriving at the NAT from the public network with destination (x,y) but with source address other than (a,b) are discarded. Symmetric NATs are the most difficult to traverse and we propose only one embodiment that can traverse such NATs: the global message queues embodiment.

The global message queues embodiment extends the direct embodiment as well as any of the other embodiments discussed with message queue for each service that announces to the discovery service. A message can contain arbitrary information and the message can span a single packet or multiple packets. The message queue stores the message for at least long enough for a normally operating discoverable service to poll the queue and download any pending messages. The message queue solution casts both the sandboxed program and the discoverable service in the role of communication initiator: the sandboxed program initiates communication to push the message; the service initiates communications when it polls. Thus the NAT traversal will succeed for almost any NAT including symmetric NATs by virtue of NAT's automatically establishing port mappings for communications initiated from within any of a NATs private networks.

Providing a global message queue per discoverable service has unique benefits that make it useful in combination with all of the NAT traversal techniques we discuss:

It gracefully handles devices that are periodically unavailable, e.g., powered off part of the day.

It works with almost every NAT.

However, the global message queues embodiment has a number of drawbacks that make it the logical last resort when attempting to communicate with a device:

If the global message queue is to provide reliable message delivery then the global message queues require storage of messages for all otherwise unreachable devices until a time has passed that is substantially longer than the typical time that devices remain unpowered. This introduces the need for systems with reliable persistent storage.

It introduces a new piece of central infrastructure that must be maintained.

The global message queue service must scale to handle periodic polls from every discoverable service, i.e., every device running at least one discoverable service, even for devices for which no messages have been pushed.

The global message queue introduces late messages as long as the poll period for devices that are active (e.g., powered on), and longer for devices that are temporarily inactive Some of these drawbacks are no worse than the drawbacks of a global discovery service, since it represents central infrastructure that too must scale to handle periodic announces from all discoverable services, However the global discovery service can be completely implemented with soft state and thus does not require persistent storage.

As an example, global message queues can be implemented using Internet electronic mailboxes, a.k.a. email mailboxes. Global message queues have not previously been designed for use with a sandboxed program, and thus to work global message queues are extended to return "explicit permission to communicate" (see Section 0). For Adobe Flash, this means the global message queue must return a crossdomain.xml file. Extending a global message queue to return "explicit permission to communicate" and in particular return a crossdomain.xml file novel.

Consider a less restrictive NAT that forwards all packets addressed to public address (x,y) regardless of each packet's public source address. Such NATs are sometimes referred to as full cone NATs. In another embodiment, the discoverable service announces to the discovery service with a source port that is bound to the same port on which the discoverable service listens, i.e., port y=z in FIG. 20. z is no longer ephemeral, and v=w. By doing this, the announce to the discovery service establishes the port mapping that is used by remote sandboxed programs to initiate communications with the discoverable service.

In yet another embodiment, the discovery service periodically sends a SYN to a random maybe unreachable or nonexistent public IP address but from the port on which the service listens, i.e., port y in FIG. 2, in order to establish the port mapping.

Additional embodiments can incorporate any subset or all of the following NAT traversal mechanisms: Simple Traversal of MP over NATs a (STUN), "STUN and TCP too" (STUNT), port prediction, and TURN.

With STUN, a STUN client on a private node contacts an a priori known STUN server. The STUN server interrogates the private node to determine what kind of NAT(s) might reside in the path between the server and the private node. By this means, a service running on a private node can learn its public address on its outer most NAT and whether it is likely that other nodes would be able to communicate with the service via this public address. Via some external mechanism, the service communicates the public address to peers that might want to contact the service, e.g., our proposed discovery service could be used. The discovery service by virtue of returning the public address already provides much of the relevant functionality provided by STUN. However, an embodiment that uses STUN to discover the public address and then communicates the public address via our discovery service is novel.

STUN by itself does not provide any mechanism for traversing more restrictive NATs like symmetric NATs. STUN is also not designed for use with TCP. Even if the discoverable service speaks UDP, the sandboxed program is limited to HTTP over TCP. There is no guarantee that a public address returned by STUN correlates to a public address available for incoming TCP connections from remote sandboxed programs.

With STUNT, the client uses UDP and TCP to communicate with a server sitting on the public network. This server implements STUN plus it listens for TCP connections. The server communicates back to the client the client's public addresses for the TCP and UDP exchanges with the server. The client then communicates via an external mechanism typically the Session Initiation Protocol SIP to tell a peer to attempt to establish communication. The client and the peer simultaneously or near simultaneously send packets to each other using each other's respective public addresses. This initial exchange sets up mappings in the intervening NAT(s): the process is sometimes called hole punching. Sometimes the hole punch succeeds and further bidirectional communication can commence. When a hole punch attempt fails, the client and peer may attempt communicating on port numbers neighboring the public port numbers to exploit port allocation patterns in many NATs: this is called port prediction.

A STUNT embodiment combines the TCP-part of STUNT with the direct embodiment. STUN and STUNT are not designed to communicate with sandboxed program, as such in the STUNT embodiment, the STUNT server provides the sandbox with explicit permission to communicate.

A flash-reachable STUNT server speaks HTTP and returns a sufficiently permissive crossdomain.xml file (see Section 0). Extending STUNT to communicate with a sandboxed program is novel.

Although STUNT can sometimes penetrate NATs, it depends on the effectiveness of port prediction. STUNT will not work with symmetric NATs that have random port allocation patterns. The only way to ensure communication can take place is to fall back to a global message queue or to a relay. A relay sits on the public network forwarding packets back and forth between a private node and private or public nodes anywhere on the network.

A TURN server acts as a relay. Assume a private node P with private address P' sits behind a NAT that does not allow public nodes to establish connections to P. Assume also that a TURN client runs on P. The TURN client initiates communication with the TURN server thereby establishing a mapping in the NAT between the private node and the TURN server. The TURN server can now talk to P whenever it wants so long as the TURN client maintains the mapping by periodically talking to the TURN server. The TURN server then listens on a public address P''' on behalf of P. P' and P''' differ in that packets address to P''' are mutable over the public Internet. The TURN server forwards any packet sent to P''' to P via the existing mapping in the NAT. Relay solutions such as TURN can traverse even symmetric NATs with random port assignments; however, all relay solutions are quite heavyweight and should only be used as a last resort, or as a second-to-last-resort if global message queues are also employed in the system. Message queues (as defined) differ relays such as TURN servers in that message queues are polled by the discoverable service whereas a relay forwards packets or messages as soon as they have been received. Message queues may store messages until they can be delivered and are thus better at reaching temporarily-powered-off discoverable services.

In a TURN embodiment of the proposed invention, a slightly-extended. TURN server relays communications between a sandboxed program and the discoverable service. As with STUN, a TURN server must be sandbox-reachable, and with Adobe Flash this implies that a flash-reachable TURN server must return a crossdomain.xml file and must be able to perform all communications over HTTP. Extending TURN to communicate with a sandboxed program is novel.

Interactive Connectivity Establishment (ICE) (21) combines STUN and TURN. It is trivial to consider an embodiment that combines both the STUNT embodiment and the TURN embodiment and call this the ICE embodiment. Extending ICE to function within the constraints imposed by the security sandbox is extending STUNT and TURN in the aforementioned ways and thus is novel in the same ways.

STUNT, TURN, and ICE provide no mechanisms for discovering STUNT or TURN servers. STUNT or TURN servers could announce to the discovery service in the same manner as discoverable services.

TURN is a specific kind of relay and may be more complicated than is needed for communication establishment in some embodiments A scalable simple relay embodiment he which each simple relays has a sandbox-reachable interface and optionally a TCP interfaces is provided. When a simple relay has a TCP interface that is less restrictive than the sandbox-reachable interface then it is called the simple relay TCP interface. TCP is distinguished from sandbox-reachable (e.g., HTTP for Flash) because the sandbox reachable interface may be more restrictive than TCP.

In the simple relay embodiment and the simple TCP relay embodiment, the discoverable service opens a connection to the relay and sustains mappings in intervening NATs by periodically sending keep-alive messages in the connection. When a message arrives on the sandbox-reachable interface from a sandboxed program, the message is forward via the TCP connection to the discoverable service. The simple relay embodiment and the simple TCP relay embodiments are similar to the TURN embodiment except that they do not limit the scope to the specifics of TURN.

In the simple UDP relay embodiment, the discoverable service communicates with the relay using UDP rather than TCP or falls back to TCP when UDP fails. As with the simple relay and simple TCP relay embodiments, the discoverable service periodically sends keep-alive message to maintain mappings in any intervening NATs. When a sandboxed program queries the discovery service the returned service information contains the discovered service's public address and the picked relay's IP and port, i.e., all state related to the mapping in the relay. The sandboxed program then can communicate the state in each message thereby eliminating the need for the relay to retain any per-discoverable-service-state. Stateless systems also typically have simpler failover. When a simple relay fails, the discoverable service sees the failover at the end of the next keep-alive period and can switch to a different relay without needing to reestablish any state.

With the TURN, simple relay, and simple TCP relay embodiments, the relay keeps TCP connections open to each discoverable service, and thus the relay must maintain TCP-related state such as retransmission timers and send windows for each such discoverable service. State maintenance overhead can grow quite large compared to the simple UDP relay embodiment.

In the GUID-relay embodiment, the discovery service is combined with the relay service: discoverable services announce to the relay, the relay maintains a mapping from each GUID to the associated discovery service's public address, sandboxed programs then send messages bearing the discoverable service's GUID as the destination address, and the GUID-routing-relay immediately forwards the messages to the discoverable service's public address. Using the GUID as a destination address is orthogonal to whether discoverable service announce using UDP or TCP, thus there are TCP GUID-routing-relay and UDP GUID-routing-relay embodiments.

The GUID-relay must maintain discoverable-service state, but in the case of UDP this is no more state then would have to be maintained for the GUID mapping any of the discover service embodiments that maintain a GUID mapping.

Using a sandbox-reachable interface on one side to talk to sandboxed programs, and using UDP to talk to discoverable services is novel.

Retractable Access without User Accounts

In embodiments discussed so far, the GUID is sufficient to identify and establish communications with a discoverable service. However, there may be nothing to identify the user or the sandboxed program to the discoverable service.

For example, Alice owns a discoverable television. Alice's TV provides a discoverable service that allows sandboxed programs to tell the TV to download a video. Spammy visits Alice's house with his laptop. He visits a web site that loads Discovery.swf. Spammy discovery agent now has the GUM of Alice's TV. After Spammy leaves the Alice's home, much to Alice's disappointment, Spammy proceeds to litter her TV with unsolicited content.

One solution to this problem is to require password-protected user accounts for anyone with access to a discoverable service. This however introduces the burden of setting up accounts. Imposing user account registration for something as harmless as occasional visits from spanners seems like overkill. A less burdensome solution allows anyone to communicate with the discoverable service, and then allows the discoverable service to identify and exclude those that abuse the access.

Figure 21:
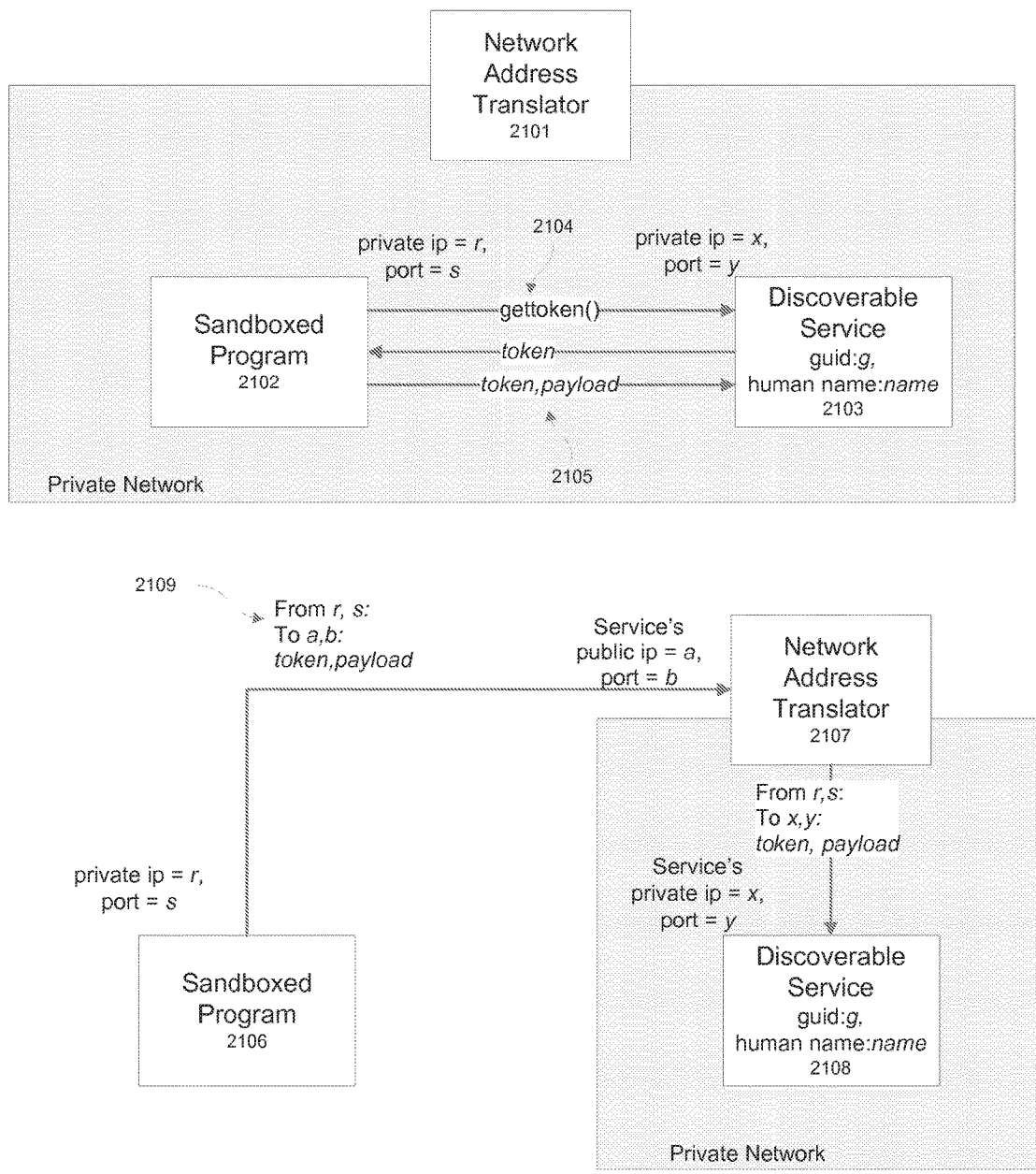
FIG. 21 illustrates the retractable access extension to the direct embodiment.

With the access-token-extension, the discoverable service requires the sandboxed program to pass an access token in any message excepting messages soliciting access tokens. An access token may be an opaque bitstring from the view of the sandboxed program, but to the discoverable service it uniquely identifies the message sender. The access-token-extension may be used with any embodiment discussed so far. FIG. 21 illustrates a sandboxed program requesting and obtaining an access token 2104. In subsequent communications 2105, the sandboxed program 2102 passes along the access token. FIG. 21 shows the sandboxed program and the discoverable service on the same private network, but the decision of when to offer access tokens is a matter of policy. In FIG. 21 when the sandboxed program 2102 2106 communicates remotely 2109 with the discoverable service 2108, the sandboxed program passes the along the access token.

In one extension to the access-token-extension, the sandboxed program employs the icy of only granting access tokens to sandboxed programs running on nodes in the same private network, as illustrated in FIG. 21. Thus Spammy could obtain an access token when he is in Alice's home, but not before. This is called the private-grant access-token extension and is an instance of the access-token extension.

The local-grant access-token extension further restricts granting access tokens only to sandboxed programs running on nodes in the same local area network as the discoverable service. In home environments there is often one NAT and one local area network behind the NAT, in such cases the local area and private networks are the same. Because the discoverable service and the sandboxed program communicate over a single local area network, a the sandboxed program arriving at the discoverable service's node contains the hardware address of the sandboxed program's node. Since hardware addresses are generally assigned by the manufacturer, are often left unchanged by users, and in many cases are not changeable, the hardware address may be used as a long-term pseudonym for a user, albeit the hardware address is an imperfect pseudonym as it conflates multiple users ran the same node. When the discoverable service grants an access token, it may derive the token from the hardware address or it may remember the token granted to each hardware address. If a node loses its token, whether due to mischief or happenstance, the discoverable service can reissue the same access token to the sandboxed program(s) on that node thereby maintaining the pseudonym for a us or users) across browsers, system crashes, browser cache erasures, and reboots into different operating systems.

With the local-grant access-token extension, not only is Spammy's laptop only able to send spam once it has operated in Alice's home, but Alice can also retract Spammy's laptop's access to her TV forever even if Spammy happens to clear his access tokens before revisiting Alice's home.

The access token may not only uniquely identify the user or his sandboxed. program(s), but must also not be guessable or derivable by other sandboxed programs; else any sandboxed program could hijack access tokens or could generate its own access tokens outside the scope of the discoverable service's access control policy. Preventing hijacking means the token should be kept reasonably private by the sandboxed program: assuming attackers do not have access to intervening network hardware, the access token could be stored locally to the sandboxed program and transmitted only in packets from the sandboxed program destined to the discoverable service. If the intervening network is considered untrustworthy then the access could be encrypted whenever transmitted using shared key. The shared key would only be known only to the sandboxed program and the discoverable service. There are many ways to generate access such that the discoverable service can verify that they were previously issued by the discoverable service. The various methods for token generation are orthogonal to this proposed extension, although two example techniques are provided: 1) the discoverable service draws tokens from a long highly random pseudorandom sequence seeded with a secret known only to the discoverable service, 2) the discoverable service uses a key-Hashed Message Authentication Code (HMAC) as the access token where the key used in generating the HMAC is known only to the discoverable service and the input message to the HMAC algorithm is the sandboxed program's node's hardware address.

To ensure users include the access token, the policy is imposed that the discoverable service discards, reclassifies, or otherwise applies policy to all remote communications without an accompanying access token 1309 issued by the discoverable service 1303 1308. Another policy that the discoverable service only issues access tokens to sandboxed programs on the same private network may also be used.

Exploiting User Accounts

In lieu of or in addition to access tokens, the discoverable service could choose to offer access only to authenticated, registered users. Many mechanisms exist to authenticate users. In the context of service discovery, with an account all policy and knowledge of discovered services can follow the user between machines. For example, Alice's laptop at home discovers her TV. From the laptop she registers with the discovery service. The sandboxed program on her laptop associates her TV with her discovery service user account. When she goes to work, she visits a website that runs a sandboxed program that uses the discovery service. She provides her login information to the sandboxed program and the sandboxed program then downloads from the discovery service the reference to her TV at home.

Remote access scenarios discussed with previous embodiments assumed that the user took the computer with him or her. If Alice takes her laptop to work then no user registration is necessary to reach her TV at home because her laptop already knows the TV's GUID and its public address it the address has not changed.

Multiple NATs

A node might be behind the same NAT that connects to the public Internet, but reside on a different private network from other discoverable services. Embodiments that include a relay or message queue can handle multiple private network behind the same public address by using the relay whenever direct communication fails.

Using Ranges or Prefixes Rather than NAT Public IPS

Not all discoverable services are behind a NAT. When a discoverable service's private and public addresses are identical, a discoverable service knows it resides on the public Internet, i.e., not behind a NAT. In most proposed embodiments in this application, a discoverable service can learn its public address by querying the discovery service.

With the ip-range-extension, when a discoverable service finds itself on the public Internet, the discoverable service announces itself to a range of public IP addresses by sending an address range or address prefix in its subsequent announces. With this extension, in query responses the discoverable service returns all discoverable services that announced to a range or prefix including the requestor's public address. The ip-range-extension can be combined with any embodiment or extension discussed in this application.

Deciding on the appropriate range may be left up to a user configuration in order to allow the device to be discovered across arbitrary IP address prefixes or ranges.

Advertisement Targeting, Recommender Systems, and Exposed Addresses

With embodiments derived from the direct embodiment, if the sandboxed program and the discoverable service run on nodes in the same local area network then the discoverable service can have access to the sandboxed program's node's hardware address. As discussed in Section 0, the hardware address may be used as a pseudonym for the user. This pseudonym could be used not only for imposing access control policy, but also to identify the user to recommender and advertisement targeting systems. With the world wide web, browsers hide the hardware address as well as any other form of permanent or semi-permanent pseudonym from web sites in order to protect user privacy. However, there is no way to protect a user's node's hardware address from other nodes on the same local area network. Thus discoverable services thus have an advantage not available to the world wide web for targeting advertising.

For example, when Alice visits a video website and pushes a video to her discoverable TV from her laptop in her home's local area network, the hardware address as pseudonym gives the TV an indicator of that Alice as opposed to her husband will watch the pushed video. This identification mechanism is not available to existing Internet TV platforms.

Capability-Based Discovery

In all embodiments discussed so far, the possibility that there may be many different kinds of services coexisting in the same network has not been mentioned. As such a user may wish to query for just those discoverable services that offer certain capabilities. With the capability-based extension, the discoverable service and sandboxed programs provide service descriptions to the discovery service. To each query, the discovery service returns only those discoverable services within the same private network that also match the service description. The service description may take the form of a logical predicate or just a list of keywords. The capability-based extension can be used in conjunction with any other embodiment or extension in this application.

Only One Per Private Network

Only one discoverable service in each private network need announce to the discovery service. By definition each private network has its own mutable private network address space in which nodes within the same private network can communicate with each other. With the only-one extension, discoverable services within the same private network elect one device at any given time to act as the announcer to the global discovery service and all discoverable services announce to the elected discoverable service. The elected discoverable service either passes all discovery information for the private network to the discovery service or it acts itself as the private discovery service for its private network. When acting as the private discovery service for its private network, the discoverable service can answer discovery queries for sandboxed programs running on nodes in the private discovery service's private network.

The only-one extension is not safe on networks that exhibit the hidden terminal problem, i.e., networks in which visibility is not guaranteed to be transitive. This sometimes occurs in wireless networks, e.g., node A has strong enough signal to communicate with node B, node B can communicate with node C, but A and C are too far apart for their signals to reach each other and B is not configured to act as a router between A and C. Fortunately, the discoverable service can know if it is on a network that exhibits the hidden terminal problem and choose to not implement the only-one extension.

With the only-one extension, load on the central discovery service from announces grows linear in the number of private networks rather than linear to the number of discoverable services. Furthermore, with the only-one extension, if a sandboxed program already knows the elected discovery service from a prior discovery query then it need not contact the central discovery service at all as long as the elected discovery service remains operational and remains the elected discovery service.

With the referral extension to the only-one extension, a discoverable service that was previously the private discovery service is queried it either redirects the requestor or forwards the request (like DNS iterative vs recursive name resolution) to the current private discovery service if known. If no private discovery service can be found then the sandboxed program falls back to the central discovery service.

Discovering Undiscoverable Service

Discoverable services as defined in this application are discoverable because they implement one of the many embodiments described. In particular embodiments, discoverable services announce either to the central discovery service or a private discovery service (see only-one extension).

There may exist services within the network that are undiscoverable as defined in this application but are discoverable by other means such as DLNA is UPnP AV). Such services are not discoverable directly from within sandboxed programs because they do not implement sandbox-reachable interfaces. However a discoverable service implementing the gateway-extension acts as a gateway to other undiscoverable services by announcing on their behalf to the central (or private) discovery service and by providing a sandbox-reachable interface on their behalf.

With the only-one gateway extension, the discoverable services implementing the gateway extension elect a single discoverable service to act as the gateway.

In this manner, a discoverable TV could allow flash players to push video to a user's "undiscoverable" NAS device.

Extending Sandbox to Support Discovery

An alternative solution is to extend an existing system that implements a sandbox to perform any traditional discovery method including those that involve multicast, such as MDNS/DNS-SD, SSDP, or SLP.

Although the description has been described with respect to particular embodiments thereof, these particular embodiments are merely illustrative, and not restrictive.

Any suitable programming language can be used to implement the routines of particular embodiments including C, C++. Java, assembly language. etc. Different programming techniques can be employed such as procedural or object oriented. The routines can execute on a single processing device or multiple processors. Although the steps, operations, or computations may be presented in a specific order, this order may be changed in different particular embodiments. some particular embodiments, multiple steps shown as sequential in this specification can be perforated at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

Finding devices behind the same NAT by querying central infrastructure and returning all previously announced service's sharing the same public IP address is novel.

There has previously been no configuration-free and software installation-free way of finding devices in the same network that didn't rely on broadcast or multicast.

A security model that is permissive to applications that reside behind the same NAT but that are otherwise constrained by a sandbox is novel.

Having a service providing a GUID to later allow a sandboxed program to lookup and then connect to a service on a previously visited private network is novel.

Separating the sandboxed program into two or more sandboxed program where one is loaded from trusted infrastructure is novel. It creates a trustable policy enforcement point inside the browser, whereas a similar component outside the browser would require an installation. Thus all policy enforcement mechanisms based on this separation are also novel.

Protecting a service from spam by obscuring the service's IP and port via a trusted sandboxed program acting as an intermediary is novel. Previous techniques involve some kind of configuration like account registration or administrator-configured IP-based access control lists.

Exposing only a locally unique ID and an unroutable but human-friendly name to untrusted sandboxed programs that is then translated by the trusted sandboxed program to routable information is novel.

Extending TURN, STUN, or STUNT to return "explicit to communicate" is novel. In particular having any of these crossdomain.xml files to permit communication between the server and the programs running within a Flash sandbox is novel.

Using a TCP-to-UDP reflector to get around the TCP-only constraint imposed by the security sandbox (of which Flash employs a qualifying security sandbox) is novel. Before the existence of such sandboxes, such reflectors would have been useless since applications running on any IP node would likely have sent UDP directly.

Instead of requiring the user to create an account with each service, each service may generate random unique ids that are handed out freely to sandboxed programs on the same private network. Inclusion of a uid is not required for local private network access but is required for any remote access. Thus once the node running a sandboxed program leaves the private network containing the service in question, the service can continue to identify the user by the uid pseudonym. If the device so desires, it can retract access at any time by disallowing requests that contain a given user id. This is the first time someone has proposed a configuration-free mechanism that permits free local access and retractable remote access.

A discovery mechanism that is configuration free but allows extended functionality when a user provides account information is novel.

Using a metadiscovery service to find an appropriate discovery service is also novel.

TCP Reflectors

Global message queues (electronic mailboxes are global message queues)

What is claimed is:

1. A system comprising:
   a television executing a discoverable service thereon to provide a communication;
   a device residing in a same private network of a computer network as the television, the device configured to:
      constrain an executable environment in a security sandbox,
      execute a sandboxed program in the executable environment,
      use a pseudonym of a user, and
      call a discovery agent to find the discoverable service of the television within the same private network in accordance with the communication provided by the television,
      wherein the device and the television are associated with one another by way of the sandboxed program and the discoverable service executing thereon respectively using at least the communication from the discoverable service within the same private network; and
   a targeting system to:
      receive the pseudonym,
      identify the user of the device using the pseudonym, and target advertising to the identified user of the device using at least one of the sandboxed program and the discoverable service.

2. The system of claim 1, further comprising:
a server executing a discovery service to:
receive the communication from the television,
identify the television with the discoverable service using at least one of a globally unique identification (GUID), a human-friendly name, a private address data and a public address data of the television,
determine that the discoverable service of the television is available, and
reply to a query from any of the device, the targeting system and another device to find the discoverable service of the television.

3. The system of claim 2, wherein at least one of:
the communication of the television comprises at least one of the GUID, the human-friendly name, the private address data and the public address data of the discoverable service, and
the public address data is provided by a network address translator straddling both a public network and the same private network of the computer network.

4. The system of claim 2, wherein the device and the television are associated using at least one of: the pseudonym, the communication, the GUID, the human-friendly name, the private address data and the public address data of the discoverable service of the television, and a private address data and a public address data of the sandboxed program of the device.

5. The system of claim 1, wherein:
the pseudonym of the user is a long-term unique identifier of the sandboxed program of the device that is unlikely to change.

6. The system of claim 1, wherein the sandboxed program is at least one: of an embedded object, a script, a binary executable, an intermediate bytecode, and an abstract syntax tree.

7. The system of claim 1, further comprising:
a media device to send a video to at least one of: the television and the device within a home of the user without requiring user configuration and account registration.

8. The system of claim 2, wherein:
a payload is communicated between the server and the discoverable service of the television.

9. The system of claim 2, wherein:
a media payload is communicated between the server and the sandboxed program of the device.

10. A system comprising:
a television executing a discoverable service thereon to provide a communication;
a device residing in a same private network of a computer network as the television, the device configured to:
constrain an executable environment in a security sandbox,
execute a sandboxed program in the executable environment,
use a pseudonym of a user, and
call a discovery agent to find the discoverable service of the television within the same private network in accordance with the communication provided by the television,
wherein the pseudonym of the user is a hardware address of a node of the sandboxed program within the same private network, and
wherein the device and the television are associated with one another by way of the sandboxed program and the discoverable service executing thereon respectively using at least the communication from the discoverable service within the same private network; and
a targeting system to:
receive the pseudonym,
identify the user of the device using the pseudonym, and
target advertising to the identified user of the device.

11. The system of claim 10, further comprising:
a server executing a discovery service to:
receive the communication from the television,
identify the television with the discoverable service using at least one of a GUID, a human-friendly name, a private address data and a public address data of the television,
determine that the discoverable service of the television is available, and
reply to a query from any of the device, the targeting system and another device to find the discoverable service of the television.

12. The system of claim 11, wherein at least one of:
the communication of the television comprises at least one of the GUID, the human-friendly name, the private address data and the public address data of the discoverable service, and
the public address data is provided by a network address translator straddling both a public network and the same private network of the computer network.

13. The system of claim 11, wherein the device and the television are associated using at least one of: the pseudonym, the communication, the GUID, the human-friendly name, the private address data and the public address data of the discoverable service of the television, and a private address data and a public address data of the sandboxed program of the device.

14. The system of claim 10, wherein:
the pseudonym of the user is a long-term unique identifier of the sandboxed program of the device that is unlikely to change.

15. The system of claim 10, wherein the sandboxed program is at least one: of an embedded object, a script, a binary executable, an intermediate bytecode, and an abstract syntax tree.

16. The system of claim 10, further comprising:
a media device to send a video to at least one of: the television and the device within a home of the user without requiring user configuration and account registration.

17. The system of claim 11, wherein:
a media payload is communicated between the server and the sandboxed program of the device.

18. A method comprising:
initiating a discoverable service executing on a television to provide a communication;
through a device residing in a same private network of a computer network as the television:
constraining an executable environment in a security sandbox;
executing a sandboxed program in the executable environment;
using a pseudonym of a user; and calling a discovery agent to find the discoverable service of the television within the same private network in accordance with the communication provided by the television;

associating the device and the television with one another by way of the sandboxed program and the discoverable service executing thereon respectively using at least the communication from the discoverable service within the same private network; and through a targeting system:
receiving the pseudonym;
identifying the user of the device using the pseudonym; and
targeting advertising to the identified user of the device using at least one of the sandboxed program and the discoverable service.

19. The method of claim 18, further comprising:
executing a discovery service on a server to:
receive the communication from the television,
identify the television with the discoverable service using at least one of a GUID, a human-friendly name, a private address data and a public address data of the television,
determine that the discoverable service of the television is available, and
reply to a query from any of the device, the targeting system and another device to find the discoverable service of the television.

20. The method of claim 19, comprising:
including at least one of the GUID, the human-friendly name, the private address data and the public address data of the discoverable service in the communication of the television; and
providing the public address data through a network address translator straddling both a public network and the same private network of the computer network.

\* \* \* \* \*